United States Patent
Kister et al.

(10) Patent No.: US 12,295,367 B2
(45) Date of Patent: May 13, 2025

(54) COMPOSITIONS COMPRISING PYRIDINE CARBOXYLATE HERBICIDES WITH PHOTOSYSTEM II AND OPTIONAL HPPD INHIBITOR HERBICIDES

(71) Applicant: Corteva Agriscience LLC, Indianapolis, IN (US)

(72) Inventors: Jeremy Kister, Carmel, IN (US); Norbert M. Satchivi, Carmel, IN (US)

(73) Assignee: CORTEVA AGRISCIENCE LLC, Indianapolis, IN (US)

(*) Notice: Subject to any disclaimer, the term of this patent is extended or adjusted under 35 U.S.C. 154(b) by 879 days.

(21) Appl. No.: 17/289,360

(22) PCT Filed: Nov. 4, 2019

(86) PCT No.: PCT/US2019/059601
§ 371 (c)(1),
(2) Date: Apr. 28, 2021

(87) PCT Pub. No.: WO2020/096929
PCT Pub. Date: May 14, 2020

(65) Prior Publication Data
US 2022/0007644 A1  Jan. 13, 2022

Related U.S. Application Data

(60) Provisional application No. 62/756,809, filed on Nov. 7, 2018.

(51) Int. Cl.
| | | |
|---|---|---|
| A01N 43/40 | (2006.01) | |
| A01N 25/32 | (2006.01) | |
| A01N 37/18 | (2006.01) | |
| A01N 37/34 | (2006.01) | |
| A01N 43/54 | (2006.01) | |
| A01N 43/56 | (2006.01) | |
| A01N 43/68 | (2006.01) | |
| A01N 43/707 | (2006.01) | |
| A01N 43/88 | (2006.01) | |
| A01N 47/02 | (2006.01) | |
| A01N 47/20 | (2006.01) | |
| A01N 47/22 | (2006.01) | |
| A01N 47/36 | (2006.01) | |
| A01N 47/38 | (2006.01) | |
| A01P 13/00 | (2006.01) | |

(52) U.S. Cl.
CPC ............ *A01N 43/40* (2013.01); *A01N 25/32* (2013.01); *A01N 37/18* (2013.01); *A01N 37/34* (2013.01); *A01N 43/54* (2013.01); *A01N 43/56* (2013.01); *A01N 43/68* (2013.01); *A01N 43/707* (2013.01); *A01N 43/88* (2013.01); *A01N 47/02* (2013.01); *A01N 47/20* (2013.01); *A01N 47/22* (2013.01); *A01N 47/36* (2013.01); *A01N 47/38* (2013.01); *A01P 13/00* (2021.08)

(58) Field of Classification Search
CPC ........ A01N 43/40; A01N 25/32; A01N 37/18; A01N 37/34; A01N 43/54; A01N 43/56; A01N 43/68; A01N 43/707; A01N 43/88; A01N 47/02; A01N 47/20; A01N 47/22; A01N 47/36; A01N 47/38; A01N 37/40; A01P 13/00
USPC .................................................. 546/277.4
See application file for complete search history.

(56) References Cited

U.S. PATENT DOCUMENTS

| | | |
|---|---|---|
| 4,044,140 A | 8/1977 | Sherlock |
| 4,698,093 A | 10/1987 | Lee et al. |
| 4,877,897 A | 10/1989 | Swithenbank et al. |
| 9,179,676 B2 | 11/2015 | Hoffmann et al. |
| 9,521,847 B2 | 12/2016 | Satchivi et al. |
| 9,611,282 B2 | 4/2017 | Eckelbarger et al. |
| 9,763,445 B2 | 9/2017 | Satchivi et al. |

(Continued)

FOREIGN PATENT DOCUMENTS

| | | |
|---|---|---|
| GB | 1565056 A | 4/1980 |
| WO | 03/011853 A1 | 2/2003 |

(Continued)

OTHER PUBLICATIONS

Assche et al (Photosystem II Inhibiting Chemicals: Molecular Interaction Between Inhibitors and a Common Target, Biochemical Responses Induced by Herbicides, Biochemical Responses Induced by Herbicides, ACS Symposium Series; American Chemical Society: Washington, DC, 1982.p. 1-21 (Year: 1982).*

(Continued)

*Primary Examiner* — Taylor V Oh

(57) ABSTRACT

Disclosed herein are compositions comprising (a) a pyridine carboxylate herbicide or an agriculturally acceptable N-oxide, salt, or ester thereof and (b) a PS II inhibitor herbicide or an agriculturally acceptable salt or ester thereof. Also disclosed herein are compositions comprising (a) a pyridine carboxylate herbicide or an agriculturally acceptable N-oxide, salt, or ester thereof, (b) a PS II inhibitor herbicide or an agriculturally acceptable salt or ester thereof, and (c) a HPPD inhibitor herbicide. Also disclosed herein are methods of controlling undesirable vegetation, comprising applying to vegetation or an area adjacent the vegetation or applying in soil or water to control the emergence or growth of vegetation (a) a pyridine carboxylate herbicide or an agriculturally acceptable N-oxide, salt, or ester thereof, (b) a PS II inhibitor herbicide or an agriculturally acceptable salt or ester thereof, and (c) optionally, a HPPD inhibitor herbicide.

15 Claims, No Drawings

(56) References Cited

U.S. PATENT DOCUMENTS

| | | | |
|---|---|---|---|
| 10,448,638 | B2 | 10/2019 | Satchivi et al. |
| 11,363,812 | B2 | 6/2022 | Wang et al. |
| 11,363,816 | B2 | 6/2022 | Kister et al. |
| 12,029,217 | B2 | 7/2024 | Satchivi et al. |
| 2003/0114311 | A1 | 6/2003 | Balko et al. |
| 2007/0093390 | A1 | 4/2007 | Witschel et al. |
| 2010/0137137 | A1 | 6/2010 | Rosinger et al. |
| 2011/0245157 | A1 | 10/2011 | Meng |
| 2015/0005156 | A1 | 1/2015 | Dash et al. |
| 2015/0005165 | A1 | 1/2015 | Hoffmann et al. |
| 2016/0073632 | A1 | 3/2016 | Satchivi et al. |
| 2016/0135457 | A1 | 5/2016 | Satchivi et al. |
| 2016/0135458 | A1 | 5/2016 | Satchivi et al. |
| 2017/0064955 | A1 | 3/2017 | Satchivi et al. |
| 2019/0069549 | A1 | 3/2019 | Satchivi et al. |
| 2019/0069550 | A1 | 3/2019 | Satchivi et al. |
| 2020/0068888 | A1 | 3/2020 | Kister et al. |
| 2021/0161135 | A1* | 6/2021 | Satchivi ............... A01N 43/40 |
| 2021/0352899 | A1 | 11/2021 | Kister et al. |
| 2021/0386068 | A1 | 12/2021 | Kister et al. |
| 2021/0392888 | A1 | 12/2021 | Satchivi et al. |
| 2021/0392889 | A1 | 12/2021 | Kister et al. |
| 2021/0392890 | A1 | 12/2021 | Kister et al. |
| 2021/0392891 | A1 | 12/2021 | Kister et al. |
| 2021/0392892 | A1 | 12/2021 | Satchivi et al. |
| 2021/0400967 | A1 | 12/2021 | Satchivi et al. |
| 2021/0400968 | A1 | 12/2021 | Satchivi et al. |
| 2021/0400969 | A1 | 12/2021 | Satchivi et al. |
| 2021/0400970 | A1 | 12/2021 | Satchivi et al. |
| 2022/0000109 | A1 | 1/2022 | Satchivi et al. |
| 2022/0000110 | A1 | 1/2022 | Satchivi et al. |
| 2023/0009120 | A1 | 1/2023 | Satchivi et al. |
| 2023/0022569 | A1 | 1/2023 | Kister et al. |

FOREIGN PATENT DOCUMENTS

| | | | |
|---|---|---|---|
| WO | 2009029518 | A2 | 3/2009 |
| WO | 2013/014165 | A1 | 1/2013 |
| WO | 2013085991 | A1 | 6/2013 |
| WO | 2014018398 | A1 | 1/2014 |
| WO | 2014018402 | A1 | 1/2014 |
| WO | 2014018407 | A1 | 1/2014 |
| WO | 2014116910 | A1 | 7/2014 |
| WO | 2014116927 | A1 | 7/2014 |
| WO | 2014/151005 | A1 | 9/2014 |
| WO | 2016/044276 | A1 | 3/2016 |
| WO | 2016044229 | A2 | 3/2016 |
| WO | 2016044282 | A1 | 3/2016 |
| WO | 2016044283 | A1 | 3/2016 |
| WO | 2016044285 | A1 | 3/2016 |
| WO | 2018/208582 | A1 | 11/2018 |
| WO | 2019/060366 | A1 | 3/2019 |
| WO | 2019046666 | A1 | 3/2019 |
| WO | 2019046667 | A1 | 3/2019 |
| WO | 2019195495 | A1 | 10/2019 |
| WO | 2019195496 | A1 | 10/2019 |
| WO | PCT/US2019/059601 | | 4/2020 |
| WO | 2020096832 | A1 | 5/2020 |

OTHER PUBLICATIONS

Bonneville Power Administration., "Sulfentrazone Herbicide Fact Sheet," U.S. Department of Energy, 2004, pp. 1-9.

Examination Report of Pakistan Patent Application No. 330/2018, mailed May 9, 2018, 5 Pages Applicant: (Dow Agrosciences LLC, dated Aug. 16, 2019).

Extended European Search Report for European Application No. 18798826.6, mailed Nov. 25, 2020, 8 Pages.

International Preliminary Report on Patentability for International Application No. PCT/US2018/031004, mailed Nov. 21, 2019, 7 Pages.

International Preliminary Report on Patentability for International Application No. PCT/US2019/058779, mailed May 20, 2021, 9 Pages.

International Preliminary Report on Patentability for International Application No. PCT/US2019/058788, mailed May 20, 2021, 09 Pages.

International Preliminary Report on Patentability for International Application No. PCT/US2019/058795, mailed May 20, 2021, 9 Pages.

International Preliminary Report on Patentability for International Application No. PCT/US2019/059592, mailed May 20, 2021, 9 Pages.

International Preliminary Report on Patentability for International Application No. PCT/US2019/059594, mailed May 20, 2021, 09 Pages.

International Preliminary Report on Patentability for International Application No. PCT/US2019/059596, mailed May 20, 2021, 10 Pages.

International Preliminary Report on Patentability for International Application No. PCT/US2019/059599, mailed May 20, 2021, 10 Pages.

International Preliminary Report on Patentability for International Application No. PCT/US2019/059601, mailed May 20, 2021, 10 Pages.

International Preliminary Report on Patentability for International Application No. PCT/US2019/059604, mailed May 20, 2021, 9 Pages.

International Preliminary Report on Patentability for International Application No. PCT/US2019/059605, mailed May 20, 2021, 9 Pages.

International Preliminary Report on Patentability for International Application No. PCT/US2019/059606, mailed May 20, 2021, 9 Pages.

International Preliminary Report on Patentability for International Application No. PCT/US2019/059609, mailed May 20, 2021, 9 Pages.

International Preliminary Report on Patentability for International Application No. PCT/US2019/059612, mailed May 20, 2021, 9 Pages.

International Preliminary Report on Patentability for International Application No. PCT/US2019/059613, mailed May 20, 2021, 9 Pages.

International Preliminary Report on Patentability for International Application No. PCT/US2019/059615, mailed May 20, 2021, 10 Pages.

International Preliminary Report on Patentability for International Application No. PCT/US2019/059617, mailed May 20, 2021, 9 Pages.

International Search Report and Written Opinion for International Application No. PCT/US2014/024745, mailed Jul. 7, 2014, 9 Pages.

International Search Report and Written Opinion for International Application No. PCT/US2018/031004, mailed Jul. 26, 2018, 8 Pages.

International Search Report and Written Opinion for International Application No. PCT/US2019/058779, mailed Feb. 19, 2020, 11 Pages.

International Search Report and Written Opinion for International Application No. PCT/US2019/058788, mailed Feb. 19, 2020, 11 Pages.

International Search Report and Written Opinion for International Application No. PCT/US2019/058795, mailed Feb. 19, 2020, 11 Pages.

International Search Report and Written Opinion for International Application No. PCT/US2019/059592, mailed Apr. 2, 2020, 12 Pages.

International Search Report and Written Opinion for International Application No. PCT/US2019/059594, mailed Mar. 30, 2020, 12 Pages.

International Search Report and Written Opinion for International Application No. PCT/US2019/059596, mailed Apr. 2, 2020, 13 Pages.

International Search Report and Written Opinion for International Application No. PCT/US2019/059599, mailed Mar. 19, 2020, 13 Pages.

(56) References Cited

OTHER PUBLICATIONS

International Search Report and Written Opinion for International Application No. PCT/US2019/059604, mailed Apr. 2, 2020, 12 Pages.
International Search Report and Written Opinion for International Application No. PCT/US2019/059605, mailed Mar. 19, 2020, 12 Pages.
International Search Report and Written Opinion for International Application No. PCT/US2019/059606, mailed Apr. 2, 2020, 12 Pages.
International Search Report and Written Opinion for International Application No. PCT/US2019/059609, mailed Apr. 2, 2020, 12 Pages.
International Search Report and Written Opinion for International Application No. PCT/US2019/059612, mailed Mar. 19, 2020, 12 Pages.
International Search Report and Written Opinion for International Application No. PCT/US2019/059613, mailed Mar. 9, 2020, 12 Pages.
International Search Report and Written Opinion for International Application No. PCT/US2019/059615, mailed Apr. 24, 2020, 13 Pages.
International Search Report and Written Opinion for International Application No. PCT/US2019/059617, mailed Apr. 2, 2020, 12 Pages.
Official Action for Eurasian Patent Application No. 201992666, dated Nov. 23, 2021 for Dow Agrosciences LLC, Dec. 9, 2019, 3 Pages.
Official Action for Eurasian Patent Application No. 201992666, dated Feb. 24, 2021 for Dow Agrosciences LLC, Dec. 9, 2019, 3 Pages.
Aim EC Herbicide label, FMC Corporation, May 2, 2017.
BAYER., "An Integrated Approach to Manage Weeds," Crop Science, Retrieved from Internet URL: , No Pagination, 2016, pp. 1-3.
Official Action for Eurasian Patent Application No. 201992666, dated Feb. 17, 2021 for Dow Agrosciences LLC, English Translation Received Feb. 24, 2021, 6 Pages.
Official Action for Eurasian Patent Application No. 210992666, dated Nov. 9, 2021 for Dow AgroSciences LLC, English Translation Received Nov. 23, 2021, 5 Pages.

\* cited by examiner

COMPOSITIONS COMPRISING PYRIDINE CARBOXYLATE HERBICIDES WITH PHOTOSYSTEM II AND OPTIONAL HPPD INHIBITOR HERBICIDES

CROSS REFERENCE TO RELATED APPLICATION

This application is the National Stage Entry of International Application No. PCT/US19/59601, filed on Nov. 4, 2019, which claims the benefit of priority of U.S. Provisional Application No. 62/756,809, filed Nov. 7, 2018, both of which are incorporated by reference herein in their entirety.

FIELD

The present disclosure includes compositions comprising (a) a pyridine carboxylate herbicide or an agriculturally acceptable N-oxide, salt, or ester thereof, (b) a photosystem II (PS II) inhibitor or an agriculturally acceptable salt or ester thereof, and (c) optionally, a 4-hydroxyphenyl-pyruvate dioxygenase (HPPD) inhibitor or an agriculturally acceptable salt or ester thereof. The present disclosure also includes methods of controlling undesirable vegetation using the same.

BACKGROUND

Many recurring problems in agriculture involve controlling the growth of undesirable vegetation that can, for instance, negatively affect the growth of desirable vegetation. To help control undesirable vegetation, researchers have produced a variety of chemicals and chemical formulations effective in controlling such unwanted growth. However, there exists a need for new herbicide compositions and methods to control the growth of undesirable vegetation in desired crops.

SUMMARY

Disclosed herein are compositions that may be used as herbicides, for example, in crops. The compositions may contain (a) a pyridine carboxylate herbicide or agriculturally acceptable N-oxide, salt, or ester thereof, (b) a photosystem II (PS II) inhibitor or an agriculturally acceptable salt or ester thereof, and (c) optionally, a 4-hydroxyphenyl-pyruvate dioxygenase (HPPD) inhibitor or an agriculturally acceptable salt or ester thereof. The weight ratio of (a) to (b) to (c) can be from 1:18,000:4500 to 60:1:0 (e.g., from 1:7000:1000 to 20:5:1, from 1:2800:600 to 2:1:0, from 1:45:10 to 10:10:1, from 1:24:0 to 1:18:0, from 1:16:8 to 1:12:6, or from 1:5:5 to 5:1:0).

In some aspects, the composition comprises (a) a pyridine carboxylate herbicide defined by Formula (I):

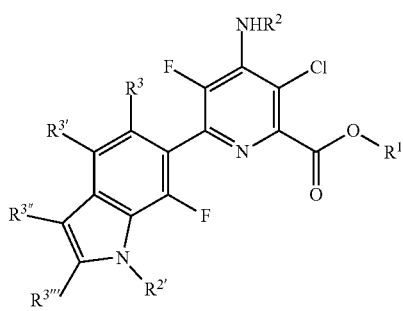

Formula I wherein:

$R^1$ is cyanomethyl or propargyl;

$R^2$ and $R^{2'}$ are independently hydrogen, $C_1$-$C_6$ alkyl, formyl, alkoxycarbonyl, or acyl;

$R^3$, $R^{3'}$, $R^{3''}$, and $R^{3'''}$ are independently hydrogen, halogen, $C_1$-$C_4$ alkyl, $C_1$-$C_4$ haloalkyl, $C_1$-$C_3$ alkoxy, or $C_1$-$C_3$ haloalkoxy;

or an agriculturally acceptable N-oxide, salt, or ester thereof; and (b) a photosystem II (PS II) inhibitor or an agriculturally acceptable salt or ester thereof.

In some aspects, the composition comprises: (a) the pyridine carboxylate herbicide compound cyanomethyl 4-amino-3-chloro-5-fluoro-6-(7-fluoro-1H-indol-6-yl)pyridine-2-carboxylate, referred to hereinafter as Compound A:

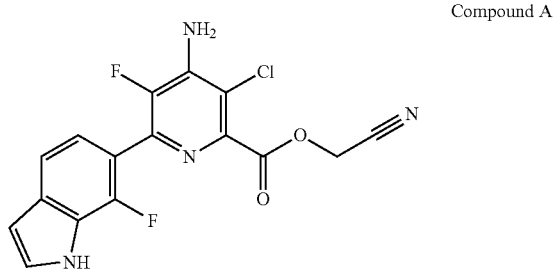 [SMILES: N#CCOC(=O)c1nc(-c2ccc3cc[nH]c3c2F)c(F)c(N)c1Cl]

Compound A or an agriculturally acceptable N-oxide, salt, or ester thereof; and (b) a photosystem II (PS II) inhibitor or an agriculturally acceptable salt or ester thereof.

In some aspects, the composition comprises:

(a) the pyridine carboxylate herbicide compound propargyl 4-amino-3-chloro-5-fluoro-6-(7-fluoro-1H-indol-6-yl)pyridine-2-carboxylate, referred to hereinafter as Compound B:

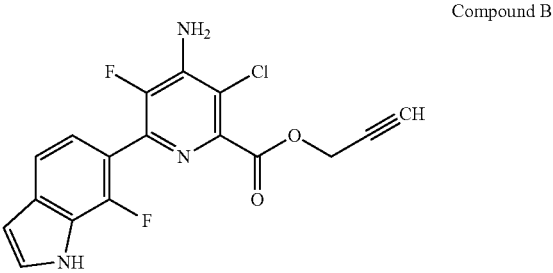 [SMILES: C#CCOC(=O)c1nc(-c2ccc3cc[nH]c3c2F)c(F)c(N)c1Cl]

Compound B or an agriculturally acceptable N-oxide, salt, or ester thereof; and (b) a photosystem II (PS II) inhibitor or an agriculturally acceptable salt or ester thereof.

In some aspects, the composition comprises (a) a pyridine carboxylate herbicide defined by Formula (I):

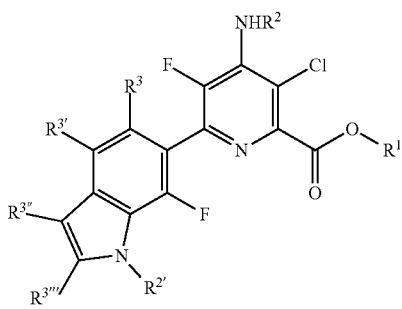

Formula I wherein:

R¹ is cyanomethyl or propargyl;

R² and R²' are independently hydrogen, $C_1$-$C_6$ alkyl, formyl, alkoxycarbonyl, or acyl;

R³, R³', R³'', and R³''' are independently hydrogen, halogen, $C_1$-$C_4$ alkyl, $C_1$-$C_4$ haloalkyl, $C_1$-$C_3$ alkoxy, or $C_1$-$C_3$ haloalkoxy;

or an agriculturally acceptable N-oxide, salt, or ester thereof;

(b) a photosystem II (PS II) inhibitor or an agriculturally acceptable salt or ester thereof; and (c) a 4-hydroxyphenyl-pyruvate dioxygenase (HPPD) inhibitor or an agriculturally acceptable salt or ester thereof.

In some aspects, the composition comprises:

(a) the pyridine carboxylate herbicide compound cyanomethyl 4-amino-3-chloro-5-fluoro-6-(7-fluoro-1H-indol-6-yl)pyridine-2-carboxylate, referred to hereinafter as Compound A:

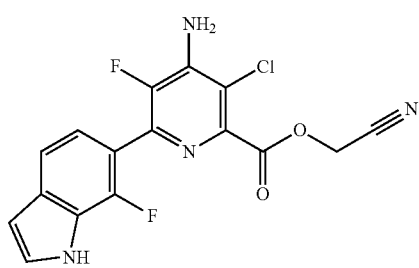

Compound A or an agriculturally acceptable N-oxide, salt, or ester thereof;

(b) a photosystem II (PS II) inhibitor or an agriculturally acceptable salt or ester thereof; and (c) a 4-hydroxyphenyl-pyruvate dioxygenase (HPPD) inhibitor or an agriculturally acceptable salt or ester thereof.

In some aspects, the composition comprises:

(a) the pyridine carboxylate herbicide compound propargyl 4-amino-3-chloro-5-fluoro-6-(7-fluoro-1H-indol-6-yl)pyridine-2-carboxylate, referred to hereinafter as Compound B:

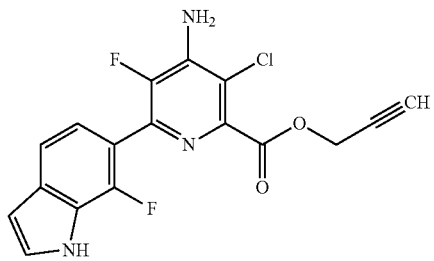

Compound B or an agriculturally acceptable N-oxide, salt, or ester thereof;

(b) a photosystem II (PS II) inhibitor or an agriculturally acceptable salt or ester thereof; and (c) a 4-hydroxyphenyl-pyruvate dioxygenase (HPPD) inhibitor or an agriculturally acceptable salt or ester thereof.

In some aspects, the PS II inhibitor (b) can comprise a phenylcarbamate herbicide. Exemplary phenylcarbamate herbicides include desmedipham, phenmedipham, or agriculturally acceptable salts or esters thereof, or combinations thereof. In some aspects, (b) can comprise a pyridazinone herbicide. Exemplary pyridazinone herbicides include chloridazon or an agriculturally acceptable salt thereof, or combinations thereof. In some aspects, (b) can comprise a triazolinone herbicide. Exemplary triazolinone herbicides include amicarbazone or an agriculturally acceptable salt thereof, or combinations thereof. In some aspects, (b) can comprise a triazine herbicide. Exemplary triazine herbicides include atrazine, cyanazine, metribuzin, or agriculturally acceptable salts or esters thereof, or combinations thereof. In some aspects, (b) can comprise a urea herbicide. Exemplary urea herbicides include dimefuron, isoproturon, neburon, or agriculturally acceptable salts or esters thereof, or combinations thereof. In some aspects, (b) can comprise a uracil herbicide. Exemplary uracil herbicides include bromacil, lenacil, terbacil, or agriculturally acceptable salts thereof, or combinations thereof. In some aspects, (b) can comprise an amide herbicide. Exemplary amide herbicides include pentanochlor, propanil, or agriculturally acceptable salts thereof, or combinations thereof. In some aspects, (b) can comprise a phenylpyridazine herbicide. Exemplary phenylpyridazines herbicides include pyridate, pyridafol, or agriculturally acceptable salts thereof, or combinations thereof. In some aspects, (b) can comprise a nitrile herbicide. Exemplary nitrile herbicides include bromoxynil, ioxynil, or agriculturally acceptable salts thereof, or combinations thereof.

In some aspects, the PS II inhibitor (b) can comprise ametryne, amicarbazone, atrazine, bentazon, bromacil, bromofenoxim, bromoxynil, chlorbromuron, chloridazon, chlorotoluron, chloroxuron, cyanazine, desmedipham, desmetryn, dimefuron, dimethametryn, diuron, ethidimuron, ethiozin, fenuron, fluometuron, hexazinone, iodobonil, ioxynil, isocil, isomethiozin, isoproturon, isouron, karbutilate, lenacil, linuron, metamitron, methabenzthiazuron, methoprotryne, metobromuron, metoxuron, metribuzin, monolinuron, neburon, pentanochlor, phenmedipham, prometon, prometryn, propanil, propazine, pyridafol, pyridate, siduron, simazine, simetryne, tebuthiuron, terbacil, terbumeton, terbuthylazine, terbutryn, trietazine, or combinations thereof.

In some aspects, the HPPD inhibitor (c) can comprise benzobicyclon, benzofenap, bicyclopyrone, fenquinotrione, isoxachlortole, isoxaflutole, lancotrione, mesotrione, pyrasulfotole, pyrazolynate, pyrazoxyfen, sulcotrione, tefuryltrione, tembotrione, tolpyralate, topramezone, or combinations thereof.

In some aspects, the composition comprises a mixture of the pyridine carboxylate herbicide (a) and the PDS inhibitor (b). In some aspects, the composition comprises a mixture of the pyridine carboxylate herbicides (a) and one or more PDS inhibitors (b). In some aspects, the composition comprises a mixture of one or more pyridine carboxylate herbicides (a) and one or more PDS inhibitors (b). In some aspects, the composition comprises a mixture of the pyridine carboxylate herbicide (a), one or more PDS inhibitors (b), and the HPPD inhibitor (c). In some aspects, the composition comprises a mixture of the pyridine carboxylate herbicide (a), one or more PDS inhibitors (b), and one or more HPPD inhibitors (c). In some aspects, the composition comprises a mixture of one or more pyridine carboxylate herbicides (a), one or more PDS inhibitors (b), and one or more HPPD inhibitors (c). In some aspects, (b) is a mixture of diflufenican and flurtamone. In some aspects, (c) is flufenacet.

In some aspects, the composition can further comprise an agriculturally acceptable adjuvant or carrier, a herbicidal safener, an additional pesticide, or combinations thereof. In some aspects, the only active ingredients in the composition are (a) and (b). In some aspects, the composition can be provided as a herbicidal concentrate.

Also disclosed herein are methods of controlling undesirable vegetation, comprising applying to vegetation, to an area adjacent the vegetation, or to soil or water to control the emergence or growth of vegetation, a composition comprising: (a) a pyridine carboxylate herbicide or an agriculturally acceptable N-oxide, salt, or ester thereof; (b) a photosystem II (PS II) inhibitor or an agriculturally acceptable salt or ester thereof; and (c) optionally, a 4-hydroxyphenyl-pyruvate dioxygenase (HPPD) inhibitor or an agriculturally acceptable salt or ester thereof. In some aspects, (a), (b), and optionally (c) are applied simultaneously. In some aspects, (a), (b), and optionally (c) are applied sequentially. In some aspects, (a), (b), and optionally (c) are applied pre-emergence of the undesirable vegetation. In some aspects, (a), (b), and optionally (c) are applied post-emergence of the undesirable vegetation. In some aspects, the undesirable vegetation is in cereals. In some aspects, the undesirable vegetation is in maize, wheat, barley, rice, sorghum, millet, or oats. In some aspects, the undesirable vegetation is in broadleaf crops. In some aspects, the undesirable vegetation is in canola, flax, sunflower, soy, or cotton.

In some aspects, the pyridine carboxylate herbicide (a) can be applied in an amount of from 0.1 gram acid equivalent per hectare (g ae/ha) to 300 g ae/ha (e.g., from 30 g ae/ha to 40 g ae/ha). In some aspects, the PDS inhibitor (b) can be applied in an amount of from 5 g ai/ha to 18,000 g ai/ha (e.g., from 100 g ai/ha to 4500 g ai/ha). In some cases, (a) and (b) can be applied in a weight ratio of from 1:18,000 to 60:1 (e.g., from 1:7000 to 20:5, from 1:2800 to 2:1, from 1:45 to 10:10, from 1:24 to 1:18, from 1:16 to 1:12, or from 1:5 to 5:1). In some aspects, the HPPD inhibitor (c) can be applied in an amount of from 0 g ai/ha to 4500 g ai/ha (e.g., from 50 g ai/ha to 1000 g ai/ha). In some aspects, (a) and (c) can be applied in a weight ratio of from 11:4500 to 60:0 (e.g., from 1:1000 to 20:1, from 1:600 to 2:1, from 1:10 to 10:1, from 1:24 to 1:18, from 1:8 to 1:12, or from 1:5 to 5:1). In some aspects, the weight ratio of (a) to (b) to (c) can be from 1:18,000:4500 to 60:1:0 (e.g., from 1:7000:1000 to 20:5:1, from 1:2800:600 to 2:1:0, from 1:45:10 to 10:10:1, from 1:24:0 to 1:18:0, from 1:16:8 to 1:12:6, or from 1:5:5 to 5:1:0).

The description below sets forth details of one or more aspect of the present disclosure. Other features, objects, and advantages will be apparent from the description and from the claims.

DETAILED DESCRIPTION

The present disclosure includes compositions comprising: (a) a pyridine carboxylate herbicide or an agriculturally acceptable N-oxide, salt, or ester thereof; (b) a photosystem II (PS II) inhibitor or an agriculturally acceptable salt or ester thereof; and (c) optionally, a 4-hydroxyphenyl-pyruvate dioxygenase (HPPD) inhibitor or an agriculturally acceptable salt or ester thereof. The present disclosure also includes methods for controlling undesirable vegetation. In some aspects, the undesirable vegetation is in cereals. In some aspects, the undesirable vegetation is in maize, wheat, barley, rice, sorghum, millet, or oats. In some aspects, the undesirable vegetation is in broadleaf crops. In some aspects, the undesirable vegetation is in canola, flax, sunflower, soy, or cotton.

I. Definitions

Terms used herein will have their customary meaning in the art unless specified otherwise. The singular forms "a" and "the" include plural references unless stated otherwise. To the extent that the term "or" is employed (e.g., A or B) it is intended to mean "A or B or both." If this disclosure intends to indicate "only A or B but not both" then the term "only A or B but not both" will be employed. Thus, use of the term "or" herein is the inclusive and not the exclusive use.

The chemical moieties mentioned when defining variable positions within the general formulae described herein (e.g., the term "alkyl") are collective terms for the individual substituents encompassed by the chemical moiety. The prefix $C_n$-$C_m$ preceding a group or moiety indicates, in each case, the possible number of carbon atoms in the group or moiety that follows.

As used herein, the terms "herbicide" and "herbicidal active ingredient" may be understood to include an active ingredient that kills, controls, or otherwise adversely modifies the growth of vegetation, particularly undesirable vegetation such as weed species, when applied in an appropriate amount. As used herein, the term "prevents" or similar terms such as "preventing" may be understood by a person of ordinary skill to include any combination that shows herbicidal effect or reduces the competitive capability of the weed with respect to a crop.

As used herein, the term "herbicidal effect" may be understood to include an adversely modifying effect of an active ingredient on vegetation, including, for example, a deviation from natural growth or development, killing, regulation, desiccation, growth inhibition, growth reduction, and retardation. The term "herbicidal activity" refers generally to herbicidal effects of an active ingredient. As used herein, the term "prevents" or similar terms such as "preventing" may be understood by a person of ordinary skill to include any combination that shows herbicidal effect or reduces the competitive capability of the weed with respect to a crop.

As used herein, "applying" a herbicide or herbicidal composition refers to delivering it directly to the targeted vegetation or to the locus thereof or to the area where control of undesirable vegetation is desired. Methods of application include, but are not limited to, pre-emergently contacting soil or water, post-emergently contacting the undesirable vegetation, or contacting the area adjacent to the undesirable vegetation.

As used herein, the term "vegetation" can include, for instance, dormant seeds, germinating seeds, emerging seedlings, plants propagating from vegetative propagules, immature vegetation, and established vegetation.

As used herein, the term "crop" refers to desired vegetation, for instance, plants that are grown to provide food, shelter, pasture, erosion control, etc. Example crops include cereals, legumes, vegetables, orchard and timber trees, grapevines, etc. Preferably, herbicides or herbicidal compositions have zero or minimal herbicidal effect on crops.

As used herein, the term "undesirable vegetation" refers to vegetation that is not wanted in a given area, for instance, weed species. Herbicides or herbicidal compositions are used to control undesirable vegetation. Preferably, herbicides or herbicidal compositions have a large or complete herbicidal effect on undesirable vegetation.

As used herein, "active ingredient" or "ai" may be understood to include a chemical compound or composition that has an effect on vegetation, for example, a herbicidal effect or a safening effect on the vegetation.

As used herein, "acid equivalent" or "ae" may be understood to include the amount of the acid form of an active ingredient that is calculated from the amount of a salt or ester form of that active ingredient. For example, if the acid form of an active ingredient "Z" has a molecular weight of 100 Dalton, and the salt form of Z has a molecular weight of 130 Dalton, an application of 130 g ai/ha of the Z salt would be equal to applying 100 g ae/ha of the acid form of Z:

130 g ai/ha Z salt*(100 Da Z acid/130 Da Z salt)= 100 g ae/ha Z acid.

As used herein, unless otherwise specified, the term "acyl" may be understood to include a group of formula —C(O)R, where "C(O)" is short-hand notation for C=O. In the acyl group, the R may be alkyl (e.g., $C_1$-$C_6$ alkyl), haloalkyl (e.g., $C_1$-$C_6$ haloalkyl), alkenyl (e.g., $C_2$-$C_6$ alkenyl), haloalkenyl (e.g., $C_2$-$C_6$ haloalkenyl), alkynyl (e.g., $C_2$-$C_6$ alkynyl), aryl or heteroaryl, or arylalkyl (e.g., $C_7$-$C_{10}$ arylalkyl).

As used herein, the term "alkyl" may be understood to include straight-chained, branched, or cyclic saturated hydrocarbon moieties. Unless otherwise specified, $C_1$-$C_{20}$ (e.g., $C_1$-$C_{12}$, $C_1$-$C_{10}$, $C_1$-$C_8$, $C_1$-$C_6$, or $C_1$-$C_4$) alkyl groups are intended. Examples of alkyl groups include methyl, ethyl, propyl, cyclopropyl 1-methyl-ethyl, butyl, cyclobutyl, 1-methyl-propyl, 2-methyl-propyl, 1,1-dimethyl-ethyl, pentyl, cyclopentyl, 1-methyl-butyl, 2-methyl-butyl, 3-methyl-butyl, 2,2-dimethyl-propyl, 1-ethyl-propyl, hexyl, cyclohexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, and 1-ethyl-2-methyl-propyl. Alkyl substituents may also be substituted with one or more chemical moieties. Examples of suitable substituents include, for example, hydroxy, nitro, cyano, formyl, $C_1$-$C_6$ alkoxy, $C_1$-$C_6$ haloalkoxy, $C_1$-$C_6$ acyl, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl, $C_1$-$C_6$ haloalkylsulfonyl, $C_1$-$C_6$ alkoxycarbonyl, $C_1$-$C_6$ haloalkoxycarbonyl, $C_1$-$C_6$ carbamoyl, $C_1$-$C_6$ halocarbamoyl, hydroxycarbonyl, $C_1$-$C_6$ alkylcarbonyl, $C_1$-$C_6$ haloalkylcarbonyl, aminocarbonyl, $C_1$-$C_6$ alkylaminocarbonyl, haloalkylaminocarbonyl, $C_1$-$C_6$ dialkylaminocarbonyl, and $C_1$-$C_6$ dihaloalkylaminocarbonyl, provided that the substituents are sterically compatible and the rules of chemical bonding and strain energy are satisfied. Preferred substituents include cyano and $C_1$-$C_6$ alkoxy.

As used herein, the term "haloalkyl" may be understood to include alkyl groups wherein the hydrogen atoms may partially or entirely be substituted with halogen atoms. Unless otherwise specified, $C_1$-$C_{20}$ (e.g., $C_1$-$C_{12}$, $C_1$-$C_{10}$, $C_1$-$C_8$, $C_1$-$C_6$, or $C_1$-$C_4$) alkyl groups are intended. Examples include chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, 1-chloroethyl, 1-bromoethyl, 1-fluoroethyl, 2-fluoroethyl, 2,2-difluoroethyl, 2,2,2-trifluoroethyl, 2-chloro-2-fluoroethyl, 2-chloro-2,2-difluoroethyl, 2,2-dichloro-2-fluoroethyl, 2,2,2-trichloroethyl, pentafluoroethyl, and 1,1,1-trifluoroprop-2-yl. Haloalkyl substituents may also be substituted with one or more chemical moieties. Examples of suitable substituents include, for example, hydroxy, nitro, cyano, formyl, $C_1$-$C_6$ alkoxy, $C_1$-$C_6$ haloalkoxy, $C_1$-$C_6$ acyl, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl, $C_1$-$C_6$ haloalkylsulfonyl, $C_1$-$C_6$ alkoxycarbonyl, $C_1$-$C_6$ haloalkoxycarbonyl, $C_1$-$C_6$ carbamoyl, $C_1$-$C_6$ halocarbamoyl, hydroxycarbonyl, $C_1$-$C_6$ alkylcarbonyl, $C_1$-$C_6$ haloalkylcarbonyl, aminocarbonyl, $C_1$-$C_6$ alkylaminocarbonyl, haloalkylaminocarbonyl, $C_1$-$C_6$ dialkylaminocarbonyl, and $C_1$-$C_6$ dihaloalkylaminocarbonyl, provided that the substituents are sterically compatible and the rules of chemical bonding and strain energy are satisfied. Preferred substituents include cyano and $C_1$-$C_6$ alkoxy.

As used herein, the term "alkoxy" may be understood to include a group of the formula R—O—, where R is unsubstituted or substituted alkyl as defined above. Unless otherwise specified, alkoxy groups wherein R is a $C_1$-$C_{20}$ (e.g., $C_1$-$C_{12}$, $C_1$-$C_{10}$, $C_1$-$C_8$, $C_1$-$C_6$, or $C_1$-$C_4$) alkyl group are intended. Examples include methoxy, ethoxy, propoxy, 1-methyl-ethoxy, butoxy, 1-methyl-propoxy, 2-methyl-propoxy, 1,1-dimethyl-ethoxy, pentoxy, 1-methyl-butyloxy, 2-methyl-butoxy, 3-methyl-butoxy, 2,2-dimethyl-propoxy, 1-ethyl-propoxy, hexoxy, 1,1-dimethyl-propoxy, 1,2-dimethyl-propoxy, 1-methyl-pentoxy, 2-methyl-pentoxy, 3-methyl-pentoxy, 4-methyl-penoxy, 1,1-dimethyl-butoxy, 1,2-dimethyl-butoxy, 1,3-dimethyl-butoxy, 2,2-dimethyl-butoxy, 2,3-dimethyl-butoxy, 3,3-dimethyl-butoxy, 1-ethyl-butoxy, 2-ethylbutoxy, 1,1,2-trimethyl-propoxy, 1,2,2-trimethyl-propoxy, 1-ethyl-1-methyl-propoxy, and 1-ethyl-2-methyl-propoxy.

As used herein, the term "alkoxycarbonyl" may be understood to include a group of the formula —C(O)OR, where R is an unsubstituted or substituted alkyl as defined above. Unless otherwise specified, alkoxycarbonyl groups wherein R is a $C_1$-$C_{20}$ (e.g., $C_1$-$C_{12}$, $C_1$-$C_{10}$, $C_1$-$C_8$, $C_1$-$C_6$, or $C_1$-$C_4$) alkyl group are intended. Examples include methoxycarbonyl, ethoxycarbonyl, propoxycarbonyl, 1-methyl-ethoxycarbonyl, butoxycarbonyl, 1-methyl-propoxycarbonyl, 2-methyl-propoxycarbonyl, 1,1-dimethyl-ethoxycarbonyl, pentoxycarbonyl, 1-methyl-butoxycarbonyl, 2-methyl-butoxycarbonyl, 3-methyl-butoxycarbonyl, 2,2-dimethyl-propoxycarbonyl, 1-ethyl-propoxycarbonyl, hexoxycarbonyl, 1,1-dimethyl-propoxycarbonyl, 1,2-dimethyl-propoxycarbonyl, 1-methyl-pentoxycarbonyl, 2-methyl-pentoxycarbonyl, 3-methyl-pentoxycarbonyl, 4-methyl-penoxycarbonyl, 1,1-dimethyl-butoxycarbonyl, 1,2-dimethyl-butoxycarbonyl, 1,3-dimethyl-butoxycarbonyl, 2,2-dimethyl-butoxycarbonyl, 2,3-dimethyl-butoxycarbonyl, 3,3-dimethyl-butoxycarbonyl, 1-ethyl-butoxycarbonyl, 2-ethylbutoxycarbonyl, 1,1,2-trimethyl-propoxycarbonyl, 1,2,2-trimethyl-propoxycarbonyl, 1-ethyl-1-methyl-propoxycarbonyl, and 1-ethyl-2-methyl-propoxycarbonyl.

As used herein, the term "haloalkoxy" may be understood to include a group of the formula R—O—, where R is unsubstituted or substituted haloalkyl as defined above. Unless otherwise specified, haloalkoxy groups wherein R is a $C_1$-$C_{20}$ (e.g., $C_1$-$C_{12}$, $C_1$-$C_{10}$, $C_1$-$C_8$, $C_1$-$C_6$, or $C_1$-$C_4$) alkyl group are intended. Examples include chloromethoxy, bromomethoxy, dichloromethoxy, trichloromethoxy, fluoromethoxy, difluoromethoxy, trifluoromethoxy, chlorofluoromethoxy, dichlorofluoromethoxy, chlorodifluoromethoxy, 1-chloroethoxy, 1-bromoethoxy, 1-fluoroethoxy, 2-fluoroethoxy, 2,2-difluoroethoxy, 2,2,2-trifluoroethoxy, 2-chloro-2-fluoroethoxy, 2-chloro-2,2-difluoroethoxy, 2,2-dichloro-2-fluoroethoxy, 2,2,2-trichloroethoxy, pentafluoroethoxy, and 1,1,1-trifluoroprop-2-oxy.

As used herein, the term "aryl," as well as derivative terms such as aryloxy, may be understood to include groups that include a monovalent aromatic carbocyclic group of from 6 to 14 carbon atoms. Aryl groups can include a single ring or multiple condensed rings. In some aspects, aryl groups include $C_6$-$C_{10}$ aryl groups. Examples of aryl groups include, but are not limited to, phenyl, biphenyl, naphthyl, tetrahydronaphthyl, phenylcyclopropyl, and indanyl. In some aspects, the aryl group can be a phenyl, indanyl or naphthyl group.

As used herein, the term "heteroaryl," as well as derivative terms such as "heteroaryloxy," may be understood to include a 5- or 6-membered aromatic ring containing one or more heteroatoms, for example, N, O or S. Heteroaryl rings may be fused to other aromatic systems. The aryl or heteroaryl substituents may also be substituted with one or more chemical moieties. Examples of suitable substituents include, for example, hydroxy, nitro, cyano, formyl, $C_1$-$C_6$ alkyl, $C_2$-$C_6$ alkenyl, $C_2$-$C_6$ alkynyl, $C_1$-$C_6$ alkoxy, $C_1$-$C_6$ haloalkyl, $C_1$-$C_6$ haloalkoxy, $C_1$-$C_6$ acyl, $C_1$-$C_6$ alkylthio, $C_1$-$C_6$ alkylsulfinyl, $C_1$-$C_6$ alkylsulfonyl, $C_1$-$C_6$ alkoxycarbonyl, $C_1$-$C_6$ carbamoyl, hydroxycarbonyl, $C_1$-$C_6$ alkylcarbonyl, aminocarbonyl, $C_1$-$C_6$ alkylaminocarbonyl, $C_1$-$C_6$ dialkylaminocarbonyl, provided that the substituents are sterically compatible and the rules of chemical bonding and strain energy are satisfied. Preferred substituents include halogen, $C_1$-$C_4$ alkyl and $C_1$-$C_4$ haloalkyl.

As used herein, the term "halogen," including derivative terms such as "halo," refers to fluorine, chlorine, bromine and iodine.

As used herein, agriculturally acceptable salts and esters may be understood to include salts and esters that exhibit herbicidal activity, or that are or can be converted in plants, water, or soil to the referenced herbicide. Exemplary agriculturally acceptable esters are those that are or can be hydrolyzed, oxidized, metabolized, or otherwise converted, e.g., in plants, water, or soil, to the corresponding carboxylic acid which, depending on the pH, may be in the dissociated or undissociated form.

Compounds described herein can include N-oxides. Pyridine N-oxides can be obtained by oxidation of the corresponding pyridines. Suitable oxidation methods are described, for example, in Houben-Weyl, *Methoden der organischen Chemie* [*Methods in organic chemistry*], expanded and subsequent volumes to the 4th edition, volume E 7b, p. 565 f.

II. Pyridine Carboxylate Herbicides

Compositions and methods of the present disclosure include a composition comprising (a) a pyridine carboxylate herbicide defined by Formula (I):

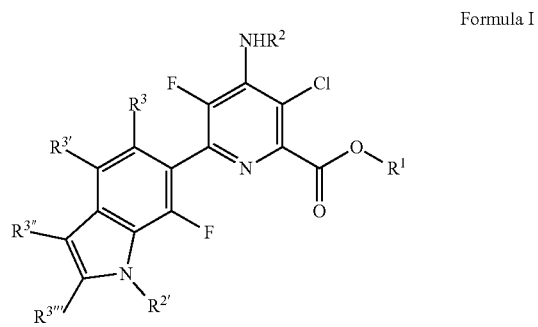

Formula I wherein:
  $R^1$ is cyanomethyl or propargyl;
  $R^2$ and $R^{2'}$ are independently hydrogen, $C_1$-$C_6$ alkyl, formyl, alkoxycarbonyl, or acyl;
  $R^3$, $R^{3'}$, $R^{3''}$, and $R^{3'''}$ are independently hydrogen, halogen, $C_1$-$C_4$ alkyl, $C_1$-$C_4$ haloalkyl, $C_1$-$C_3$ alkoxy, or $C_1$-$C_3$ haloalkoxy;
or an agriculturally acceptable N-oxide, salt, or ester thereof; and
(b) a photosystem II (PS II) inhibitor or an agriculturally acceptable salt or ester thereof.

In some aspects, the composition comprises:
(a) the pyridine carboxylate herbicide compound cyanomethyl 4-amino-3-chloro-5-fluoro-6-(7-fluoro-1H-indol-6-yl)pyridine-2-carboxylate, referred to hereinafter as Compound A:

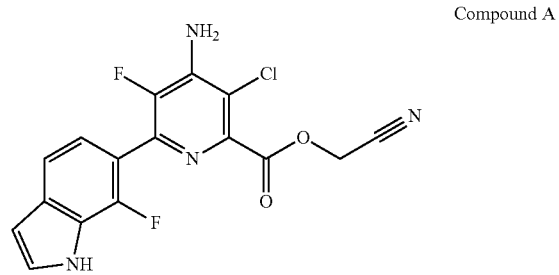 [SMILES: N#CCOC(=O)c1nc(-c2ccc3cc[nH]c3c2F)c(F)c(N)c1Cl]

Compound A or an agriculturally acceptable N-oxide, salt, or ester thereof; and
(b) a photosystem II (PS II) inhibitor or an agriculturally acceptable salt or ester thereof.

In some aspects, the composition comprises:
(a) the pyridine carboxylate herbicide compound propargyl 4-amino-3-chloro-5-fluoro-6-(7-fluoro-1H-indol-6-yl)pyridine-2-carboxylate, referred to hereinafter as Compound B:

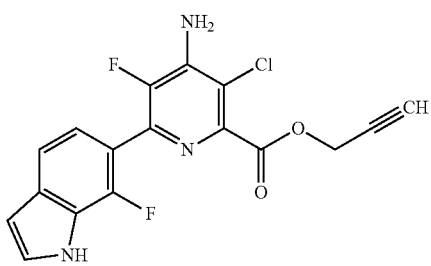

Compound B or an agriculturally acceptable N-oxide, salt, or ester thereof; and
(b) a photosystem II (PS II) inhibitor or an agriculturally acceptable salt or ester thereof.

In some aspects, compositions and methods of the present disclosure include a composition comprising (a) a pyridine carboxylate herbicide defined by Formula (I):

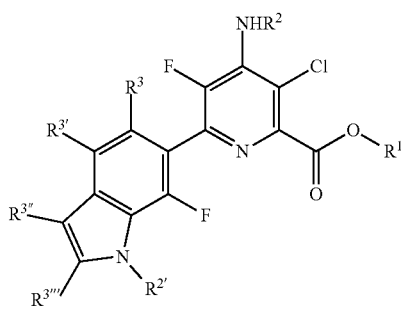

Formula I wherein:
$R^1$ is cyanomethyl or propargyl;
$R^2$ and $R^{2'}$ are independently hydrogen, $C_1$-$C_6$ alkyl, formyl, alkoxycarbonyl, or acyl;
$R^3$, $R^{3'}$, $R^{3''}$, and $R^{3'''}$ are independently hydrogen, halogen, $C_1$-$C_4$ alkyl, $C_1$-$C_4$ haloalkyl, $C_1$-$C_3$ alkoxy, or $C_1$-$C_3$ haloalkoxy;
or an agriculturally acceptable N-oxide, salt, or ester thereof;
(b) a photosystem II (PS II) inhibitor or an agriculturally acceptable salt or ester thereof; and
(c) a 4-hydroxyphenyl-pyruvate dioxygenase (HPPD) inhibitor or an agriculturally acceptable salt or ester thereof.

In some aspects, compositions and methods of the present disclosure include the composition comprising: (a) the pyridine carboxylate herbicide cyanomethyl 4-amino-3-chloro-5-fluoro-6-(7-fluoro-1H-indol-6-yl)pyridine-2-carboxylate, Compound A:

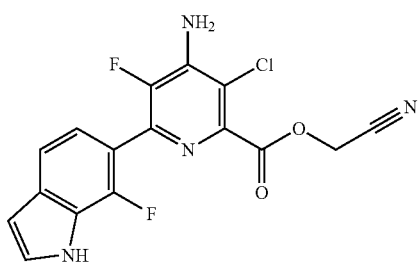

Compound A or an agriculturally acceptable N-oxide, salt, or ester thereof;
(b) a photosystem II (PS II) inhibitor or an agriculturally acceptable salt or ester thereof; and
(c) a 4-hydroxyphenyl-pyruvate dioxygenase (HPPD) inhibitor or an agriculturally acceptable salt or ester thereof.

In some aspects, compositions and methods of the present disclosure include the composition comprising: (a) the pyridine carboxylate herbicide propargyl 4-amino-3-chloro-5-fluoro-6-(7-fluoro-1H-indol-6-yl)pyridine-2-carboxylate, Compound B:

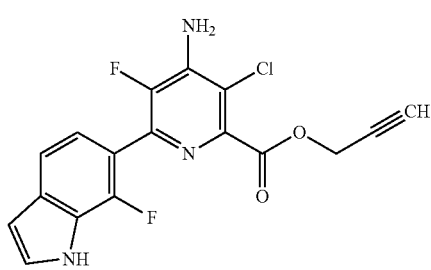

Compound B or an agriculturally acceptable N-oxide, salt, or ester thereof;
(b) a photosystem II (PS II) inhibitor or an agriculturally acceptable salt or ester thereof; and
(c) a 4-hydroxyphenyl-pyruvate dioxygenase (HPPD) inhibitor or an agriculturally acceptable salt or ester thereof.

Pyridine carboxylate herbicides defined by Formula (I), as well as methods of making these pyridine carboxylate herbicides, are disclosed in application PCT/US2018/031004, filed May 4, 2018, the entire disclosure of which is hereby expressly incorporated by reference.

In some aspects, the pyridine carboxylate herbicide can be provided as an agriculturally acceptable salt. Exemplary agriculturally acceptable salts of the pyridine carboxylate herbicides include, but are not limited to: sodium salts; potassium salts; ammonium salts or substituted ammonium salts, in particular mono-, di- and tri-$C_1$-$C_8$-alkylammonium salts such as methyl ammonium, dimethylammonium and isopropylammonium; mono-, di- and tri-hydroxy-$C_2$-$C_8$-alkylammonium salts such as hydroxyethylammonium, di(hydroxyethyl)ammonium, tri(hydroxyethyl)ammonium, hydroxypropylammonium, di(hydroxypropyl)ammonium and tri(hydroxypropyl)-ammonium salts; olamine salts; diglycolamine salts; choline salts; and quaternary ammonium salts such as those represented by the formula $R^9R^{10}R^{11}R^{12}N^+$ and wherein $R^9$, $R^{10}$, $R^{11}$ and $R^{12}$ (e.g., $R^9$-$R^{12}$) each independently can represent hydrogen, $C_1$-$C_{10}$ alkyl, $C_2$-$C_8$ alkenyl, $C_2$-$C_8$ alkynyl, $C_1$-$C_8$ alkoxy, $C_1$-$C_8$ alkylthio, or aryl groups, provided that $R^9$-$R^{12}$ are sterically compatible.

In some aspects, the pyridine carboxylate herbicide can be provided as an agriculturally acceptable ester. Exemplary agriculturally acceptable esters of the pyridine carboxylate herbicides include, but are not limited to: methyl, ethyl, propyl, 1-methyl-ethyl, butyl, 1-methyl-propyl, 2-methyl-propyl, pentyl, 1-methyl-butyl, 2-methyl-butyl, 3-methyl-butyl, 1-ethyl-propyl, hexyl, 1-methyl-hexyl (mexyl), 2-ethylhexyl, heptyl, 1-methyl-heptyl (meptyl), octyl, isooctyl (isoctyl), butoxyethyl (butotyl), and benzyl.

The pyridine carboxylate herbicide, or an agriculturally acceptable N-oxide, salt, or ester thereof, can be applied to vegetation or an area adjacent the vegetation or applied to soil or water to prevent the emergence or growth of vegetation in an amount sufficient to induce a herbicidal effect. In some aspects, the pyridine carboxylate herbicide, or an agriculturally acceptable N-oxide, salt, or ester thereof, is applied to vegetation or an area adjacent the vegetation or applied to soil or water to prevent the emergence or growth of vegetation in an amount of 0.1 grams acid equivalent per hectare (g ae/ha) or greater, such as 0.2 g ae/ha or greater, 0.3 g ae/ha or greater, 0.4 g ae/ha or greater, 0.5 g ae/ha or greater, 0.6 g ae/ha or greater, 0.7 g ae/ha or greater, 0.8 g ae/ha or greater, 0.9 g ae/ha or greater, 1 g ae/ha or greater, 1.1 g ae/ha or greater, 1.2 g ae/ha or greater, 1.3 g ae/ha or greater, 1.4 g ae/ha or greater, 1.5 g ae/ha or greater, 1.6 g ae/ha or greater, 1.7 g ae/ha or greater, 1.8 g ae/ha or greater, 1.9 g ae/ha or greater, 2 g ae/ha or greater, 2.25 g ae/ha or greater, 2.5 g ae/ha or greater, 2.75 g ae/ha or greater, 3 g ae/ha or greater, 4 g ae/ha or greater, 5 g ae/ha or greater, 6 g ae/ha or greater, 7 g ae/ha or greater, 8 g ae/ha or greater, 9 g ae/ha or greater, 10 g ae/ha or greater, 11 g ae/ha or greater, 12 g ae/ha or greater, 13 g ae/ha or greater, 14 g ae/ha or greater, 15 g ae/ha or greater, 16 g ae/ha or greater, 17 g ae/ha or greater, 18 g ae/ha or greater, 19 g ae/ha or greater, 20 g ae/ha or greater, 22 g ae/ha or greater, 24 g ae/ha or greater, 25 g ae/ha or greater, 26 g ae/ha or greater, 28 g ae/ha or greater, 30 g ae/ha or greater, 32 g ae/ha or greater, 34 g ae/ha or greater, 35 g ae/ha or greater, 36 g ae/ha or greater, 38 g ae/ha or greater, 40 g ae/ha or greater, 42.5 g ae/ha or greater, 45 g ae/ha or greater, 47.5 g ae/ha or greater, 50 g ae/ha or greater, 52.5 g ae/ha or greater, 55 g ae/ha or greater, 57.5 g ae/ha or greater, 60 g ae/ha or greater, 65 g ae/ha or greater, 70 g ae/ha or greater, 75 g ae/ha or greater, 80 g ae/ha or greater, 85 g ae/ha or greater, 90 g ae/ha or greater, 95 g ae/ha or greater, 100 g ae/ha or greater, 110 g ae/ha or greater, 120 g ae/ha or greater, 130 g ae/ha or greater, 140 g ae/ha or greater, 150 g ae/ha or greater, 160 g ae/ha or greater, 170 g ae/ha or greater, 180 g ae/ha or greater, 190 g ae/ha or greater, 200 g ae/ha or greater, 210 g ae/ha or greater, 220 g ae/ha or greater, 230 g ae/ha or greater, 240 g ae/ha or greater, 250 g ae/ha or greater, 260 g ae/ha or greater, 270 g ae/ha or greater, 280 g ae/ha or greater, or 290 g ae/ha or greater; in an amount of 300 g ae/ha or less, such as 290 g ae/ha or less, 280 g ae/ha or less, 270 g ae/ha or less, 260 g ae/ha or less, 250 g ae/ha or less, 240 g ae/ha or less, 230 g ae/ha or less, 220 g ae/ha or less, 210 g ae/ha or less, 200 g ae/ha or less, 190 g ae/ha or less, 180 g ae/ha or less, 170 g ae/ha or less, 160 g ae/ha or less, 150 g ae/ha or less, 140 g ae/ha or less, 130 g ae/ha or less, 120 g ae/ha or less, 110 g ae/ha or less, 100 g ae/ha or less, 95 g ae/ha or less, 90 g ae/ha or less, 85 g ae/ha or less, 80 g ae/ha or less, 75 g ae/ha or less, 70 g ae/ha or less, 65 g ae/ha or less, 60 g ae/ha or less, 57.5 g ae/ha or less, 55 g ae/ha or less, 52.5 g ae/ha or less, 50 g ae/ha or less, 47.5 g ae/ha or less, 45 g ae/ha or less, 42.5 g ae/ha or less, 40 g ae/ha or less, 38 g ae/ha or less, 36 g ae/ha or less, 35 g ae/ha or less, 34 g ae/ha or less, 32 g ae/ha or less, 30 g ae/ha or less, 28 g ae/ha or less, 26 g ae/ha or less, 25 g ae/ha or less, 24 g ae/ha or less, 22 g ae/ha or less, 20 g ae/ha or less, 19 g ae/ha or less, 18 g ae/ha or less, 17 g ae/ha or less, 16 g ae/ha or less, 15 g ae/ha or less, 14 g ae/ha or less, 13 g ae/ha or less, 12 g ae/ha or less, 11 g ae/ha or less, 10 g ae/ha or less, 9 g ae/ha or less, 8 g ae/ha or less, 7 g ae/ha or less, 6 g ae/ha or less, 5 g ae/ha or less, 4 g ae/ha or less, 3 g ae/ha or less, 2.75 g ae/ha or less, 2.5 g ae/ha or less, 2.25 g ae/ha or less, 2 g ae/ha or less, 1.9 g ae/ha or less, 1.8 g ae/ha or less, 1.7 g ae/ha or less, 1.6 g ae/ha or less, 1.5 g ae/ha or less, 1.4 g ae/ha or less, 1.3 g ae/ha or less, 1.2 g ae/ha or less, 1.1 g ae/ha or less, 1 g ae/ha or less, 0.9 g ae/ha or less, 0.8 g ae/ha or less, 0.7 g ae/ha or less, 0.6 g ae/ha or less, 0.5 g ae/ha or less, 0.4 g ae/ha or less, 0.3 g ae/ha or less, or 0.2 g ae/ha or less; or in an amount within any range defined between any pair of the preceding values, such as 0.1-300 g ae/ha, 1-150 g ae/ha, 10-200 g ae/ha, 25 g ae/ha-75 g ae/ha, or 40-100 g ae/ha.

III. Photosystem II Inhibitor Herbicides

In addition to the pyridine carboxylate herbicide or agriculturally acceptable N-oxide, salt or ester thereof, the compositions can include a photosystem II (PS II) inhibitor herbicide or agriculturally acceptable salt or ester thereof. Photosystem II inhibitors inhibit photosynthesis by binding to the photosystem II complex in the chloroplast. Examples of photosystem II inhibitors include phenylcarbamate herbicides, pyridazinone herbicides, triazolinone herbicides, triazine herbicides, urea herbicides, uracil herbicides, amide herbicides, nitrile herbicides, and phenylpyridazine herbicides.

In some aspects, the composition can include a PS II inhibitor herbicide selected from the group consisting of ametryne, amicarbazone, atrazine, bentazone, bromacil, bromofenoxim, bromoxynil, chlorbromuron, chloridazon, chlorotoluron, chloroxuron, cyanazine, desmedipham, desmetryn, dimefuron, dimethametryn, diuron, ethidimuron, ethiozin, fenuron, fluometuron, hexazinone, iodobonil, ioxynil, isocil, isomethiozin, isoproturon, isouron, karbutilate, lenacil, linuron, metamitron, methabenzthiazuron, metobromuron, metoxuron, metribuzin, monolinuron, neburon, pentanochlor, phenmedipham, prometon, prometryn, propanil, propazine, pyridafol, pyridate, siduron, simazine, simetryne, tebuthiuron, terbacil, terbumeton, terbuthylazine, terbutryn, trietazine, and combinations thereof.

The PS II inhibitor herbicide or agriculturally acceptable salt or ester thereof can be applied to vegetation or an area adjacent the vegetation or applied to soil or water to prevent the emergence or growth of vegetation in an amount sufficient to induce a herbicidal effect. In some aspects, the PS II inhibitor herbicide or agriculturally acceptable salt or ester thereof is applied to vegetation or an area adjacent the vegetation or applied to soil or water to prevent the emergence or growth of vegetation in an amount of 5 grams active ingredient per hectare (g ai/ha) or more, such as 10 g ai/ha or more, 15 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, 100 g ai/ha or more, 110 g ai/ha or more, 120 g ai/ha or more, 130 g ai/ha or more, 140 g ai/ha or more, 150 g ai/ha or more, 160 g ai/ha or more, 170 g ai/ha or more, 180 g ai/ha or more, 190 g ai/ha or more, 200 g ai/ha or more, 210 g ai/ha or more, 220 g ai/ha or more, 230 g ai/ha or more, 240 g ai/ha or more, 250 g ai/ha or more, 260 g ai/ha or more, 270 g ai/ha or more, 280 g ai/ha or more, 290 g ai/ha or more, 300 g ai/ha or more, 310 g ai/ha or more, 320 g ai/ha or more, 330 g ai/ha or more, 340 g ai/ha or more, 350 g ai/ha or more, 360 g ai/ha or more, 370 g ai/ha or more, 380 g ai/ha or more, 390 g ai/ha or more, 400 g ai/ha or more, 420 g ai/ha or more, 440 g ai/ha or more, 460 g ai/ha or more, 480 g ai/ha or more, 500 g ai/ha or more, 520 g ai/ha or more, 540 g ai/ha or more, 560 g ai/ha or more, 580 g ai/ha or more, 600 g ai/ha or more, 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, 975 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2300 g ai/ha or more, 2400 g ai/ha or more, 2500 g ai/ha or more, 2600 g ai/ha or more, 2700 g ai/ha or more, 2800 g ai/ha or more, 2900 g ai/ha or more, 3000 g ai/ha or more, 3100 g ai/ha or more, 3200 g ai/ha or more, 3300 g ai/ha or more, 3400 g ai/ha or more, 3500 g ai/ha or more, 3600 g ai/ha or more, 3700 g ai/ha or more, 3800 g ai/ha or more, 3900 g ai/ha or more, 4000 g ai/ha or more, 5000 g ail/ha or more, 6000 g ai/ha or more, 7000 g ail/ha or more, 8000 g ai/ha or more, 9000 g ail/ha or more, 10,000 g ai/ha or more, 12,000 g ail/ha or more, 14,000 g ai/ha or more, 15,000 g ail/ha or more, 16000 g ai/ha or more, or 17,000 g ail/ha or more; in an amount of 18,000 g ai/ha or less, such as 17,000 g ai/ha or less, 16,000 g ai/ha or less, 15,000 g ai/ha or less, 14,000 g ai/ha or less, 12,000 g ai/ha or less, 10,000 g ai/ha or less, 9000 g ai/ha or less, 8000 g ai/ha or less, 7000 g ai/ha or less, 6000 g ai/ha or less, 5000 g ai/ha or less, 4000 g ai/ha or less, 3900 g ai/ha or less, 3800 g ai/ha or less, 3700 g ai/ha or less, 3600 g ai/ha or less, 3500 g ai/ha or less, 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 580 g ai/ha or less, 560 g ai/ha or less, 540 g ai/ha or less, 520 g ai/ha or less, 500 g ai/ha or less, 480 g ai/ha or less, 460 g ai/ha or less, 440 g ai/ha or less, 420 g ai/ha or less, 400 g ai/ha or less, 390 g ai/ha or less, 380 g ai/ha or less, 370 g ai/ha or less, 360 g ai/ha or less, 350 g ai/ha or less, 340 g ai/ha or less, 330 g ai/ha or less, 320 g ai/ha or less, 310 g ai/ha or less, 300 g ai/ha or less, 290 g ai/ha or less, 280 g ai/ha or less, 270 g ai/ha or less, 260 g ai/ha or less, 250 g ai/ha or less, 240 g ai/ha or less, 230 g ai/ha or less, 220 g ai/ha or less, 210 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 15 g ai/ha or less, or 10 g ai/ha or less; or in an amount ranging from any of the minimum values described above to any of the maximum values described above, such as 5-4000 g ai/ha, 5-3000 g ai/ha, 3000-4000 g ai/ha, 5-2900 g ai/ha, 5-2800 g ai/ha, 5-2700 g ai/ha, 5-2600 g ai/ha, 5-2500 g ai/ha, 5-2400 g ai/ha, 5-2300 g ai/ha, 5-2200 g ai/ha, 5-2100 g ai/ha, 5-2000 g ai/ha, 5-1800 g ai/ha, 5-1600 g ai/ha, 5-1400 g ai/ha, 5-1200 g ai/ha, 5-1000 g ai/ha, 5-900 g ai/ha, 5-800 g ai/ha, 5-700 g ai/ha, 5-600 g ai/ha, 5-500 g ai/ha, 10-4000 g ai/ha, 10-3000 g ai/ha, 10-2000 g ai/ha, 20-4000 g ai/ha, 20-3000 g ai/ha, 20-2000 g ai/ha, 20-1500 g ai/ha, 30-4000 g ai/ha, 30-3000 g ai/ha, 30-2000 g ai/ha, 50-4000 g ai/ha, 50-3000 g ai/ha, 50-2000 g ai/ha, 50-1500 g ai/ha, 70-4000 g ai/ha, 70-3000 g ai/ha, 70-2500 g ai/ha, 70-2000 g ai/ha, 70-1500 g ai/ha, 100-3000 g ai/ha, 100-2500 g ai/ha, or 100-2000 g ai/ha. In some aspects, the photosystem II inhibitor or agriculturally acceptable salt or ester thereof is applied to vegetation or an area adjacent the vegetation or applied to soil or water to prevent the emergence or growth of vegetation in an amount of from 30-1000 g ai/ha.

In some aspects, the composition contains (a) a pyridine carboxylate herbicide or an agriculturally acceptable N-oxide, salt, or ester thereof, and (b) ametryne, amicarbazone, atrazine, bentazone, bromacil, bromofenoxim, bromoxynil, chlorbromuron, chloridazon, chlorotoluron, chloroxuron, cyanazine, desmedipham, desmetryn, dimefuron, dimethametryn, diuron, ethidimuron, ethiozin, fenuron, fluometuron, hexazinone, iodobonil, ioxynil, isocil, isomethiozin, isoproturon, isouron, karbutilate, lenacil, linuron, metamitron, methabenzthiazuron, methoprotryne, metobromuron, metoxuron, metribuzin, monolinuron, neburon, pentanochlor, phenmedipham, prometon, prometryn, propanil, propazine, pyridafol, pyridate, siduron, simazine, simetryne, tebuthiuron, terbacil, terbumeton, terbuthylazine, terbutryn, trietazine, or mixtures thereof.

Ametryn

In some aspects, the PS II inhibitor herbicide can comprise ametryn or an agriculturally acceptable salt or ester thereof. Ametryn, shown below, is $N^2$-ethyl-$N^4$-isopropyl-6-(methylthio)-1,3,4-triazine-2,4-diamine. Its herbicidal activity is exemplified in Tomlin, C. D. S., Ed. *The Pesticide Manual: A World Compendium*, $17^{th}$ ed.; BCPC: Alton, 2016 (hereafter "*The Pesticide Manual*, Seventeenth Edition, 2016"). Exemplary uses of ametryn include its use for pre- and early post-emergence control of annual grass and broadleaf weeds in pineapples, sugar cane, maize, bananas, cassava, sisal, and orchards.

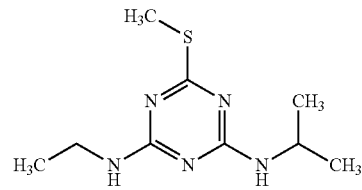

Ametryn can be applied to vegetation or an area adjacent the vegetation or applied to soil or water to prevent the emergence or growth of vegetation in an amount sufficient to induce a herbicidal effect. In some aspects, ametryn is applied to vegetation or an area adjacent the vegetation or applied to soil or water to prevent the emergence or growth of vegetation in an amount of 2000 g ai/ha or more, such as 2100 g ai/ha or more, 2200 g ai/ha or more, 2300 g ai/ha or more, 2400 g ai/ha or more, 2500 g ai/ha or more, 2600 g ai/ha or more, 2700 g ai/ha or more, 2800 g ai/ha or more, 2900 g ai/ha or more, 3000 g ai/ha or more, 3100 g ai/ha or more, 3200 g ai/ha or more, 3300 g ai/ha or more, 3400 g ai/ha or more, 3500 g ai/ha or more, 3600 g ai/ha or more, 3700 g ai/ha or more, 3800 g ai/ha or more, or 3900 g ai/ha or more; in an amount of 4000 g ai/ha or less, such as 3900 g ai/ha or less, 3800 g ai/ha or less, 3700 g ai/ha or less, 3600 g ai/ha or less, 3500 g ai/ha or less, 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2200 g ai/ha or less, or 2100 g ai/ha or less; or in an amount ranging from any of the minimum values described above to any of the maximum values described above, such as 2000-4000 g ai/ha, 2100-2500 g ai/ha, 2600-3700 g ai/ha, 2500-4000 g ai/ha, 2900-3600 g al/ha, 3200-3800 g ai/ha, 2300-3700 g ai/ha, or 2200-3900 g ai/ha.

Amicarbazone

In some aspects, the PDS inhibitor herbicide can comprise amicarbazone or an agriculturally acceptable salt or ester thereof. Amicarbazone, shown below, is 4-amino-N-tert-butyl-4,5-dihydro-3-isopropyl-5-oxo-1H-1,2,4-triazole-1-carboxamide. Its herbicidal activity is exemplified in *The Pesticide Manual*, Seventeenth Edition, 2016. Exemplary uses of amicarbazone include its use for pre-emergence control of annual broadleaf weeds in maize, pre- and post-emergence control of annual broadleaf and grass weeds in sugar cane, and post-emergence control of annual broadleaf and grass weeds in turf, and conifers.

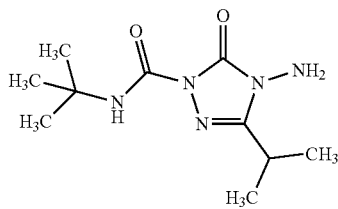

Amicarbazone can be applied to vegetation or an area adjacent the vegetation or applied to soil or water to prevent the emergence or growth of vegetation in an amount sufficient to induce a herbicidal effect. In some aspects, amicarbazone is applied to vegetation or an area adjacent the vegetation or applied to soil or water to prevent the emergence or growth of vegetation in an amount of 100 g ai/ha or more, such as 105 g ai/ha or more, 110 g ai/ha or more, 115 g ai/ha or more, 120 g ai/ha or more, 125 g ai/ha or more, 130 g ai/ha or more, 135 g ai/ha or more, 140 g ai/ha or more, 145 g ai/ha or more, 150 g ai/ha or more, 155 g ai/ha or more, 160 g ai/ha or more, 165 g ai/ha or more, 170 g ai/ha or more, 175 g ai/ha or more, 180 g ai/ha or more, 185 g ai/ha or more, 190 g ai/ha or more, 200 g ai/ha or more, 210 g ai/ha or more, 220 g ai/ha or more, 230 g ai/ha or more, 240 g ai/ha or more, 250 g ai/ha or more, 260 g ai/ha or more, 270 g ai/ha or more, 280 g ai/ha or more, 290 g ai/ha or more, 300 g ai/ha or more, 310 g ai/ha or more, 320 g ai/ha or more, 330 g ai/ha or more, 340 g ai/ha or more, 350 g ai/ha or more, 360 g ai/ha or more, 370 g ai/ha or more, 380 g ai/ha or more, 390 g ai/ha or more, 400 g ai/ha or more, 420 g ai/ha or more, 440 g ai/ha or more, 460 g ai/ha or more, 480 g ai/ha or more, 500 g ai/ha or more, 520 g ai/ha or more, 540 g ai/ha or more, 560 g ai/ha or more, 580 g ai/ha or more, 600 g ai/ha or more, 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, or 975 g ai/ha or more; in an amount of 1000 g ai/ha or less, such as 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 580 g ai/ha or less, 560 g ai/ha or less, 540 g ai/ha or less, 520 g ai/ha or less, 500 g ai/ha or less, 480 g ai/ha or less, 460 g ai/ha or less, 440 g ai/ha or less, 420 g ai/ha or less, 400 g ai/ha or less, 390 g ai/ha or less, 380 g ai/ha or less, 370 g ai/ha or less, 360 g ai/ha or less, 350 g ai/ha or less, 340 g ai/ha or less, 330 g ai/ha or less, 320 g ai/ha or less, 310 g ai/ha or less, 300 g ai/ha or less, 290 g ai/ha or less, 280 g ai/ha or less, 270 g ai/ha or less, 260 g ai/ha or less, 250 g ai/ha or less, 240 g ai/ha or less, 230 g ai/ha or less, 220 g ai/ha or less, 210 g ai/ha or less, 200 g ai/ha or less, 190 g ai/ha or less, 185 g ai/ha or less, 180 g ai/ha or less, 175 g ai/ha or less, 170 g ai/ha or less, 165 g ai/ha or less, 160 g ai/ha or less, 155 g ai/ha or less, 150 g ai/ha or less, 145 g ai/ha or less, 140 g ai/ha or less, 135 g ai/ha or less, 130 g ai/ha or less, 125 g ai/ha or less, 120 g ai/ha or less, 115 g ai/ha or less, 110 g ai/ha or less, or 105 g ai/ha or less; or in an amount ranging from any of the minimum values described above to any of the maximum values described above, such as 100-1000 g ai/ha, 125-750 g ai/ha, 160-675 g ai/ha, 220-850 g ai/ha, 370-900 g ai/ha, 275-650 g ai/ha, 480-800 g ai/ha, 340-900 g ai/ha, 520-925 g ai/ha, 290-560 g ai/ha, 390-825 g ai/ha, or 105-975 g ai/ha.

Atrazine

In some aspects, the PDS inhibitor herbicide can comprise atrazine or an agriculturally acceptable salt or ester thereof. Atrazine, shown below, is 6-chloro-$N^2$-ethyl-$N^4$-isopropyl-1,3,5-triazine-2,4-diamine. Its herbicidal activity is exemplified in *The Pesticide Manual*, Seventeenth Edition, 2016. Exemplary uses of atrazine include its use as a pre- and post-emergence control of annual broadleaf and grass weeds in maize, sorghum, sugar cane, pineapples, chemical fallow, grassland, macadamia nuts, conifers, and industrial weed control.

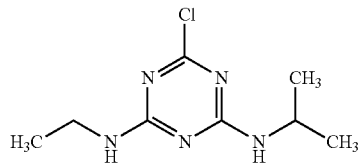

Atrazine can be applied to vegetation or an area adjacent the vegetation or applied to water to prevent the emergence or growth of vegetation in an amount sufficient to induce a herbicidal effect. In some aspects, atrazine can be applied to water to prevent the emergence or growth of vegetation in an amount of 300 g ai/ha or more, such as 320 g ai/ha or more, 340 g ai/ha or more, 360 g ai/ha or more, 380 g ai/ha or more, 420 g ai/ha or more, 440 g ai/ha or more, 460 g ai/ha or more, 480 g ai/ha or more, 500 g ai/ha or more, 525 g ai/ha or more, 550 g ai/ha or more, 575 g ai/ha or more, 600 g ai/ha or more, 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, 975 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2300 g ai/ha or more, 2400 g ai/ha or more, 2500 g ai/ha or more, 2600 g ai/ha or more, 2700 g ai/ha or more, 2800 g ai/ha or more, 2900 g ai/ha or more, 3000 g ai/ha or more, 3100 g ai/ha or more, 3200 g ai/ha or more, 3300 g ai/ha or more, 3400 g ai/ha or more, 3500 g ai/ha or more, 3600 g ai/ha or more, 3700 g ai/ha or more, 3800 g ai/ha or more, or 3900 g ai/ha or more; in an amount of 4000 g ai/ha or less, such as 3900 g ai/ha or less, 3800 g ai/ha or less, 3700 g ai/ha or less, 3600 g ai/ha or less, 3500 g ai/ha or less, 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 575 g ai/ha or less, 550 g ai/ha or less, 525 g ai/ha or less, 500 g ai/ha or less, 480 g ai/ha or less, 460 g ai/ha or less, 440 g ai/ha or less, 420 g ai/ha or less, 400 g ai/ha or less, 380 g ai/ha or less, 360 g ai/ha or less, 340 g ai/ha or less, or 320 g ai/ha or less; or in an amount ranging from any of the minimum values described above to any of the maximum values described above, such as 300-4000 g ai/ha, 480-2700 g ai/ha, 850-3800 g ai/ha, 600-2600 g ai/ha, 1300-3100 g ai/ha, 1500-3000 g ai/ha, 2400-3700 g ai/ha, or 340-3900 g ai/ha.

Bentazone

In some aspects, the PDS inhibitor herbicide can comprise bentazone or an agriculturally acceptable salt or ester thereof. Bentazone, shown below, is 3-isopropyl-1H-2,1,3-benzothiadiazin-4(3H)-one 2,2-dioxide. Its herbicidal activity is exemplified in *The Pesticide Manual*, Seventeenth Edition, 2016. Exemplary uses of bentazone include its use for post-emergence control of broadleaf weeds in winter and spring cereals, peanuts, maize, peas, beans, rice, and soybeans.

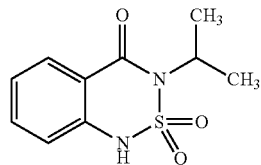 [SMILES: CC(C)N1C(=O)c2ccccc2NS1(=O)=O]

Bentazone can be applied to vegetation or an area adjacent the vegetation or applied to soil or water to prevent the emergence or growth of vegetation in an amount sufficient to induce a herbicidal effect. In some aspects, bentazone is applied to vegetation or an area adjacent the vegetation or applied to soil or water to prevent the emergence or growth of vegetation in an amount of 50 g ai/ha or more, such as 100 g ai/ha or more, 150 g ai/ha or more, 200 g ai/ha or more, 250 g ai/ha or more, 300 g ai/ha or more, 350 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, or 2100 g ai/ha or more; in an amount of 2200 g ai/ha or less, such as 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 350 g ai/ha or less, 300 g ai/ha or less, 250 g ai/ha or less, 200 g ai/ha or less, 150 g ai/ha or less, or 100 g ai/ha or less; or in an amount ranging from any of the minimum values described above to any of the maximum values described above, such as 50-2200 g ai/ha, 100-1700 g ai/ha, 300-1800 g ai/ha, 150-1900 g ai/ha, 450-2100 g ai/ha, 250-1600 g ai/ha, 700-1900 g ai/ha, or 100-2100 g ai/ha.

Bromacil

In some aspects, the PDS inhibitor herbicide can comprise bromacil or an agriculturally acceptable salt or ester thereof. Bromacil, shown below, is 5-bromo-3-sec-butyl-6-methyluracil. Its herbicidal activity is exemplified in *The Pesticide Manual*, Seventeenth Edition, 2016. Exemplary uses of bromacil include its use for pre- and post-emergence control of broadleaf and grass weeds in citrus, pineapple, and total weed and brush control in non-crop lands.

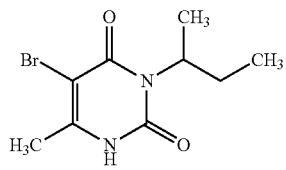

Bromacil can be applied to vegetation or an area adjacent the vegetation or applied to soil or water to prevent the emergence or growth of vegetation in an amount sufficient to induce a herbicidal effect. In some aspects, bromacil is applied to vegetation or an area adjacent the vegetation or applied to soil or water to prevent the emergence or growth of vegetation in an amount of 1500 g ai/ha or more, such as 1600 g ai/ha or more, 1750 g ai/ha or more, 2000 g ai/ha or more, 2250 g ai/ha or more, 2500 g ai/ha or more, 2750 g ai/ha or more, 3000 g ai/ha or more, 3500 g ai/ha or more, 4000 g ai/ha or more, 4500 g ai/ha or more, 5000 g ai/ha or more, 6000 g ai/ha or more, 7000 g ai/ha or more, 7500 g ai/ha or more, 8000 g ai/ha or more, 9000 g ai/ha or more, 10,000 g ai/ha or more, 11,000 g ai/ha or more, 12,000 g ai/ha or more, 13,000 g ai/ha or more, 14,000 g ai/ha or more, or 14,500 g ai/ha or more; in an amount of 15,000 g ai/ha or less, such as 14,500 g ai/ha or less, 14,000 g ai/ha or less, 13,000 g ai/ha or less, 12,000 g ai/ha or less, 11,000 g ai/ha or less, 10,000 g ai/ha or less, 9000 g ai/ha or less, 8000 g ai/ha or less, 7500 g ai/ha or less, 7000 g ai/ha or less, 6000 g ai/ha or less, 5000 g ai/ha or less, 4500 g ai/ha or less, 4000 g ai/ha or less, 3500 g ai/ha or less, 3000 g ai/ha or less, 2750 g ai/ha or less, 2500 g ai/ha or less, 2250 g ai/ha or less, 2000 g ai/ha or less, 1750 g ai/ha or less, or 1600 g ai/ha or less; or in an amount ranging from any of the minimum values described above to any of the maximum values described above, such as 1500-15,000 g ai/ha, 2500-13,000 g ai/ha, 6000-9000 g ai/ha, 8000-14,000 g ai/ha, 4500-11,000 g ai/ha, 2750-7500 g ai/ha, 3000-12,000 g ai/ha, 7000-10,000 g ai/ha, 4000-12,000 g ai/ha, or 1600-14,500 g ai/ha.

Bromofenoxim

In some aspects, the PDS inhibitor herbicide can comprise bromofenoxim or an agriculturally acceptable salt or ester thereof. Bromofenoxim, shown below, is 3,5-dibromo-4-hydroxybenzaldehyde 2,4-dinitrophenyloxime. Its herbicidal activity is exemplified in *The Pesticide Manual*, Seventeenth Edition, 2016. Exemplary uses of bromofenoxim include its use for post-emergence control of many annual broadleaf weeds in cereals, maize, grass-seed crops, grassland, and new-seeded turf.

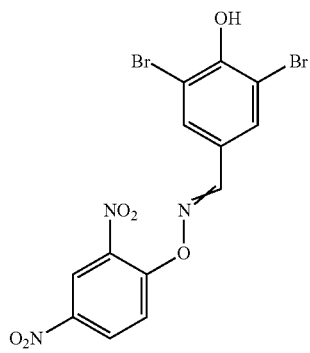 [SMILES: O=[N+]([O-])c1ccc(ON=Cc2cc(Br)c(O)c(Br)c2)c([N+](=O)[O-])c1]

Bromofenoxim can be applied to vegetation or an area adjacent the vegetation or applied to soil or water to prevent the emergence or growth of vegetation in an amount sufficient to induce a herbicidal effect. In some aspects, bromofenoxim is applied to vegetation or an area adjacent the vegetation or applied to soil or water to prevent the emergence or growth of vegetation in an amount of 1000 g ai/ha or more, such as 1050 g ai/ha or more, 1100 g ai/ha or more, 1150 g ai/ha or more, 1200 g ai/ha or more, 1250 g ai/ha or more, 1300 g ai/ha or more, 1350 g ai/ha or more, 1400 g ai/ha or more, 1450 g ai/ha or more, 1500 g ai/ha or more, 1600 g ai/ha or more, 1700 g ai/ha or more, 1750 g ai/ha or more, 1800 g ai/ha or more, 1900 g ai/ha or more, 2000 g ai/ha or more, 2050 g ai/ha or more, 2100 g ai/ha or more, 2150 g ai/ha or more, 2200 g ai/ha or more, or 2250 g ai/ha or more; in an amount of 2300 g ai/ha or less such as 2250 g ai/ha or less, 2240 g ai/ha or less, 2200 g ai/ha or less, 2150 g ai/ha or less, 2100 g ai/ha or less, 2050 g ai/ha or less, 2000 g ai/ha or less, 1900 g ai/ha or less, 1800 g ai/ha or less, 1750 g ai/ha or less, 1700 g ai/ha or less, 1600 g ai/ha or less, 1500 g ai/ha or less, 1450 g ai/ha or less, 1400 g ai/ha or less, 1350 g ai/ha or less, 1300 g ai/ha or less, 1250 g ai/ha or less, 1240 g ai/ha or less, 1200 g ai/ha or less, 1150 g ai/ha or less, 1100 g ai/ha or less, or 1050 g ai/ha or less; or in an amount ranging from any of the minimum values described above to any of the maximum values described above, such as 1000-2300 g ai/ha, 1200-1600 g ai/ha, 1450-2100 g ai/ha, 1100-1900 g ai/ha, 1700-2200 g ai/ha, 1300-2050 g ai/ha, or 1050-2200 g ai/ha.

Bromoxynil

In some aspects, the PDS inhibitor herbicide can comprise bromoxynil or an agriculturally acceptable salt or ester thereof. Bromoxynil, shown below, is 3,5-dibromo-4-hydroxbenzonitrile. Its herbicidal activity is exemplified in *The Pesticide Manual*, Seventeenth Edition, 2016. Exemplary uses of bromoxynil include its use as in post-emergence control of annual broadleaf weeds in cereals, ryegrass seed crops, turf and non-crop land, maize, and sorghum.

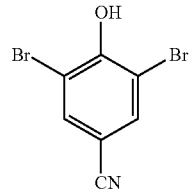

Bromoxynil can be applied to vegetation or an area adjacent the vegetation or applied to soil or water to prevent the emergence or growth of vegetation in an amount sufficient to induce a herbicidal effect. In some aspects, bromoxynil is applied to vegetation or an area adjacent the vegetation or applied to soil or water to prevent the emergence or growth of vegetation in an amount of 50 g ai/ha or more, such as 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, 100 g ai/ha or more, 110 g ai/ha or more, 120 g ai/ha or more, 130 g ai/ha or more, 140 g ai/ha or more, 150 g ai/ha or more, 160 g ai/ha or more, 170 g ai/ha or more, 180 g ai/ha or more, 190 g ai/ha or more, 200 g ai/ha or more, 210 g ai/ha or more, 220 g ai/ha or more, 230 g ai/ha or more, 240 g ai/ha or more, 250 g ai/ha or more, 260 g ai/ha or more, 270 g ai/ha or more, 280 g ai/ha or more, 290 g ai/ha or more, 300 g ai/ha or more, 310 g ai/ha or more, 320 g ai/ha or more, 330 g ai/ha or more, 340 g ai/ha or more, 350 g ai/ha or more, 360 g ai/ha or more, 370 g ai/ha or more, 380 g ai/ha or more, 390 g ai/ha or more, 400 g ai/ha or more, 420 g ai/ha or more, 440 g ai/ha or more, 460 g ai/ha or more, 480 g ai/ha or more, or 490 g ai/ha or more; in an amount of 500 g ai/ha or less, such as 490 g ai/ha or less, 480 g ai/ha or less, 460 g ai/ha or less, 440 g ai/ha or less, 420 g ai/ha or less, 400 g ai/ha or less, 390 g ai/ha or less, 380 g ai/ha or less, 370 g ai/ha or less, 360 g ai/ha or less, 350 g ai/ha or less, 340 g ai/ha or less, 330 g ai/ha or less, 320 g ai/ha or less, 310 g ai/ha or less, 300 g ai/ha or less, 290 g ai/ha or less, 280 g ai/ha or less, 270 g ai/ha or less, 260 g ai/ha or less, 250 g ai/ha or less, 240 g ai/ha or less, 230 g ai/ha or less, 220 g ai/ha or less, 210 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, or 55 g ai/ha or less; or in an amount ranging from any of the minimum values described above to any of the maximum values described above, such as 50-500 g ai/ha. 80-490 g ai/ha, 60-380 g ai/ha, 200-440 g ai/ha, 130-370 g ai/ha, 260-490 g ai/ha, 320-500 g ai/ha, 400-480 g ai/ha, 240-460 g ai/ha, or 55-490 g ai/ha.

Chlorbromuron

In some aspects, the PS-II inhibitor herbicide can comprise chlorbromuron or an agriculturally acceptable salt or ester thereof. Chlorbromuron, shown below, is 3-(4-bromo-3-chlorophenyl)-1-methoxy-1-methylurea. Its herbicidal activity is exemplified in *The Pesticide Manual*, Seventeenth Edition, 2016. Exemplary uses of chlorbromuron include pre-emergence use on carrots, peas, potatoes, soybeans, and sunflowers.

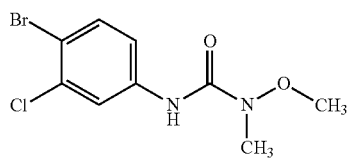

Chlorbromuron can be applied to vegetation or an area adjacent the vegetation or applied to soil or water to prevent the emergence or growth of vegetation in an amount sufficient to induce a herbicidal effect. In some aspects, chlorbromuron is applied to vegetation or an area adjacent the vegetation or applied to soil or water to prevent the emergence or growth of vegetation in an amount of 1000 g ai/ha or more, such as 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2300 g ai/ha or more, 2400 g ai/ha or more, or 2450 g ai/ha or more; in an amount of 2500 g ai/ha or less, such as 2450 g ai/ha or less, 2400 g ai/ha or less, 2300 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, or 1100 g ai/ha or less; or in an amount ranging from any of the minimum values described above to any of the maximum values described above, such as 1000-2500 g ai/ha, 1300-2100 g ai/ha, 1200-1900 g ai/ha, 1500-2400 g ai/ha, 1100-2200 g ai/ha, 1200-2500 g ai/ha, 1600-2300 g ai/ha, or 1100-2450 g ai/ha.

Chloridazon

In some aspects, the PS-II inhibitor herbicide can comprise chloridazon or an agriculturally acceptable salt or ester thereof. Chloridazon, shown below, is 5-amino-4-chloro-2-phenylpyridazin-3(2H)-one. Its herbicidal activity is exemplified in The Pesticide Manual, Seventeenth Edition, 2016. Exemplary uses of chloridazon include its use for pre- and post-emergence or pre-plant control of annual broadleaf weeds in sugar beets, fodder beets, and beetroot.

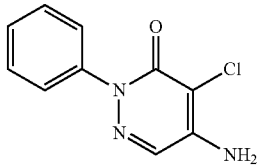 [SMILES: Nc1cnn(-c2ccccc2)c(=O)c1Cl]

Chloridazon can be applied to vegetation or an area adjacent the vegetation or applied to soil or water to prevent the emergence or growth of vegetation in an amount sufficient to induce a herbicidal effect. In some aspects, chloridazon is applied to vegetation or an area adjacent the vegetation or applied to soil or water to prevent the emergence or growth of vegetation in an amount of 1300 g ai/ha or more, such as 1350 g ai/ha or more, 1400 g ai/ha or more, 1450 g ai/ha or more, 1500 g ai/ha or more, 1550 g ai/ha or more, 1600 g ai/ha or more, 1650 g ai/ha or more, 1700 g ai/ha or more, 1750 g ai/ha or more, 1800 g ai/ha or more, 1850 g ai/ha or more, 1900 g ai/ha or more, 1950 g ai/ha or more, 2000 g ai/ha or more, 2050 g ai/ha or more, 2100 g ai/ha or more, 2150 g ai/ha or more, 2200 g ai/ha or more, 2240 g ai/ha or more, 2250 g ai/ha or more, 2300 g ai/ha or more, 2350 g ai/ha or more, 2400 g ai/ha or more, 2450 g ai/ha or more, 2500 g ai/ha or more, 2550 g ai/ha or more, 2600 g ai/ha or more, 2650 g ai/ha or more, 2700 g ai/ha or more, 2750 g ai/ha or more, 2800 g ai/ha or more, 2850 g ai/ha or more, 2900 g ai/ha or more, 2950 g ai/ha or more, 3000 g ai/ha or more, 3050 g ai/ha or more, 3100 g ai/ha or more, 3150 g ai/ha or more, or 3200 g ai/ha or more; in an amount of 3250 g ai/ha or less, such as 3200 g ai/ha or less, 3150 g ai/ha or less, 3100 g ai/ha or less, 3050 g ai/ha or less, 3000 g ai/ha or less, 2950 g ai/ha or less, 2900 g ai/ha or less, 2850 g ai/ha or less, 2800 g ai/ha or less, 2750 g ai/ha or less, 2700 g ai/ha or less, 2650 g ai/ha or less, 2600 g ai/ha or less, 2550 g ai/ha or less, 2500 g ai/ha or less, 2450 g ai/ha or less, 2400 g ai/ha or less, 2350 g ai/ha or less, 2300 g ai/ha or less, 2250 g ai/ha or less, 2200 g ai/ha or less, 2150 g ai/ha or less, 2100 g ai/ha or less, 2050 g ai/ha or less, 2000 g ai/ha or less, 1950 g ai/ha or less, 1900 g ai/ha or less, 1850 g ai/ha or less, 1800 g ai/ha or less, 1750 g ai/ha or less, 1700 g ai/ha or less, 1650 g ai/ha or less, 1600 g ai/ha or less, 1550 g ai/ha or less, 1500 g ai/ha or less, 1450 g ai/ha or less, 1400 g ai/ha or less, or 1350 g ai/ha or less; or in an amount ranging from any of the minimum values described above to any of the maximum values described above, such as 1300-3250 g ai/ha, 1500-2450 g ai/ha, 1400-2800 g ai/ha, 2050-3100 g ai/ha, 1900-2950 g ai/ha, 2000-2600 g ai/ha, 2400-3000 g ai/ha, 2250-3050 g ai/ha, or 1350-3200 g ai/ha.

Chlorotoluron

In some aspects, the PS-II inhibitor herbicide can comprise chlorotoluron or an agriculturally acceptable salt or ester thereof. Chlorotoluron, shown below, is 3-(3-chloro-p-tolyl)-1,1-dimethylurea. Its herbicidal activity is exemplified in the online edition of The Pesticide Manual. Exemplary uses of chlorotoluron include its use for pre- and post-emergence control of many broadleaf and grass weeds in winter cereals.

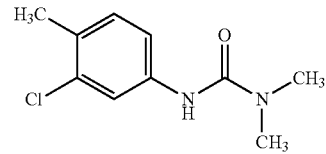

Chlorotoluron can be applied to vegetation or an area adjacent the vegetation or applied to soil or water to prevent the emergence or growth of vegetation in an amount sufficient to induce a herbicidal effect. In some aspects, chlorotoluron is applied to vegetation or an area adjacent the vegetation or applied to soil or water to prevent the emergence or growth of vegetation in an amount of 1500 g ai/ha or more, such as 1550 g ai/ha or more, 1600 g ai/ha or more, 1650 g ai/ha or more, 1700 g ai/ha or more, 1750 g ai/ha or more, 1800 g ai/ha or more, 1850 g ai/ha or more, 1900 g ai/ha or more, 1950 g ai/ha or more, 2000 g ai/ha or more, 2050 g ai/ha or more, 2100 g ai/ha or more, 2150 g ai/ha or more, 2200 g ai/ha or more, 2240 g ai/ha or more, 2250 g ai/ha or more, 2300 g ai/ha or more, 2350 g ai/ha or more, 2400 g ai/ha or more, 2450 g ai/ha or more, 2500 g ai/ha or more, 2550 g ai/ha or more, 2600 g ai/ha or more, 2650 g ai/ha or more, 2700 g ai/ha or more, 2750 g ai/ha or more, 2800 g ai/ha or more, 2850 g ai/ha or more, 2900 g ai/ha or more, or 2950 g ai/ha or more; in an amount of 3000 g ai/ha or less, such as 2950 g ai/ha or less, 2900 g ai/ha or less, 2850 g ai/ha or less, 2800 g ai/ha or less, 2750 g ai/ha or less, 2700 g ai/ha or less, 2650 g ai/ha or less, 2600 g ai/ha or less, 2550 g ai/ha or less, 2500 g ai/ha or less, 2450 g ai/ha or less, 2400 g ai/ha or less, 2350 g ai/ha or less, 2300 g ai/ha or less, 2250 g ai/ha or less, 2200 g ai/ha or less, 2150 g ai/ha or less, 2100 g ai/ha or less, 2050 g ai/ha or less, 2000 g ai/ha or less, 1950 g ai/ha or less, 1900 g ai/ha or less, 1850 g ai/ha or less, 1800 g ai/ha or less, 1750 g ai/ha or less, 1700 g ai/ha or less, 1650 g ai/ha or less, 1600 g ai/ha or less, or 1550 g ai/ha or less; or in an amount ranging from any of the minimum values described above to any of the maximum values described above, such as 1500-3000 g ai/ha, 1650-2750 g ai/ha, 1700-2300 g ai/ha, 2100-2800 g ai/ha, 2050-2600 g ai/ha, 2200-2950 g ai/ha, 1850-2400 g ai/ha, or 1550-2950 g ai/ha.

Chloroxuron

In some aspects, the PS-II inhibitor herbicide can comprise chloroxuron or an agriculturally acceptable salt or ester thereof. Chloroxuron, shown below, is 3-[4-(4-chlorophenoxy)phenyl]-1,1-dimethylurea. Its herbicidal activity is exemplified in *The Pesticide Manual*, Seventeenth Edition, 2016. Exemplary uses of chloroxuron include its use for pre- and post-emergence control of annual broadleaf weeds and some grasses in peas, beans, carrots, celery, celeriac, onions, leeks, garlic, chives, fennel, parsley, dill, tomatoes, cucurbits, soybeans, strawberries, fruit trees, ornamentals, and conifers, and control of mosses in ornamental and sports turf, on paths and non-crop lands, and in glass houses. Chloroxuron may be applied to vegetation or an area adjacent the vegetation or applied to soil or water to prevent the emergence or growth of vegetation in an amount from 1 kg/ha to 4 kg/ha.

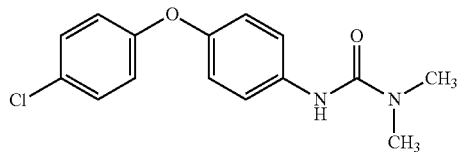 [SMILES: CN(C)C(=O)Nc1ccc(Oc2ccc(Cl)cc2)cc1]

Cyanazine

In some aspects, the PS-II inhibitor herbicide can comprise cyanazine or an agriculturally acceptable salt or ester thereof. Cyanazine is 2-(4-chloro-6-(ethylamino)-1,3,5-triazin-2-ylamino)-2-methylpropiononitrile. Its herbicidal activity is exemplified in *The Pesticide Manual*, Seventeenth Edition, 2016. Exemplary uses of cyanazine include its use for pre- or post-emergence control of grass and broadleaf weeds in broad beans, maize, peas, barley, wheat, cotton, oilseed rape, forestry, potatoes, soybeans, and sugar cane.

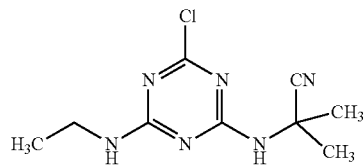 [SMILES: CCNc1nc(Cl)nc(NC(C)(C)C#N)n1]

Cyanazine can be applied to vegetation or an area adjacent the vegetation or applied to soil or water to prevent the emergence or growth of vegetation in an amount sufficient to induce a herbicidal effect. In some aspects, cyanazine is applied to vegetation or an area adjacent the vegetation or applied to soil or water to prevent the emergence or growth of vegetation in an amount of 250 g ai/ha or more, such as 260 g ai/ha or more, 270 g ai/ha or more, 280 g ai/ha or more, 290 g ai/ha or more, 300 g ai/ha or more, 310 g ai/ha or more, 320 g ai/ha or more, 330 g ai/ha or more, 340 g ai/ha or more, 350 g ai/ha or more, 360 g ai/ha or more, 370 g ai/ha or more, 380 g ai/ha or more, 390 g ai/ha or more, 400 g ai/ha or more, 420 g ai/ha or more, 440 g ai/ha or more, 460 g ai/ha or more, 480 g ai/ha or more, 500 g ai/ha or more, 520 g ai/ha or more, 540 g ai/ha or more, 560 g ai/ha or more, 580 g ai/ha or more, 600 g ai/ha or more, 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, 975 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2300 g ai/ha or more, 2400 g ai/ha or more, 2500 g ai/ha or more, 2600 g ai/ha or more, 2700 g ai/ha or more, 2800 g ai/ha or more, or 2900 g ai/ha or more; in an amount of 3000 g ai/ha or less, such as 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 580 g ai/ha or less, 560 g ai/ha or less, 540 g ai/ha or less, 520 g ai/ha or less, 500 g ai/ha or less, 480 g ai/ha or less, 460 g ai/ha or less, 440 g ai/ha or less, 420 g ai/ha or less, 400 g ai/ha or less, 390 g ai/ha or less, 380 g ai/ha or less, 370 g ai/ha or less, 360 g ai/ha or less, 350 g ai/ha or less, 340 g ai/ha or less, 330 g ai/ha or less, 320 g ai/ha or less, 310 g ai/ha or less, 300 g ai/ha or less, 290 g ai/ha or less, 280 g ai/ha or less, 270 g ai/ha or less, or 260 g ai/ha or less; or in an amount ranging from any of the minimum values described above to any of the maximum values described above, such as 250-3000 g ai/ha, 625-1400 g ai/ha, 390-2300 g ai/ha, 1100-2100 g ai/ha, 1300-2700 g ai/ha, 1000-1900 g ai/ha, or 260-2900 g ai/ha.

Desmedipham

In some aspects, the PS-II inhibitor herbicide can comprise desmedipham or an agriculturally acceptable salt or ester thereof. Desmedipham, shown below, is 3-ethoxycarbonylaminophenyl phenylcarbamate. Its herbicidal activity is exemplified in *The Pesticide Manual*, Seventeenth Edition, 2016. Exemplary uses of desmedipham include its use in post-emergence control of broadleaf weeds in beets.

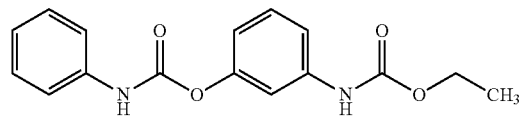 [SMILES: CCOC(=O)Nc1cccc(OC(=O)Nc2ccccc2)c1]

Desmedipham can be applied to vegetation or an area adjacent the vegetation or applied to soil or water to prevent the emergence or growth of vegetation in an amount sufficient to induce a herbicidal effect. In some aspects, desmedipham is applied to vegetation or an area adjacent the vegetation or applied to soil or water to prevent the emergence or growth of vegetation in an amount of 300 g ai/ha or more, such as 310 g ai/ha or more, 320 g ai/ha or more, 330 g ai/ha or more, 340 g ai/ha or more, 350 g ai/ha or more, 360 g ai/ha or more, 370 g ai/ha or more, 380 g ai/ha or more, 390 g ai/ha or more, 400 g ai/ha or more, 410 g ai/ha or more, 420 g ai/ha or more, 430 g ai/ha or more, 440 g ai/ha or more, 450 g ai/ha or more, 460 g ai/ha or more, 480 g ai/ha or more, 500 g ai/ha or more, 525 g ai/ha or more, 550 g ai/ha or more, 575 g ai/ha or more, 600 g ai/ha or more, 625 g ai/ha or more, 650 g ai/ha or more, 675 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1050 g ai/ha or more, 1100 g ai/ha or more, 1150 g ai/ha or more, or 1200 g ai/ha or more; in an amount of 1250 g ai/ha or less, such as 1200 g ai/ha or less, 1150 g ai/ha or less, 1100 g ai/ha or less, 1050 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 575 g ai/ha or less, 550 g ai/ha or less, 525 g ai/ha or less, 500 g ai/ha or less, 480 g ai/ha or less, 460 g ai/ha or less, 450 g ai/ha or less, 440 g ai/ha or less, 430 g ai/ha or less, 420 g ai/ha or less, 410 g ai/ha or less, 400 g ai/ha or less, 390 g ai/ha or less, 380 g ai/ha or less, 370 g ai/ha or less, 360 g ai/ha or less, 350 g ai/ha or less, 340 g ai/ha or less, 330 g ai/ha or less, 320 g ai/ha or less, or 310 g ai/ha or less; or in an amount ranging from any of the minimum values described above to any of the maximum values described above, such as 300-1250 g ai/ha, 340-850 g ai/ha, 370-600 g ai/ha, 410-1050 g ai/ha, 440-900 g ai/ha, 450-750 g ai/ha, 500-1150 g ai/ha, 600-1200 g ai/ha, 350-950 g ai/ha, or 310-1200 g ai/ha.

Desmetryn

In some aspects, the PS-II inhibitor herbicide can comprise desmetryn or an agriculturally acceptable salt or ester thereof. Desmetryn, shown below, is $N^2$-isopropyl-$N^4$-methyl-6-methylthio-1,3,5-triazine-2,4-diamine. Its herbicidal activity is exemplified in *The Pesticide Manual*, Seventeenth Edition, 2016. Exemplary uses of desmetryn include its use for pre-emergence control of fat-hen and other annual broadleaf weeds and some grasses in brassicas (except cauliflower and broccoli), herbs, onions, leeks, and conifer seedbeds.

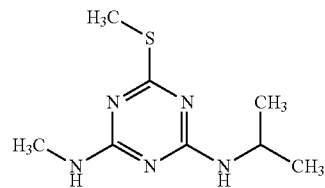

Desmetryn can be applied to vegetation or an area adjacent the vegetation or applied to soil or water to prevent the emergence or growth of vegetation in an amount sufficient to induce a herbicidal effect. In some aspects, desmetryn is applied to vegetation or an area adjacent the vegetation or applied to soil or water to prevent the emergence or growth of vegetation in an amount of 200 g ai/ha or more, such as 200 g ai/ha or more, 210 g ai/ha or more, 220 g ai/ha or more, 230 g ai/ha or more, 240 g ai/ha or more, 250 g ai/ha or more, 260 g ai/ha or more, 270 g ai/ha or more, 280 g ai/ha or more, 290 g ai/ha or more, 300 g ai/ha or more, 310 g ai/ha or more, 320 g ai/ha or more, 330 g ai/ha or more, 340 g ai/ha or more, 350 g ai/ha or more, 360 g ai/ha or more, 370 g ai/ha or more, 380 g ai/ha or more, 390 g ai/ha or more, 400 g ai/ha or more, 420 g ai/ha or more, 440 g ai/ha or more, 450 g ai/ha or more, 460 g ai/ha or more, 480 g ai/ha or more, 500 g ai/ha or more, 520 g ai/ha or more, 540 g ai/ha or more, 550 g ai/ha or more, 560 g ai/ha or more, 580 g ai/ha or more, 600 g ai/ha or more, or 625 g ai/ha or more; in an amount of 650 g ai/ha or less, such as 625 g ai/ha or less, 600 g ai/ha or less, 580 g ai/ha or less, 560 g ai/ha or less, 550 g ai/ha or less, 540 g ai/ha or less, 520 g ai/ha or less, 500 g ai/ha or less, 480 g ai/ha or less, 460 g ai/ha or less, 450 g ai/ha or less, 440 g ai/ha or less, 420 g ai/ha or less, 400 g ai/ha or less, 390 g ai/ha or less, 380 g ai/ha or less, 370 g ai/ha or less, 360 g ai/ha or less, 350 g ai/ha or less, 340 g ai/ha or less, 330 g ai/ha or less, 320 g ai/ha or less, 310 g ai/ha or less, 300 g ai/ha or less, 290 g ai/ha or less, 280 g ai/ha or less, 270 g ai/ha or less, 260 g ai/ha or less, 250 g ai/ha or less, 240 g ai/ha or less, 230 g ai/ha or less, 220 g ai/ha or less, or 210 g ai/ha or less; or in an amount ranging from any of the minimum values described above to any of the maximum values described above, such as 200-650 g ai/ha, 220-540 g ai/ha, 260-380 g ai/ha, 250-450 g ai/ha, 300-600 g ai/ha, 440-580 g ai/ha, or 210-625 g ai/ha.

Dimefuron

In some aspects, the PS-II inhibitor herbicide can comprise dimefuron or an agriculturally acceptable salt or ester thereof. Dimefuron, shown below, is 3-[4-(5-tert-butyl-2,3-dihydro-2-oxo-1,3,4-oxadiazol-3-yl)-3-chlorophenyl]-1,1-dimethylurea. Its herbicidal activity is exemplified in *The Pesticide Manual*, Seventeenth Edition, 2016. Dimefuron is used for pre- and post-emergence control of difficult annual broadleaf weeds (e.g., *Stellaria media*, *Chamomilla*, and *Matricaria* spp.) in beans, certain cereals, cotton, peanuts, dormant alfalfa, oilseed rape, and peas.

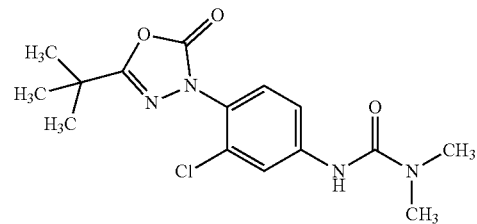 [SMILES: CN(C)C(=O)Nc1ccc(-n2nc(C(C)(C)C)oc2=O)c(Cl)c1]

Dimefuron can be applied to vegetation or an area adjacent the vegetation or applied to soil or water to prevent the emergence or growth of vegetation in an amount sufficient to induce a herbicidal effect. In some aspects, dimefuron is applied to vegetation or an area adjacent the vegetation or applied to soil or water to prevent the emergence or growth of vegetation in an amount of 200 g ai/ha or more, such as 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 425 g ai/ha or more, 450 g ai/ha or more, 475 g ai/ha or more, 500 g ai/ha or more, 525 g ai/ha or more, 550 g ai/ha or more, 575 g ai/ha or more, 600 g ai/ha or more, 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, 975 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, or 1900 g ai/ha or more; in an amount of 2000 g ai/ha or less, such as 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 575 g ai/ha or less, 550 g ai/ha or less, 525 g ai/ha or less, 500 g ai/ha or less, 475 g ai/ha or less, 450 g ai/ha or less, 425 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, or 225 g ai/ha or less; or in an amount ranging from any of the minimum values described above to any of the maximum values described above, such as 200-2000 g ai/ha, 350-1800 g ai/ha, 425-1600 g ai/ha, 575-1100 g ai/ha, 400-1700 g ai/ha, 600-925 g ai/ha, or 225-1900 g ai/ha.

Dimethametryn

In some aspects, the PS-II inhibitor herbicide can comprise dimethametryn or an agriculturally acceptable salt or ester thereof. Dimethametryn, shown below, is (RS)—$N^2$-(1,2-dimethylpropyl)-$N^4$-ethyl-6-(methylthio)-1,3,5-triazine-2,4-diamine. Its herbicidal activity is exemplified in *The Pesticide Manual*, Seventeenth Edition, 2016. Exemplary uses of dimethametryn include its use in control of annual broadleaf weeds in rice.

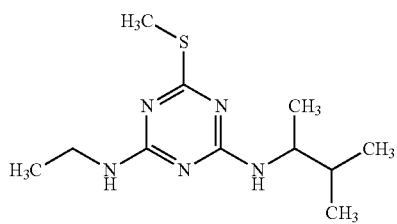 [SMILES: CCNc1nc(NC(C)C(C)C)nc(SC)n1]

Dimethametryn can be applied to vegetation or an area adjacent the vegetation or applied to soil or water to prevent the emergence or growth of vegetation in an amount sufficient to induce a herbicidal effect. In some aspects, dimethametryn is applied to vegetation or an area adjacent the vegetation or applied to soil or water to prevent the emergence or growth of vegetation in an amount of 50 g ai/ha or more, such as 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, 100 g ai/ha or more, 110 g ai/ha or more, 120 g ai/ha or more, 130 g ai/ha or more, 140 g ai/ha or more, or 145 g ai/ha or more; in an amount of 150 g ai/ha or less, such as 145 g ai/ha or less, 140 g ai/ha or less, 130 g ai/ha or less, 120 g ai/ha or less, 110 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, or 55 g ai/ha or less; or in an amount ranging from any of the minimum values described above to any of the maximum values described above, such as 50-150 g ai/ha, 60-120 g ai/ha, 55-95 g ai/ha, 85-140 g ai/ha, 65-120 g ai/ha, 55-110 g ai/ha, 70-130 g ai/ha, or 55-145 g ai/ha.

Diuron

In some aspects, the PS-II inhibitor herbicide can comprise diuron or an agriculturally acceptable salt or ester thereof. Diuron, shown below, is 3-(3,4-dichlorophenyl)-1,1-dimethylurea. Its herbicidal activity is exemplified in *The Pesticide Manual*, Seventeenth Edition, 2016. Diuron provides pre- and early post-emergence control of germinating grasses and broadleaf weeds in asparagus, tree fruit, bush fruit, citrus, vines, olives, pineapples, bananas, sugar cane, cotton, peppermint, alfalfa, forage legumes, cereals, maize, sorghum, and perennial grass seed crops, as well as total control of weeds and mosses in non-crop areas.

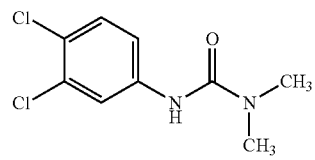

Diuron can be applied to vegetation or an area adjacent the vegetation or applied to soil or water to prevent the emergence or growth of vegetation in an amount sufficient to induce a herbicidal effect. In some aspects, diuron is applied to vegetation or an area adjacent the vegetation or applied to soil or water to prevent the emergence or growth of vegetation in an amount of 600 g ai/ha or more, such as 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, 975 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2300 g ai/ha or more, 2400 g ai/ha or more, 2500 g ai/ha or more, 2600 g ai/ha or more, 2700 g ai/ha or more, 2800 g ai/ha or more, 2900 g ai/ha or more, 3000 g ai/ha or more, 3100 g ai/ha or more, 3200 g ai/ha or more, 3300 g ai/ha or more, 3400 g ai/ha or more, 3500 g ai/ha or more, 3600 g ai/ha or more, 3700 g ai/ha or more, 3800 g ai/ha or more, 3900 g ai/ha or more, 4000 g ai/ha or more, 4100 g ai/ha or more, 4200 g ai/ha or more, 4300 g ai/ha or more, 4400 g ai/ha or more, 4500 g ai/ha or more, 4600 g ai/ha or more, 4700 g ai/ha or more, or 4750 g ai/ha or more; in an amount of 4800 g ai/ha or less, such as 4750 g ai/ha or less, 4700 g ai/ha or less, 4600 g ai/ha or less, 4500 g ai/ha or less, 4400 g ai/ha or less, 4300 g ai/ha or less, 4200 g ai/ha or less, 4100 g ai/ha or less, 4000 g ai/ha or less, 3900 g ai/ha or less, 3800 g ai/ha or less, 3700 g ai/ha or less, 3600 g ai/ha or less, 3500 g ai/ha or less, 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, or 625 g ai/ha or less; or in an amount ranging from any of the minimum values described above to any of the maximum values described above, such as 600-4800 g ai/ha, 700-3900 g ai/ha, 875-2200 g ai/ha, 650-3100 g ai/ha, 950-2700 g ai/ha, 1500-2600 g ai/ha, 1300-3200 g ai/ha, 850-4000 g ai/ha, 2500-4400 g ai/ha, 1400-3200 g ai/ha, or 625-4750 g ai/ha.

Ethidimuron

In some aspects, the PS-II inhibitor herbicide can comprise ethidimuron or an agriculturally acceptable salt or ester thereof. Ethidimuron, shown below, is 1-(5-ethylsulfonyl-1,3,4-thiadiazol-2-yl)-1,3-dimethylurea. Its herbicidal activity is exemplified in *The Pesticide Manual*, Seventeenth Edition, 2016. Exemplary uses of ethidimuron include its use for total herbicidal control on uncultivated land and in sugar cane plantations.

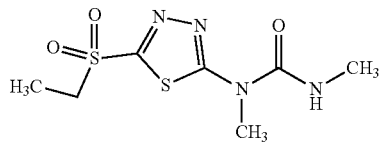 [SMILES: CCS(=O)(=O)c1nnc(N(C)C(=O)NC)s1]

Ethidimuron can be applied to vegetation or an area adjacent the vegetation or applied to soil or water to prevent the emergence or growth of vegetation in an amount sufficient to induce a herbicidal effect. In some aspects, ethidimuron is applied to vegetation or an area adjacent the vegetation or applied to soil or water to prevent the emergence or growth of vegetation in an amount of 4000 g ai/ha or more, such as 4250 g ai/ha or more, 4500 g ai/ha or more, 4750 g ai/ha or more, 5000 g ai/ha or more, 5250 g ai/ha or more, 5500 g ai/ha or more, 5750 g ai/ha or more, 6000 g ai/ha or more, 6250 g ai/ha or more, 6500 g ai/ha or more, 6750 g ai/ha or more, 7000 g ai/ha or more, or 7250 g ai/ha or more; in an amount of 7500 g ai/ha or less, such as 7250 g ai/ha or less, 7000 g ai/ha or less, 6750 g ai/ha or less, 6500 g ai/ha or less, 6250 g ai/ha or less, 6000 g ai/ha or less, 5750 g ai/ha or less, 5500 g ai/ha or less, 5250 g ai/ha or less, 5000 g ai/ha or less, 4750 g ai/ha or less, 4500 g ai/ha or less, or 4250 g ai/ha or less; or in an amount ranging from any of the minimum values described above to any of the maximum values described above, such as 4000-7500 g ai/ha, 4500-6750 g ai/ha, 5250-6500 g ai/ha, 4250-5500 g ai/ha, 5000-7250 g ai/ha, 6250-7000 g ai/ha, 5500-7500 g ai/ha, or 4250-7250 g ai/ha.

Ethiozin

In some aspects, the PS-II inhibitor herbicide can comprise ethiozin or an agriculturally acceptable salt or ester thereof. Ethiozin, shown below, is 4-amino-6-tert-butyl-3-ethylthio-1,2,4-triazin-5(4H)-one. Its herbicidal activity is exemplified in *The Pesticide Manual*, Seventeenth Edition, 2016. Exemplary uses of ethiozin include its use in pre-emergence control of grasses and some broadleaf weeds in cereals and tomatoes.

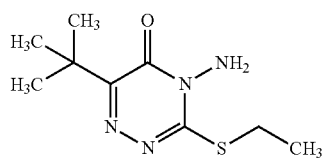

Ethiozin can be applied to vegetation or an area adjacent the vegetation or applied to soil or water to prevent the emergence or growth of vegetation in an amount sufficient to induce a herbicidal effect. In some aspects, ethiozin is applied to vegetation or an area adjacent the vegetation or applied to soil or water to prevent the emergence or growth of vegetation in an amount of 500 g ai/ha or more, such as 525 g ai/ha or more, 550 g ai/ha or more, 575 g ai/ha or more, 600 g ai/ha or more, 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, 975 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, or 1700 g ai/ha or more; in an amount of 1750 g ai/ha or less, such as 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 575 g ai/ha or less, 550 g ai/ha or less, or 525 g ai/ha or less; or in an amount ranging from any of the minimum values described above to any of the maximum values described above, such as 500-1750 g ai/ha, 550-1500 g ai/ha, 625-1600 g ai/ha, 675-1100 g ai/ha, 700-1300 g ai/ha, 600-925 g ai/ha, or 525-1700 g ai/ha.

Fenuron

In some aspects, the PS-II inhibitor herbicide can comprise fenuron or an agriculturally acceptable salt or ester thereof. Fenuron, shown below, is 1,1-dimethyl-3-phenylurea. Its herbicidal activity is exemplified in *The Pesticide Manual*, Seventeenth Edition,

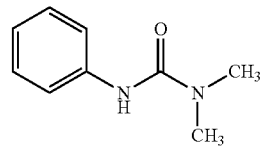

2016. Exemplary uses of fenuron include its use in pre-emergence control of woody plants and perennial weeds in non-crop lands.

Fluometuron

In some aspects, the PS-II inhibitor herbicide can comprise fluometuron or an agriculturally acceptable salt or ester thereof. Fluometuron, shown below, is 1,1-dimethyl-3-(α,α,α-trifluoro-m-tolyl)-urea. Its herbicidal activity is exemplified in *The Pesticide Manual*, Seventeenth Edition, 2016. Exemplary uses of fluometuron include its use in control of annual broadleaf and grass weeds in cotton and sugar cane.

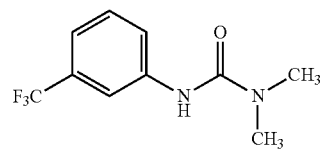 [SMILES: CN(C)C(=O)Nc1cccc(C(F)(F)F)c1]

Fluometuron can be applied to vegetation or an area adjacent the vegetation or applied to soil or water to prevent the emergence or growth of vegetation in an amount sufficient to induce a herbicidal effect. In some aspects, fluometuron is applied to vegetation or an area adjacent the vegetation or applied to soil or water to prevent the emergence or growth of vegetation in an amount of 800 g ai/ha or more, such as 825 g ai/ha or more, 850 g ai/ha or more, 875 g ai/ha or more, 900 g ai/ha or more, 925 g ai/ha or more, 950 g ai/ha or more, 975 g ai/ha or more, 1000 g ai/ha or more, 1050 g ai/ha or more, 1100 g ai/ha or more, 1150 g ai/ha or more, 1200 g ai/ha or more, 1250 g ai/ha or more, 1300 g ai/ha or more, 1350 g ai/ha or more, 1400 g ai/ha or more, or 1450 g ai/ha or more; in an amount of 1500 g ai/ha or less, such as 1450 g ai/ha or less, 1400 g ai/ha or less, 1350 g ai/ha or less, 1300 g ai/ha or less, 1250 g ai/ha or less, 1200 g ai/ha or less, 1150 g ai/ha or less, 1100 g ai/ha or less, 1050 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, or 825 g ai/ha or less; or in an amount ranging from any of the minimum values described above to any of the maximum values described above, such as 800-1500 g ai/ha, 950-1300 g ai/ha, 825-1150 g ai/ha, 975-1100 g ai/ha, 1000-1400 g ai/ha, 900-1350 g ai/ha, or 825-1450 g ai/ha.

Hexazinone

In some aspects, the PS-II inhibitor herbicide can comprise hexazinone or an agriculturally acceptable salt or ester thereof. Hexazinone, shown below, is 3-cyclohexyl-6-dimethylamino-1-methyl-1,3,5-triazine-2,4-(1H,3H)-dione. Its herbicidal activity is exemplified in *The Pesticide Manual*, Seventeenth Edition, 2016. Exemplary uses of hexazinone include its use in post-emergence control of annual, biennial, and most perennial weeds in alfalfa, pineapples, sugar can, coniferous species, and non-crop areas at 6,000-12,000 g/ha.

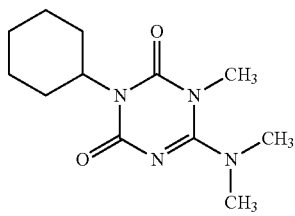 [SMILES: CN(C)c1nc(=O)n(C2CCCCC2)c(=O)n1C]

Iodobonil

In some aspects, the PS-II inhibitor herbicide can comprise iodobonil or an agriculturally acceptable salt or ester thereof. Iodobonil, shown below, is 4-(allyloxy-carbonyloxy)-3,5-diiodobenzonitrile. Its chemical properties are given in *The Pesticide Manual*, Seventeenth Edition, 2016.

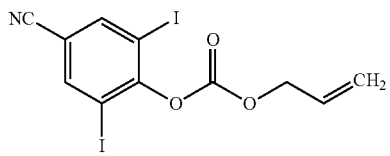 [SMILES: C=CCOC(=O)Oc1c(I)cc(C#N)cc1I]

Ioxynil

In some aspects, the PS-II inhibitor herbicide can comprise ioxynil or an agriculturally acceptable salt or ester thereof. Ioxynil, shown below, is 4-hydroxy-3,5-diiodobenzonitrile. Its herbicidal activity is exemplified in *The Pesticide Manual*, Seventeenth Edition, 2016. Exemplary uses of ioxynil include its use in post-emergence control of broad-leaf weeds in cereals, onions, leeks, garlic, shallots, flax, sugar cane, forage grasses, lawns, and newly-sown turf.

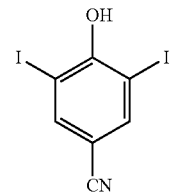 [SMILES: N#Cc1cc(I)c(O)c(I)c1]

Ioxynil can be applied to vegetation or an area adjacent the vegetation or applied to soil or water to prevent the emergence or growth of vegetation in an amount sufficient to induce a herbicidal effect. In some aspects, ioxynil is applied to vegetation or an area adjacent the vegetation or applied to soil or water to prevent the emergence or growth of vegetation in an amount of 300 g ai/ha or more, such as 310 g ai/ha or more, 320 g ai/ha or more, 330 g ai/ha or more, 340 g ai/ha or more, 350 g ai/ha or more, 360 g ai/ha or more, 370 g ai/ha or more, 380 g ai/ha or more, 390 g ai/ha or more, 400 g ai/ha or more, 420 g ai/ha or more, 440 g ai/ha or more, 450 g ai/ha or more, 460 g ai/ha or more, 480 g ai/ha or more, 500 g ai/ha or more, 520 g ai/ha or more, 540 g ai/ha or more, 550 g ai/ha or more, 560 g ai/ha or more, 580 g ai/ha or more, 600 g ai/ha or more, or 625 g ai/ha or more; in an amount of 650 g ai/ha or less, such as 625 g ai/ha or less, 600 g ai/ha or less, 580 g ai/ha or less, 560 g ai/ha or less, 550 g ai/ha or less, 540 g ai/ha or less, 520 g ai/ha or less, 500 g ai/ha or less, 480 g ai/ha or less, 460 g ai/ha or less, 450 g ai/ha or less, 440 g ai/ha or less, 420 g ai/ha or less, 400 g ai/ha or less, 390 g ai/ha or less, 380 g ai/ha or less, 370 g ai/ha or less, 360 g ai/ha or less, 350 g ai/ha or less, 340 g ai/ha or less, 330 g ai/ha or less, 320 g ai/ha or less, or 310 g ai/ha or less; or in an amount ranging from any of the minimum values described above to any of the maximum values described above, such as 300-650 g ai/ha, 320-540 g ai/ha, 360-580 g ai/ha, 350-450 g ai/ha, 310-520 g ai/ha, 440-600 g ai/ha, or 310-625 g ai/ha.

Isocil

In some aspects, the PS-II inhibitor herbicide can comprise isocil or an agriculturally acceptable salt or ester thereof. Isocil, shown below, is 3-ethoxycarbonylaminophenyl phenylcarbamate. Its herbicidal activity is exemplified in *The Pesticide Manual*, Seventeenth Edition, 2016. Exemplary uses of isocil include its use as a total herbicide in control of perennial grasses and on non-cropped lands at 13-18 kg/ha.

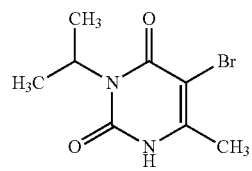

Isomethiozin

In some aspects, the PS-II inhibitor herbicide can comprise isomethiozin or an agriculturally acceptable salt or ester thereof. Isomethiozin, shown below, is 6-tert-butyl-4-[(EZ)-isobutylideneamino]-3-methylthio-1,2,4-triazin-5 (4H)-one. Its herbicidal activity is exemplified in *The Pesticide Manual*, Seventeenth Edition, 2016. Exemplary uses of isomethiozin include its use in post-emergence control of areas with a heavy infestation of grass, and in winter wheat and spring cereals.

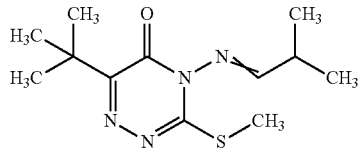 [SMILES: CSc1nnc(C(C)(C)C)c(=O)n1N=CC(C)C]

Isoproturon

In some aspects, the PS-II inhibitor herbicide can comprise isoproturon or an agriculturally acceptable salt or ester thereof. Isoproturon, shown below, is 3-(4-isopropylphenyl)-1,1-dimethylurea. Its herbicidal activity is exemplified in *The Pesticide Manual*, Seventeenth Edition, 2016. Exemplary uses of isoproturon include its use in pre- and post-emergence control of annual grass weeds and many broadleaf weeds in spring and winter wheat (except durum wheat), spring and winter barley, winter rye, and triticale.

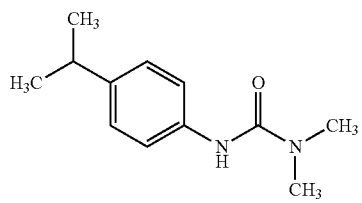

Isoproturon can be applied to vegetation or an area adjacent the vegetation or applied to soil or water to prevent the emergence or growth of vegetation in an amount sufficient to induce a herbicidal effect. In some aspects, isoproturon is applied to vegetation or an area adjacent the vegetation or applied to soil or water to prevent the emergence or growth of vegetation in an amount of 800 g ai/ha or more, such as 825 g ai/ha or more, 850 g ai/ha or more, 875 g ai/ha or more, 900 g ai/ha or more, 925 g ai/ha or more, 950 g ai/ha or more, 975 g ai/ha or more, 1000 g ai/ha or more, 1050 g ai/ha or more, 1100 g ai/ha or more, 1150 g ai/ha or more, 1200 g ai/ha or more, 1250 g ai/ha or more, 1300 g ai/ha or more, 1350 g ai/ha or more, 1400 g ai/ha or more, or 1450 g ai/ha or more; in an amount of 1500 g ai/ha or less, such as 1450 g ai/ha or less, 1400 g ai/ha or less, 1350 g ai/ha or less, 1300 g ai/ha or less, 1250 g ai/ha or less, 1200 g ai/ha or less, 1150 g ai/ha or less, 1100 g ai/ha or less, 1050 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, or 825 g ai/ha or less; or in an amount ranging from any of the minimum values described above to any of the maximum values described above, such as 800-1500 g ai/ha, 950-1300 g ai/ha, 825-1150 g ai/ha, 975-1100 g ai/ha, 1000-1400 g ai/ha, 900-1350 g ai/ha, or 825-1450 g ai/ha.

Isouron

In some aspects, the PS-II inhibitor herbicide can comprise isouron or an agriculturally acceptable salt or ester thereof. Isouron, shown below, is 3-(5-tert-butylisoxazol-3-yl)-1,1-dimethylurea. Its herbicidal activity is exemplified in *The Pesticide Manual*, Seventeenth Edition, 2016. Exemplary uses of isouron include its use in pre- and post-emergence control of broadleaf and grass weeds in sugar cane and pineapples.

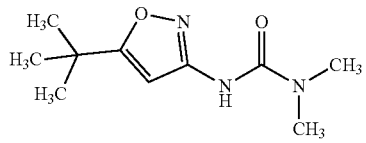

Isouron can be applied to vegetation or an area adjacent the vegetation or applied to soil or water to prevent the emergence or growth of vegetation in an amount sufficient to induce a herbicidal effect. In some aspects, isouron is applied to vegetation or an area adjacent the vegetation or applied to soil or water to prevent the emergence or growth of vegetation in an amount of 400 g ai/ha or more, such as 425 g ai/ha or more, 450 g ai/ha or more, 475 g ai/ha or more, 500 g ai/ha or more, 525 g ai/ha or more, 550 g ai/ha or more, 575 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1050 g ai/ha or more, 1100 g ai/ha or more, 1150 g ai/ha or more, 1200 g ai/ha or more, 1250 g ai/ha or more, 1300 g ai/ha or more, 1350 g ai/ha or more, 1400 g ai/ha or more, or 1450 g ai/ha or more; in an amount of 1500 g ai/ha or less, such as 1450 g ai/ha or less, 1400 g ai/ha or less, 1350 g ai/ha or less, 1300 g ai/ha or less, 1250 g ai/ha or less, 1200 g ai/ha or less, 1150 g ai/ha or less, 1100 g ai/ha or less, 1050 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 575 g ai/ha or less, 550 g ai/ha or less, 525 g ai/ha or less, 500 g ai/ha or less, 475 g ai/ha or less, 450 g ai/ha or less, or 425 g ai/ha or less; or in an amount ranging from any of the minimum values described above to any of the maximum values described above, such as 400-1500 g ai/ha, 450-1300 g ai/ha, 525-1150 g ai/ha, 475-1050 g ai/ha, 600-1400 g ai/ha, 750-1250 g ai/ha, or 425-1450 g ai/ha.

Karbutilate

In some aspects, the PS-II inhibitor herbicide can comprise karbutilate or an agriculturally acceptable salt or ester thereof. Karbutilate, shown below, is 3-(3,3-dimethylureido) phenyl tert-butylcarbamate. Its herbicidal activity is exemplified in *The Pesticide Manual*, Seventeenth Edition, 2016. Exemplary uses of karbutilate include its use in control of annual and perennial broadleaf and grass weeds and woody species in non-crop areas at up to 12,000 g/ha.

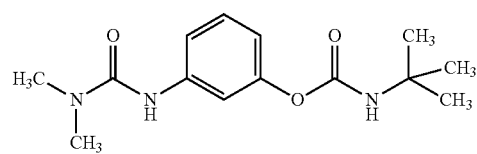 [SMILES: CN(C)C(=O)Nc1cccc(OC(=O)NC(C)(C)C)c1]

Lenacil

In some aspects, the PS-II inhibitor herbicide can comprise lenacil or an agriculturally acceptable salt or ester thereof. Lenacil, shown below, is 3-cyclohexyl-1,5,6,7-tetrahydrocyclopentapyrimidine-2,4(3H)-dione. Its herbicidal activity is exemplified in *The*

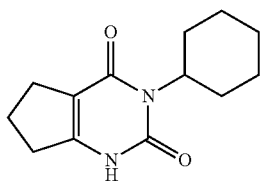 [SMILES: O=c1[nH]c2c(c(=O)n1C1CCCCC1)CCC2]

Pesticide Manual, Seventeenth Edition, 2016. Exemplary uses of lenacil include its use in pre-plant and pre-emergence control of annual grass and broadleaf weeds in sugar beets, fodder beets, beetroot, sweet potatoes, spinach, strawberries, flax, black salsify, and ornamentals.

Lenacil can be applied to vegetation or an area adjacent the vegetation or applied to soil or water to prevent the emergence or growth of vegetation in an amount sufficient to induce a herbicidal effect. In some aspects, lenacil is applied to vegetation or an area adjacent the vegetation or applied to soil or water to prevent the emergence or growth of vegetation in an amount of 100 g ai/ha or more, such as 125 g ai/ha or more, 150 g ai/ha or more, 175 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 425 g ai/ha or more, 450 g ai/ha or more, 475 g ai/ha or more, 500 g ai/ha or more, 525 g ai/ha or more, 550 g ai/ha or more, 575 g ai/ha or more, 600 g ai/ha or more, 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, 975 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2300 g ai/ha or more, 2400 g ai/ha or more, 2500 g ai/ha or more, or 2600 g ai/ha or more; in an amount of 2700 g ai/ha or less, such as 2600 g ai/ha or less, 2500 g ai/ha or less, 2400 g ai/ha or less, 2300 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 575 g ai/ha or less, 550 g ai/ha or less, 525 g ai/ha or less, 500 g ai/ha or less, 475 g ai/ha or less, 450 g ai/ha or less, 425 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 175 g ai/ha or less, 150 g ai/ha or less, or 125 g ai/ha or less; or in an amount ranging from any of the minimum values described above to any of the maximum values described above, such as 100-2700 g ai/ha, 150-1800 g ai/ha, 225-2000 g ai/ha, 375-2300 g ai/ha, 400-1700 g ai/ha, 600-925 g ai/ha, 900-1400 g ai/ha, 1300-2500 g ai/ha, or 125-2600 g ai/ha.

Linuron

In some aspects, the PS-II inhibitor herbicide can comprise linuron or an agriculturally acceptable salt or ester thereof. Linuron, shown below, is 3-(3,4-dichlorophenyl)-1-methoxy-1-methylurea. Its herbicidal activity is exemplified in The Pesticide Manual, Seventeenth Edition, 2016. Exemplary uses of linuron include its use in pre- and post-emergence control of annual grass and broadleaf weeds in asparagus, artichokes, carrots, parsley, fennel, parsnips, herbs, celery, celeriac, onions, lees, garlic, potatoes, peas, field beans, soybeans, cereals, maize, sorghum, cotton, flax, sunflowers, sugar cane, ornamentals, established vines, bananas, cassava, coffee, tea, rice, peanuts, and other crops.

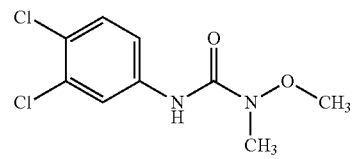

Metamitron

In some aspects, the PS-II inhibitor herbicide can comprise metamitron or an agriculturally acceptable salt or ester thereof. Metamitron, shown below, is 4-amino-3-methyl-6-phenyl-1,2,4-triazin-5(4H)-one. Its herbicidal activity is exemplified in The Pesticide Manual, Seventeenth Edition, 2016. Exemplary uses of metamitron include its use in pre- and post-emergence

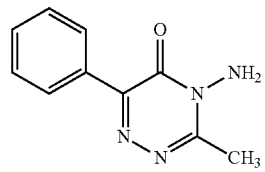

control or pre-plant control of broadleaf and grass weeds in sugar beets, fodder beets, red beets, chard, and some strawberry varieties.

Metamitron can be applied to vegetation or an area adjacent the vegetation or applied to soil or water to prevent the emergence or growth of vegetation in an amount sufficient to induce a herbicidal effect. In some aspects, metamitron is applied to vegetation or an area adjacent the vegetation or applied to soil or water to prevent the emergence or growth of vegetation in an amount of 300 g ai/ha or more, such as 325 g ai/ha or more, 350 g ai/ha or more, 375 g ai/ha or more, 400 g ai/ha or more, 425 g ai/ha or more, 450 g ai/ha or more, 475 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2300 g ai/ha or more, 2400 g ai/ha or more, 2500 g ai/ha or more, 2600 g ai/ha or more, 2700 g ai/ha or more, 2800 g ai/ha or more, 2900 g ai/ha or more, 3000 g ai/ha or more, 3100 g ai/ha or more, 3200 g ai/ha or more, 3300 g ai/ha or more, 3400 g ai/ha or more, 3500 g ai/ha or more, 3600 g ai/ha or more, 3700 g ai/ha or more, 3800 g ai/ha or more, 3900 g ai/ha or more, 4000 g ai/ha or more, or 4100 g ai/ha or more; in an amount of 4200 g ai/ha or less, such as 4100 g ai/ha or less, 4000 g ai/ha or less, 3900 g ai/ha or less, 3800 g ai/ha or less, 3700 g ai/ha or less, 3600 g ai/ha or less, 3500 g ai/ha or less, 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 475 g ai/ha or less, 450 g ai/ha or less, 425 g ai/ha or less, 400 g ai/ha or less, 375 g ai/ha or less, 350 g ai/ha or less, or 325 g ai/ha or less; or in an amount ranging from any of the minimum values described above to any of the maximum values described above, such as 300-4200 g ai/ha, 400-3900 g ai/ha, 375-2200 g ai/ha, 650-3100 g ai/ha, 950-2700 g ai/ha, 500-3300 g ai/ha, 1300-4000 g ai/ha, 850-3000 g ai/ha, 2100-3600 g ai/ha, 475-3200 g ai/ha, or 325-4100 g ai/ha.

Methabenzthiazuron

In some aspects, the PS-II inhibitor herbicide can comprise methabenzthiazuron or an agriculturally acceptable salt or ester thereof. Methabenzthiazuron, shown below, is 1-(1,3-benzothiazol-2-yl)-1,3-dimethylurea. Its herbicidal activity is exemplified in *The Pesticide Manual*, Seventeenth Edition, 2016. Exemplary uses of methabenzthiazuron include its use in control of broadleaf and grass weeds in cereals, legumes, maize, garlic, and onions.

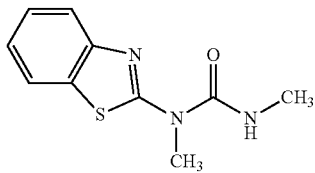

Methabenzthiazuron can be applied to vegetation or an area adjacent the vegetation or applied to soil or water to prevent the emergence or growth of vegetation in an amount sufficient to induce a herbicidal effect. In some aspects, methabenzthiazuron is applied to vegetation or an area adjacent the vegetation or applied to soil or water to prevent the emergence or growth of vegetation in an amount of 1250 g ai/ha or more, such as 1300 g ai/ha or more, 1350 g ai/ha or more, 1400 g ai/ha or more, 1450 g ai/ha or more, 1500 g ai/ha or more, 1550 g ai/ha or more, 1600 g ai/ha or more, 1650 g ai/ha or more, 1700 g ai/ha or more, 1750 g ai/ha or more, 1800 g ai/ha or more, 1850 g ai/ha or more, 1900 g ai/ha or more, 1950 g ai/ha or more, 2000 g ai/ha or more, 2100 g ai/ha or more, 2200 g ai/ha or more, 2300 g ai/ha or more, 2400 g ai/ha or more, 2500 g ai/ha or more, 2600 g ai/ha or more, or 2700 g ai/ha or more, 2800 g ai/ha or more, or 2900 g ai/ha or more; in an amount of 3000 g ai/ha or less, such as 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2200 g ai/ha or less, 2100 g ai/ha or less, 2000 g ai/ha or less, 1950 g ai/ha or less, 1900 g ai/ha or less, 1850 g ai/ha or less, 1800 g ai/ha or less, 1750 g ai/ha or less, 1700 g ai/ha or less, 1650 g ai/ha or less, 1600 g ai/ha or less, 1550 g ai/ha or less, 1500 g ai/ha or less, 1450 g ai/ha or less, 1400 g ai/ha or less, 1350 g ai/ha or less, or 1300 g ai/ha or less; or in an amount ranging from any of the minimum values described above to any of the maximum values described above, such as 1250-3000 g ai/ha, 1650-2400 g ai/ha, 1450-2300 g ai/ha, 1500-2100 g ai/ha, 1300-2700 g ai/ha, 1700-1900 g ai/ha, or 1300-2900 g ai/ha.

Methoprotryne

In some aspects, the PS-II inhibitor herbicide can comprise methoprotryne or an agriculturally acceptable salt or ester thereof. Methoprotryne, shown below, is $N^2$-isopropyl-$N^4$-(3-methoxypropyl)-6-methylthio-1,3,5-triazine-2,4-diamine. Its herbicidal activity is exemplified in *The Pesticide Manual*, Seventeenth Edition, 2016. Exemplary uses of methoprotryne include its use in post-emergence control of annual broadleaf weeds and grasses in winter-sown cereals.

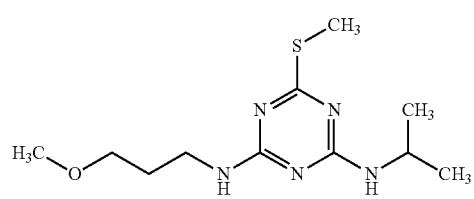 [SMILES: COCCCNc1nc(NC(C)C)nc(SC)n1]

Methoprotryne can be applied to vegetation or an area adjacent the vegetation or applied to soil or water to prevent the emergence or growth of vegetation in an amount sufficient to induce a herbicidal effect. In some aspects, methoprotryne is applied to vegetation or an area adjacent the vegetation or applied to soil or water to prevent the emergence or growth of vegetation in an amount of 1200 g ai/ha or more, such as 1250 g ai/ha or more, 1300 g ai/ha or more, 1350 g ai/ha or more, 1400 g ai/ha or more, 1450 g ai/ha or more, 1500 g ai/ha or more, 1550 g ai/ha or more, 1600 g ai/ha or more, 1650 g ai/ha or more, 1700 g ai/ha or more, 1750 g ai/ha or more, 1800 g ai/ha or more, 1850 g ai/ha or more, 1900 g ai/ha or more, 1950 g ai/ha or more, 2000 g ai/ha or more, 2050 g ai/ha or more, 2100 g ai/ha or more, 2150 g ai/ha or more, or 2200 g ai/ha or more; in an amount of 2250 g ai/ha or less, such as 2200 g ai/ha or less, 2150 g ai/ha or less, 2100 g ai/ha or less, 2050 g ai/ha or less, 2000 g ai/ha or less, 1950 g ai/ha or less, 1900 g ai/ha or less, 1850 g ai/ha or less, 1800 g ai/ha or less, 1750 g ai/ha or less, 1700 g ai/ha or less, 11650 g ai/ha or less, 1600 g ai/ha or less, 1550 g ai/ha or less, 1500 g ai/ha or less, 1450 g ai/ha or less, 1400 g ai/ha or less, 1350 g ai/ha or less, 1300 g ai/ha or less, or 1250 g ai/ha or less; or in an amount ranging from any of the minimum values described above to any of the maximum values described above, such as 1200-2250 g ai/ha, 1350-1800 g ai/ha, 1400-1600 g ai/ha, 1550-2100 g ai/ha, 1400-1900 g ai/ha, 1650-2050 g ai/ha, or 1250-2200 g ai/ha.

Metobromuron

In some aspects, the PS-II inhibitor herbicide can comprise metobromuron or an agriculturally acceptable salt or ester thereof. Metobromuron, shown below, is 3-(4-bromophenyl)-1-methoxy-1-methylurea. Its herbicidal activity is exemplified in *The Pesticide Manual*, Seventeenth Edition, 2016. Exemplary uses of metobromuron include its use in pre-emergence control of annual broadleaf and grass weeds in beans, potatoes, tomatoes, tobacco, soybeans, maize, artichokes, and sugar beets.

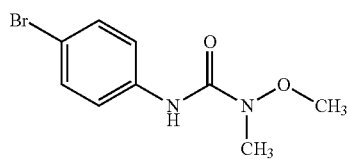

Metobromuron can be applied to vegetation or an area adjacent the vegetation or applied to soil or water to prevent the emergence or growth of vegetation in an amount sufficient to induce a herbicidal effect. In some aspects, metobromuron is applied to vegetation or an area adjacent the vegetation or applied to soil or water to prevent the emergence or growth of vegetation in an amount of 1200 g ai/ha or more, such as 1250 g ai/ha or more, 1300 g ai/ha or more, 1350 g ai/ha or more, 1400 g ai/ha or more, 1450 g ai/ha or more, 1500 g ai/ha or more, 1550 g ai/ha or more, 1600 g ai/ha or more, 1650 g ai/ha or more, 1700 g ai/ha or more, 1750 g ai/ha or more, 1800 g ai/ha or more, 1850 g ai/ha or more, 1900 g ai/ha or more, 1950 g ai/ha or more, 2000 g ai/ha or more, 2050 g ai/ha or more, 2100 g ai/ha or more, 2150 g ai/ha or more, 2200 g ai/ha or more, 2250 g ai/ha or more, 2300 g ai/ha or more, 2350 g ai/ha or more, 2400 g ai/ha or more, 2450 g ai/ha or more, or 2500 g ai/ha or more; in an amount of 2550 g ai/ha or less, such as 2500 g ai/ha or less, 2450 g ai/ha or less, 2400 g ai/ha or less, 2350 g ai/ha or less, 2300 g ai/ha or less, 2250 g ai/ha or less, 2200 g ai/ha or less, 2150 g ai/ha or less, 2100 g ai/ha or less, 2050 g ai/ha or less, 2000 g ai/ha or less, 1950 g ai/ha or less, 1900 g ai/ha or less, 1850 g ai/ha or less, 1800 g ai/ha or less, 1750 g ai/ha or less, 1700 g ai/ha or less, 11650 g ai/ha or less, 1600 g ai/ha or less, 1550 g ai/ha or less, 1500 g ai/ha or less, 1450 g ai/ha or less, 1400 g ai/ha or less, 1350 g ai/ha or less, 1300 g ai/ha or less, or 1250 g ai/ha or less; or in an amount ranging from any of the minimum values described above to any of the maximum values described above, such as 1200-2550 g ai/ha, 1350-2400 g ai/ha, 1450-1950 g ai/ha, 1550-2100 g ai/ha, 1600-2400 g ai/ha, 1750-2350 g ai/ha, or 1250-2500 g ai/ha.

Metoxuron

In some aspects, the PS-II inhibitor herbicide can comprise metoxuron or an agriculturally acceptable salt or ester thereof. Metoxuron, shown below, is 3-(3-chloro-4-methoxyphenyl)-1,1-dimethylurea. Its herbicidal activity is exemplified in *The Pesticide Manual*, Seventeenth Edition, 2016. Exemplary uses of metoxuron include its use in pre- and post-emergence control of some grasses and annual broadleaf weeds in winter wheat, winter barley, winter rye, carrots, some varieties of spring wheat, for desiccation of potato plants, and pre-harvest defoliation in hemp, flax, and tomatoes.

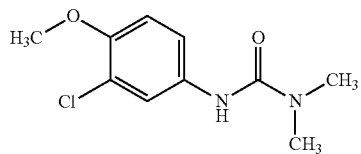

Metoxuron can be applied to vegetation or an area adjacent the vegetation or applied to soil or water to prevent the emergence or growth of vegetation in an amount sufficient to induce a herbicidal effect. In some aspects, metoxuron is applied to vegetation or an area adjacent the vegetation or applied to soil or water to prevent the emergence or growth of vegetation in an amount of 2200 g ai/ha or more, such as 2250 g ai/ha or more, 2300 g ai/ha or more, 2350 g ai/ha or more, 2400 g ai/ha or more, 2450 g ai/ha or more, 2500 g ai/ha or more, 2600 g ai/ha or more, 2700 g ai/ha or more, 2800 g ai/ha or more, 2900 g ai/ha or more, 3000 g ai/ha or more, 3100 g ai/ha or more, 3200 g ai/ha or more, 3300 g ai/ha or more, 3400 g ai/ha or more, 3500 g ai/ha or more, 3600 g ai/ha or more, 3700 g ai/ha or more, 3800 g ai/ha or more, 3850 g ai/ha or more, 3900 g ai/ha or more, or 3950 g ai/ha or more; in an amount of 4000 g ai/ha or less, such as 3950 g ai/ha or less, 3900 g ai/ha or less, 3850 g ai/ha or less, 3800 g ai/ha or less, 3700 g ai/ha or less, 3600 g ai/ha or less, 3500 g ai/ha or less, 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, 2700 g ai/ha or less, 2600 g ai/ha or less, 2500 g ai/ha or less, 2450 g ai/ha or less, 2400 g ai/ha or less, 2350 g ai/ha or less, 2300 g ai/ha or less, or 2250 g ai/ha or less; or in an amount ranging from any of the minimum values described above to any of the maximum values described above, such as 2200-4000 g ai/ha, 2300-3900 g ai/ha, 2450-3200 g ai/ha, 2600-3300 g ai/ha, 2500-3800 g ai/ha, 2350-3200 g ai/ha, 2900-4000 g ai/ha, 2200-3600 g ai/ha, 2800-3700 g ai/ha, 2400-3200 g ai/ha, or 2250-3950 g ai/ha.

Metribuzin

In some aspects, the PS-II inhibitor herbicide can comprise metribuzin or an agriculturally acceptable salt or ester thereof. Metribuzin, shown below, is 4-amino-6-tert-butyl-3-methylthio-1,2,4-triazin-5(4H)-one. Its herbicidal activity is exemplified in *The Pesticide Manual*, Seventeenth Edition, 2016. Exemplary uses of metribuzin include its use in pre- and post-emergence control of grass and broadleaf weeds in soybeans, potatoes, tomatoes, sugar cane, alfalfa, asparagus, maize, and cereals.

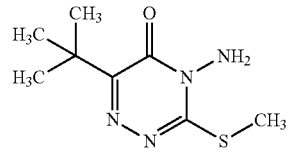

Metribuzin can be applied to vegetation or an area adjacent the vegetation or applied to soil or water to prevent the emergence or growth of vegetation in an amount sufficient to induce a herbicidal effect. In some aspects, metribuzin is applied to vegetation or an area adjacent the vegetation or applied to soil or water to prevent the emergence or growth of vegetation in an amount of 20 g ai/ha or more, such as 25 g ai/ha or more, 30 g ai/ha or more, 35 g ai/ha or more, 40 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, 100 g ai/ha or more, 110 g ai/ha or more, 120 g ai/ha or more, 125 g ai/ha or more, 150 g ai/ha or more, 175 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 425 g ai/ha or more, 450 g ai/ha or more, 475 g ai/ha or more, 500 g ai/ha or more, 525 g ai/ha or more, 550 g ai/ha or more, 575 g ai/ha or more, 600 g ai/ha or more, 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, 975 g ai/ha or more, 1000 g ai/ha or more, 1050 g ai/ha or more, 1100 g ai/ha or more, 1150 g ai/ha or more, 1200 g ai/ha or more, 1250 g ai/ha or more, 1300 g ai/ha or more, 1350 g ai/ha or more, 1400 g ai/ha or more, or 1450 g ai/ha or more; in an amount of 1500 g ai/ha or less, such as 1450 g ai/ha or less, 1400 g ai/ha or less, 1350 g ai/ha or less, 1300 g ai/ha or less, 1250 g ai/ha or less, 1200 g ai/ha or less, 1150 g ai/ha or less, 1100 g ai/ha or less, 1050 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 575 g ai/ha or less, 550 g ai/ha or less, 525 g ai/ha or less, 500 g ai/ha or less, 475 g ai/ha or less, 450 g ai/ha or less, 425 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 175 g ai/ha or less, 150 g ai/ha or less, 125 g ai/ha or less, 120 g ai/ha or less, 110 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 35 g ai/ha or less, 30 g ai/ha or less, or 25 g ai/ha or less; or in an amount ranging from any of the minimum values described above to any of the maximum values described above, such as 20-1500 g ai/ha, 25-800 g ai/ha, 65-200 g ai/ha, 75-1300 g ai/ha, 80-700 g ai/ha, 200-925 g ai/ha, 120-1050 g ai/ha, 150-1250 g ai/ha, or 25-1450 g ai/ha.

Monolinuron

In some aspects, the PS-II inhibitor herbicide can comprise monolinuron or an agriculturally acceptable salt or ester thereof. Monolinuron, shown below, is 3-(4-chlorophenyl)-1-methoxy-1-methylurea. Its herbicidal activity is exemplified in *The Pesticide Manual*, Seventeenth Edition, 2016. Exemplary uses of monolinuron include its use in pre- and post-emergence control of annual broadleaf and some grass weeds in asparagus, berries, maize, dwarf French beans, field beans, vines, leeks, onions, potatoes, herbs, alfalfa, flowers and ornamentals, and trees.

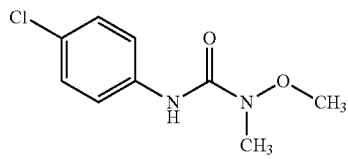

Neburon

In some aspects, the PS-II inhibitor herbicide can comprise neburon or an agriculturally acceptable salt or ester thereof. Neburon, shown below, is 1-butyl-3-(3,4-dichlorophenyl)-1-methylurea. Its herbicidal activity is exemplified in *The Pesticide Manual*, Seventeenth Edition, 2016. Exemplary uses of neburon include its use in pre-emergence control of annual broadleaf and grass weeds in beans, peas, alfalfa, garlic, cereals, beets, strawberries, ornamentals, and forestry.

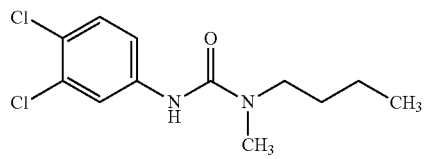 [SMILES: CCCCN(C)C(=O)Nc1ccc(Cl)c(Cl)c1]

Neburon can be applied to vegetation or an area adjacent the vegetation or applied to soil or water to prevent the emergence or growth of vegetation in an amount sufficient to induce a herbicidal effect. In some aspects, neburon is applied to vegetation or an area adjacent the vegetation or applied to soil or water to prevent the emergence or growth of vegetation in an amount of 1750 g ai/ha or more, such as 1800 g ai/ha or more, 1850 g ai/ha or more, 1900 g ai/ha or more, 1950 g ai/ha or more, 2000 g ai/ha or more, 2050 g ai/ha or more, 2100 g ai/ha or more, 2150 g ai/ha or more, 2200 g ai/ha or more, 2250 g ai/ha or more, 2300 g ai/ha or more, 2350 g ai/ha or more, 2400 g ai/ha or more, 2450 g ai/ha or more, 2500 g ai/ha or more, 2550 g ai/ha or more, 2600 g ai/ha or more, 2650 g ai/ha or more, 2700 g ai/ha or more, 2750 g ai/ha or more, 2800 g ai/ha or more, 2850 g ai/ha or more, 2900 g ai/ha or more, 2950 g ai/ha or more, 3000 g ai/ha or more, 3050 g ai/ha or more, 3100 g ai/ha or more, 3150 g ai/ha or more, or 3200 g ai/ha or more; in an amount of 3250 g ai/ha or less, such as 3200 g ai/ha or less, 3150 g ai/ha or less, 3100 g ai/ha or less, 3050 g ai/ha or less, 3000 g ai/ha or less, 2950 g ai/ha or less, 2900 g ai/ha or less, 2850 g ai/ha or less, 2800 g ai/ha or less, 2750 g ai/ha or less, 2700 g ai/ha or less, 2650 g ai/ha or less, 2600 g ai/ha or less, 2550 g ai/ha or less, 2500 g ai/ha or less, 2450 g ai/ha or less, 2400 g ai/ha or less, 2350 g ai/ha or less, 2300 g ai/ha or less, 2250 g ai/ha or less, 2200 g ai/ha or less, 2150 g ai/ha or less, 2100 g ai/ha or less, 2050 g ai/ha or less, 2000 g ai/ha or less, 1950 g ai/ha or less, 1900 g ai/ha or less, 1850 g ai/ha or less, or 1800 g ai/ha or less; or in an amount ranging from any of the minimum values described above to any of the maximum values described above, such as 1750-3250 g ai/ha, 1850-2400 g ai/ha, 1950-2700 g ai/ha, 1800-2400 g ai/ha, 2000-2800 g ai/ha, 2050-2650 g ai/ha, or 1800-3200 g ai/ha.

Pentanochlor

In some aspects, the PS-II inhibitor herbicide can comprise pentanochlor or an agriculturally acceptable salt or ester thereof. Pentanochlor, shown below, is (RS)-3'-chloro-2-methylvalero-p-toluidide. Its herbicidal activity is exemplified in *The Pesticide Manual*, Seventeenth Edition, 2016. Exemplary uses of pentanochlor include its use in selective pre- and post-emergence herbicidal control in carrots, celeriac, celery, fennel, parsley, parsnips, peas, tomatoes, some flower crops, fruit trees, and ornamentals at less than 4000 g/ha.

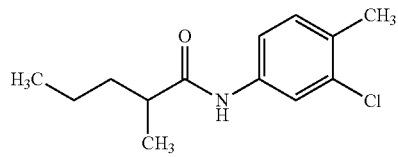 [SMILES: CCCC(C)C(=O)Nc1ccc(C)c(Cl)c1]

Phenmedipham

In some aspects, the PS-II inhibitor herbicide can comprise phenmedipham or an agriculturally acceptable salt or ester thereof. Phenmedipham, shown below, is 3-methoxycarbonylaminophenyl 3'-methylcarbanilate. Its herbicidal activity is exemplified in *The Pesticide Manual*, Seventeenth Edition, 2016. Exemplary uses of phenmedipham include its use in post-emergence control of broadleaf weeds in sugar beets, strawberries, spinach, peas, chard, and red beets.

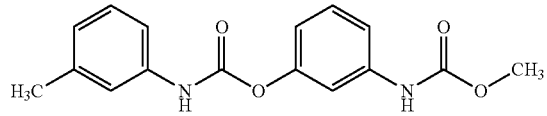

Phenmedipham can be applied to vegetation or an area adjacent the vegetation or applied to soil or water to prevent the emergence or growth of vegetation in an amount sufficient to induce a herbicidal effect. In some aspects, phenmedipham is applied to vegetation or an area adjacent the vegetation or applied to soil or water to prevent the emergence or growth of vegetation in an amount of 150 g ai/ha or more, such as 175 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 425 g ai/ha or more, 450 g ai/ha or more, 475 g ai/ha or more, 500 g ai/ha or more, 525 g ai/ha or more, 550 g ai/ha or more, 575 g ai/ha or more, 600 g ai/ha or more, 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, or 975 g ai/ha or more; in an amount of 1000 g ai/ha or less, such as 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 575 g ai/ha or less, 550 g ai/ha or less, 525 g ai/ha or less, 500 g ai/ha or less, 475 g ai/ha or less, 450 g ai/ha or less, 425 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, or 175 g ai/ha or less; or in an amount ranging from any of the minimum values described above to any of the maximum values described above, such as 150-1000 g ai/ha, 200-800 g ai/ha, 175-700 g ai/ha, 525-900 g ai/ha, 250-750 g ai/ha, 300-925 g ai/ha, 450-850 g ai/ha, 400-650 g ai/ha, or 175-975 g ai/ha.

Prometon

In some aspects, the PS-II inhibitor herbicide can comprise prometon or an agriculturally acceptable salt or ester thereof. Prometon, shown below, is $N^2,N^4$-diisopropyl-6-methoxy-1,3,5-triazine-2,4-diamine. Its herbicidal activity is exemplified in *The Pesticide Manual*, Seventeenth Edition, 2016. Exemplary uses of prometon include its use in pre- or early post-emergence control of annual and perennial paddy weeds in direct-seeded and transplanted rice.

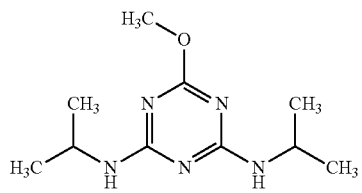 [SMILES: COc1nc(NC(C)C)nc(NC(C)C)n1]

Prometon can be applied to vegetation or an area adjacent the vegetation or applied to soil or water to prevent the emergence or growth of vegetation in an amount sufficient to induce a herbicidal effect. In some aspects, prometon is applied to vegetation or an area adjacent the vegetation or applied to soil or water to prevent the emergence or growth of vegetation in an amount of 100 g ai/ha or more, such as 125 g ai/ha or more, 150 g ai/ha or more, 175 g ai/ha or more, 200 g ai/ha or more, 225 g ai/ha or more, 250 g ai/ha or more, 275 g ai/ha or more, 300 g ai/ha or more, or 325 g ai/ha or more; in an amount of 350 g ai/ha or less, such as 325 g ai/ha or less, 300 g ai/ha or less, 275 g ai/ha or less, 250 g ai/ha or less, 225 g ai/ha or less, 200 g ai/ha or less, 175 g ai/ha or less, 150 g ai/ha or less, or 125 g ai/ha or less; or in an amount ranging from any of the minimum values described above to any of the maximum values described above, such as 100-350 g ai/ha, 150-300 g ai/ha, 225-325 g ai/ha, 175-300 g ai/ha, 200-275 g ai/ha, 150-225 g ai/ha, or 125-325 g ai/ha.

Prometryn

In some aspects, the PS-II inhibitor herbicide can comprise prometryn or an agriculturally acceptable salt or ester thereof. Prometryn, shown below, is $N^2,N^4$-diisopropyl-6-methylthio-1,3,5-triazine-2,4-diamine. Its herbicidal activity is exemplified in *The Pesticide Manual*, Seventeenth Edition, 2016. Exemplary uses of prometryn include its use in pre- or post-emergence control of annual grass and broadleaf weeds in cotton, sunflowers, peanuts, potatoes, carrots, peas, beans, celery, and leeks.

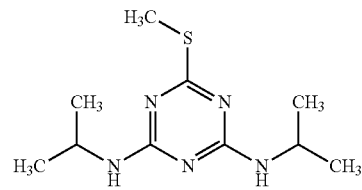 [SMILES: CSc1nc(NC(C)C)nc(NC(C)C)n1]

Prometryn can be applied to vegetation or an area adjacent the vegetation or applied to soil or water to prevent the emergence or growth of vegetation in an amount sufficient to induce a herbicidal effect. In some aspects, prometryn is applied to vegetation or an area adjacent the vegetation or applied to soil or water to prevent the emergence or growth of vegetation in an amount of 500 g ai/ha or more, such as 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1050 g ai/ha or more, 1100 g ai/ha or more, 1150 g ai/ha or more, 1200 g ai/ha or more, 1250 g ai/ha or more, 1300 g ai/ha or more, 1350 g ai/ha or more, 1400 g ai/ha or more, 1450 g ai/ha or more, 1500 g ai/ha or more, 1550 g ai/ha or more, 1600 g ai/ha or more, 1650 g ai/ha or more, 1700 g ai/ha or more, 1750 g ai/ha or more, 1800 g ai/ha or more, 1850 g ai/ha or more, 1900 g ai/ha or more, 1950 g ai/ha or more, 2000 g ai/ha or more, 2100 g ai/ha or more, 2200 g ai/ha or more, 2300 g ai/ha or more, 2400 g ai/ha or more, 2500 g ai/ha or more, 2600 g ai/ha or more, or 2700 g ai/ha or more; in an amount of 2750 g ai/ha or less, such as 2700 g ai/ha or less, 2600 g ai/ha or less, 2500 g ai/ha or less, 2400 g ai/ha or less, 2300 g ai/ha or less, 2200 g ai/ha or less, 2100 g ai/ha or less, 2000 g ai/ha or less, 1950 g ai/ha or less, 1900 g ai/ha or less, 1850 g ai/ha or less, 1800 g ai/ha or less, 1750 g ai/ha or less, 1700 g ai/ha or less, 1650 g ai/ha or less, 1600 g ai/ha or less, 1550 g ai/ha or less, 1500 g ai/ha or less, 1450 g ai/ha or less, 1400 g ai/ha or less, 1350 g ai/ha or less, 1300 g ai/ha or less, 1250 g ai/ha or less, 1200 g ai/ha or less, 1150 g ai/ha or less, 1100 g ai/ha or less, 1050 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, or 550 g ai/ha or less; or in an amount ranging from any of the minimum values described above to any of the maximum values described above, such as 500-2750 g ai/ha, 650-2400 g ai/ha, 750-1800 g ai/ha, 900-2100 g ai/ha, 1300-2500 g ai/ha, 700-1700 g ai/ha, or 550-2700 g ai/ha.

Propanil

In some aspects, the PS-II inhibitor herbicide can comprise propanil or an agriculturally acceptable salt or ester thereof. Propanil, shown below, is 3',4'-dichloropropionanilide. Its herbicidal activity is exemplified in *The Pesticide Manual*, Seventeenth Edition, 2016. Exemplary uses of propanil include its use in post-emergence control of broadleaf and grass weeds in rice.

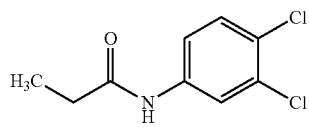

Propanil can be applied to vegetation or an area adjacent the vegetation or applied to soil or water to prevent the emergence or growth of vegetation in an amount sufficient to induce a herbicidal effect. In some aspects, propanil is applied to vegetation or an area adjacent the vegetation or applied to soil or water to prevent the emergence or growth of vegetation in an amount of 5 g ai/ha or more, such as 10 g ai/ha or more, 15 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, 100 g ai/ha or more, 120 g ai/ha or more, 140 g ai/ha or more, 150 g ai/ha or more, 160 g ai/ha or more, 180 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 425 g ai/ha or more, 450 g ai/ha or more, 475 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2300 g ai/ha or more, 2400 g ai/ha or more, 2500 g ai/ha or more, 2600 g ai/ha or more, 2700 g ai/ha or more, 2800 g ai/ha or more, 2900 g ai/ha or more, 3000 g ai/ha or more, 3100 g ai/ha or more, 3200 g ai/ha or more, 3300 g ai/ha or more, 3400 g ai/ha or more, 3500 g ai/ha or more, 3600 g ai/ha or more, 3700 g ai/ha or more, 3800 g ai/ha or more, or 3900 g ai/ha or more; in an amount of 4000 g ai/ha or less, such as 3900 g ai/ha or less, 3800 g ai/ha or less, 3700 g ai/ha or less, 3600 g ai/ha or less, 3500 g ai/ha or less, 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 475 g ai/ha or less, 450 g ai/ha or less, 425 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 180 g ai/ha or less, 160 g ai/ha or less, 150 g ai/ha or less, 140 g ai/ha or less, 120 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 15 g ai/ha or less, or 10 g ai/ha or less; or in an amount ranging from any of the minimum values described above to any of the maximum values described above, such as 5-4000 g ai/ha, 20-3700 g ai/ha, 250-1200 g ai/ha, 600-2300 g ai/ha, 45-800 g ai/ha, 350-3200 g ai/ha, 75-2200 g ai/ha, 850-2500 g ai/ha, 1600-3700 g ai/ha, 180-2800 g ai/ha, or 10-3950 g ai/ha.

Propazine

In some aspects, the PS-II inhibitor herbicide can comprise propazine or an agriculturally acceptable salt or ester thereof. Propazine, shown below, is 6-chloro-$N^2$,$N^4$-diisopropyl-1,3,5-triazine-2,4-diamine. Its herbicidal activity is exemplified in *The Pesticide Manual*, Seventeenth Edition, 2016. Exemplary uses of propazine include its use in pre-plant, pre-, or post-emergence control of grass and broadleaf weeds in sorghum, carrots, chervil, parsley, and glasshouse ornamentals.

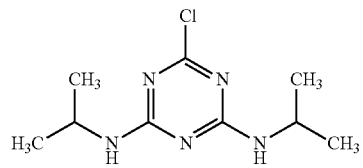

Propazine can be applied to vegetation or an area adjacent the vegetation or applied to soil or water to prevent the emergence or growth of vegetation in an amount sufficient to induce a herbicidal effect. In some aspects, propazine is applied to vegetation or an area adjacent the vegetation or applied to soil or water to prevent the emergence or growth of vegetation in an amount of 250 g ai/ha or more, such as 275 g ai/ha or more, 300 g ai/ha or more, 325 g ai/ha or more, 350 g ai/ha or more, 375 g ai/ha or more, 400 g ai/ha or more, 425 g ai/ha or more, 450 g ai/ha or more, 475 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2300 g ai/ha or more, 2400 g ai/ha or more, 2500 g ai/ha or more, 2600 g ai/ha or more, 2700 g ai/ha or more, 2800 g ai/ha or more, 2900 g ai/ha or more, 3000 g ai/ha or more, 3100 g ai/ha or more, 3200 g ai/ha or more, 3300 g ai/ha or more, or 3400 g ai/ha or more; in an amount of 3500 g ai/ha or less, such as 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 475 g ai/ha or less, 450 g ai/ha or less, 425 g ai/ha or less, 400 g ai/ha or less, 375 g ai/ha or less, 350 g ai/ha or less, 325 g ai/ha or less, 300 g ai/ha or less, or 275 g ai/ha or less; or in an amount ranging from any of the minimum values described above to any of the maximum values described above, such as 275-3500 g ai/ha, 300-3000 g ai/ha, 450-1200 g ai/ha, 600-2300 g ai/ha, 325-800 g ai/ha, 850-2600 g ai/ha, 750-2200 g ai/ha, 500-1500 g ai/ha, 1600-3100 g ai/ha, 900-3300 g ai/ha, or 275-3400 g ai/ha.

Pyridafol

In some aspects, the PS-II inhibitor herbicide can comprise pyridafol or an agriculturally acceptable salt or ester thereof. Pyridafol, shown below, is 6-chloro-3-phenylpyridazin-4-ol. According to *The Pesticide Manual*, Seventeenth Edition, 2016, pyridafol was evaluated by Novartis Crop Protection AG.

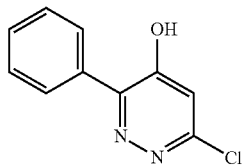 [SMILES: Oc1cc(Cl)nnc1-c1ccccc1]

Pyridate

In some aspects, the PS-II inhibitor herbicide can comprise pyridate or an agriculturally acceptable salt or ester thereof. Pyridate, shown below, is O-6-chloro-3-phenylpyridazin-4-yl S-octyl thiocarbonate. Its herbicidal activity is exemplified in *The Pesticide Manual*, Seventeenth Edition, 2016. Exemplary uses of pyridate include its use in post-emergence control of annual broadleaf weeds and some grass weeds in maize, oilseed rape, cereals, rice, peanuts, and vegetables.

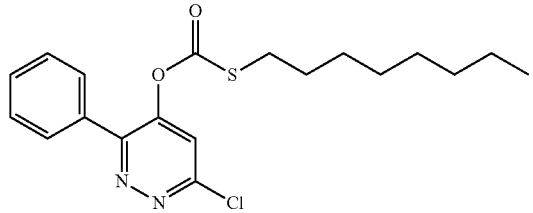 [SMILES: CCCCCCCCSC(=O)Oc1cc(Cl)nnc1-c1ccccc1]

Pyridate can be applied to vegetation or an area adjacent the vegetation or applied to soil or water to prevent the emergence or growth of vegetation in an amount sufficient to induce a herbicidal effect. In some aspects, pyridate is applied to vegetation or an area adjacent the vegetation or applied to soil or water to prevent the emergence or growth of vegetation in an amount of 100 g ai/ha or more, such as 110 g ai/ha or more, 120 g ai/ha or more, 125 g ai/ha or more, 130 g ai/ha or more, 140 g ai/ha or more, 150 g ai/ha or more, 160 g ai/ha or more, 170 g ai/ha or more, 180 g ai/ha or more, 190 g ai/ha or more, 200 g ai/ha or more, 210 g ai/ha or more, 220 g ai/ha or more, 230 g ai/ha or more, 240 g ai/ha or more, 250 g ai/ha or more, 260 g ai/ha or more, 270 g ai/ha or more, 280 g ai/ha or more, 290 g ai/ha or more, 300 g ai/ha or more, 325 g ai/ha or more, 350 g ai/ha or more, 375 g ai/ha or more, 400 g ai/ha or more, 425 g ai/ha or more, 450 g ai/ha or more, 475 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1100 g ai/ha or more, 1200 g ai/ha or more, 1300 g ai/ha or more, 1400 g ai/ha or more, or 1450 g ai/ha or more; in an amount of 1500 g ai/ha or less, such as 1450 g ai/ha or less, 1400 g ai/ha or less, 1300 g ai/ha or less, 1200 g ai/ha or less, 1100 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 475 g ai/ha or less, 450 g ai/ha or less, 425 g ai/ha or less, 400 g ai/ha or less, 375 g ai/ha or less, 350 g ai/ha or less, 325 g ai/ha or less, 300 g ai/ha or less, 290 g ai/ha or less, 280 g ai/ha or less, 270 g ai/ha or less, 260 g ai/ha or less, 250 g ai/ha or less, 240 g ai/ha or less, 230 g ai/ha or less, 220 g ai/ha or less, 210 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 125 g ai/ha or less, 120 g ai/ha or less, or 110 g ai/ha or less; or in an amount ranging from any of the minimum values described above to any of the maximum values described above, such as 100-1500 g ai/ha, 120-700 g ai/ha, 250-1100 g ai/ha, 300-800 g ai/ha, 450-1000 g ai/ha, 350-1200 g ai/ha, 210-900 g ai/ha, 125-500 g ai/ha, 375-1400 g ai/ha, 180-600 g ai/ha, or 110-1450 g ai/ha.

Siduron

In some aspects, the PS-II inhibitor herbicide can comprise siduron or an agriculturally acceptable salt or ester thereof. Siduron, shown below, is 1-(2-methylcyclohexyl)-3-phenylurea. Its herbicidal activity is exemplified in *The Pesticide Manual*, Seventeenth Edition, 2016. Exemplary uses of siduron include its use in pre-emergence control of *Digitaria* spp. and annual grass weeds in turf farms, grass seed production, and established turf.

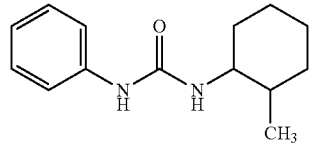 [SMILES: CC1CCCCC1NC(=O)Nc1ccccc1]

Siduron can be applied to vegetation or an area adjacent the vegetation or applied to soil or water to prevent the emergence or growth of vegetation in an amount sufficient to induce a herbicidal effect. In some aspects, siduron is applied to vegetation or an area adjacent the vegetation or applied to soil or water to prevent the emergence or growth of vegetation in an amount of 2000 g ai/ha or more, such as 2100 g ai/ha or more, 2250 g ai/ha or more, 2500 g ai/ha or more, 2750 g ai/ha or more, 3000 g ai/ha or more, 3500 g ai/ha or more, 4000 g ai/ha or more, 4500 g ai/ha or more, 5000 g ai/ha or more, 6000 g ai/ha or more, 7000 g ai/ha or more, 7500 g ai/ha or more, 8000 g ai/ha or more, 9000 g ai/ha or more, 10,000 g ai/ha or more, 11,000 g ai/ha or more, 12,000 g ai/ha or more, 13,000 g ai/ha or more, 14,000 g ai/ha or more, or 14,500 g ai/ha or more; in an amount of 15,000 g ai/ha or less, such as 14,500 g ai/ha or less, 14,000 g ai/ha or less, 13,000 g ai/ha or less, 12,000 g ai/ha or less, 11,000 g ai/ha or less, 10,000 g ai/ha or less, 9000 g ai/ha or less, 8000 g ai/ha or less, 7500 g ai/ha or less, 7000 g ai/ha or less, 6000 g ai/ha or less, 5000 g ai/ha or less, 4500 g ai/ha or less, 4000 g ai/ha or less, 3500 g ai/ha or less, 3000 g ai/ha or less, 2750 g ai/ha or less, 2500 g ai/ha or less, 2250 g ai/ha or less, or 2100 g ai/ha or less; or in an amount ranging from any of the minimum values described above to any of the maximum values described above, such as 2000-15,000 g ai/ha, 2500-13,000 g ai/ha, 6000-9000 g ai/ha, 8000-14,000 g ai/ha, 4500-11,000 g ai/ha, 2750-7500 g ai/ha, 3000-12,000 g ai/ha, 7000-10,000 g ai/ha, 4000-12,000 g ai/ha, or 2100-14,500 g ai/ha.

Simazine

In some aspects, the PS-II inhibitor herbicide can comprise simazine or an agriculturally acceptable salt or ester thereof. Simazine, shown below, is 6-chloro-$N^2,N^4$-diethyl-1,3,5-triazine-2,4-diamine. Its herbicidal activity is exemplified in *The Pesticide Manual*, Seventeenth Edition, 2016. Exemplary uses of simazine include its use in pre-emergence control of broadleaf and annual grass weeds in pome fruit, stone fruit, bush and cane fruits, citrus, vines, strawberries, nuts, olives, pineapples, field beans, French beans, peas, maize, asparagus, hops, alfalfa, lupins, oilseed rape, artichokes, sugar cane, plantation trees, turf, and ornamentals.

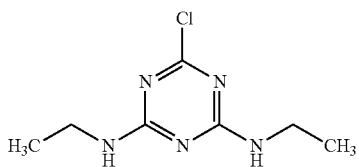

Simazine can be applied to vegetation or an area adjacent the vegetation or applied to soil or water to prevent the emergence or growth of vegetation in an amount sufficient to induce a herbicidal effect. In some aspects, simazine is applied to vegetation or an area adjacent the vegetation or applied to soil or water to prevent the emergence or growth of vegetation in an amount of 1250 g ai/ha or more, such as 1300 g ai/ha or more, 1350 g ai/ha or more, 1400 g ai/ha or more, 1450 g ai/ha or more, 1500 g ai/ha or more, 1550 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2300 g ai/ha or more, 2400 g ai/ha or more, 2500 g ai/ha or more, 2600 g ai/ha or more, 2700 g ai/ha or more, 2800 g ai/ha or more, 2900 g ai/ha or more, 3000 g ai/ha or more, 3100 g ai/ha or more, 3200 g ai/ha or more, 3300 g ai/ha or more, or 3400 g ai/ha or more; in an amount of 3500 g ai/ha or less, such as 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1550 g ai/ha or less, 1500 g ai/ha or less, 1450 g ai/ha or less, 1400 g ai/ha or less, 1350 g ai/ha or less, or 1300 g ai/ha or less; or in an amount ranging from any of the minimum values described above to any of the maximum values described above, such as 1250-3500 g ai/ha, 1300-3000 g ai/ha, 1450-1900 g ai/ha, 1600-2300 g ai/ha, 1100-2800 g ai/ha, 1550-2000 g ai/ha, 2100-2600 g ai/ha, 1500-2500 g ai/ha, 1600-3100 g ai/ha, 2400-3300 g ai/ha, or 1300-3400 g ai/ha.

Symetryn

In some aspects, the PS-II inhibitor herbicide can comprise symetryn or an agriculturally acceptable salt or ester thereof. Symetryn, shown below, is $N^2,N^4$-diethyl-6-methylthio-1,3,5-triazine-2,4-diamine. Its herbicidal activity is exemplified in *The Pesticide Manual*, Seventeenth Edition, 2016. Exemplary uses of symetryn include its use in control of broadleaf weeds in rice.

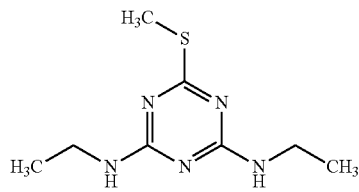

Tebuthiuron

In some aspects, the PS-II inhibitor herbicide can comprise tebuthiuron or an agriculturally acceptable salt or ester thereof. Tebuthiuron, shown below, is 1-(5-tert-butyl-1,3,4-thiadiazol-2-yl)-1,3-dimethylurea. Its herbicidal activity is exemplified in *The Pesticide Manual*, Seventeenth Edition, 2016. Exemplary uses of tebuthiuron include its use in pre-emergence control of herbaceous and woody plants, annual weeds, and perennial grass and broadleaf weeds in non-crop sites, pastures, rangeland, and sugar cane.

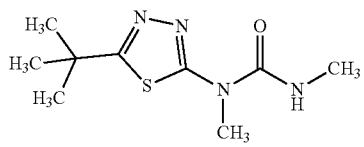

Tebuthiuron can be applied to vegetation or an area adjacent the vegetation or applied to soil or water to prevent the emergence or growth of vegetation in an amount sufficient to induce a herbicidal effect. In some aspects, tebuthiuron is applied to vegetation or an area adjacent the vegetation or applied to soil or water to prevent the emergence or growth of vegetation in an amount of 500 g ai/ha or more, such as 520 g ai/ha or more, 540 g ai/ha or more, 560 g ai/ha or more, 580 g ai/ha or more, 600 g ai/ha or more, 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, 975 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2250 g ai/ha or more, 2500 g ai/ha or more, 2750 g ai/ha or more, 3000 g ai/ha or more, 3500 g ai/ha or more, 4000 g ai/ha or more, 4500 g ai/ha or more, 5000 g ai/ha or more, 6000 g ai/ha or more, or 6500 g ai/ha or more; in an amount of 7000 g ai/ha or less, such as 6500 g ai/ha or less, 6000 g ai/ha or less, 5000 g ai/ha or less, 4500 g ai/ha or less, 4000 g ai/ha or less, 3500 g ai/ha or less, 3000 g ai/ha or less, 2750 g ai/ha or less, 2500 g ai/ha or less, 2250 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 580 g ai/ha or less, 560 g ai/ha or less, 540 g ai/ha or less, or 520 g ai/ha or less; or in an amount ranging from any of the minimum values described above to any of the maximum values described above, such as 500-7000 g ai/ha, 2500-5000 g ai/ha, 600-900 g ai/ha, 825-1400 g ai/ha, 4500-7000 g ai/ha, 750-5000 g ai/ha, 1000-3500 g ai/ha, 975-4000 g ai/ha, 700-1200 g ai/ha, or 520-6500 g ai/ha.

Terbacil

In some aspects, the PS-II inhibitor herbicide can comprise terbacil or an agriculturally acceptable salt or ester thereof. Terbacil, shown below, is 3-tert-butyl-5-chloro-6-methyluracil. Its herbicidal activity is exemplified in *The Pesticide Manual*, Seventeenth Edition, 2016. Exemplary uses of terbacil include its use in pre- and post-emergence control of annual and some perennial grass, broadleaf, and sedge weeds in apples, citrus, alfalfa, tree fruit, strawberries, blueberries, mint, and sugar cane.

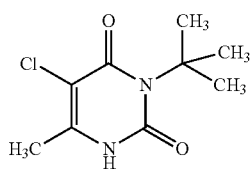

Terbacil can be applied to vegetation or an area adjacent the vegetation or applied to soil or water to prevent the emergence or growth of vegetation in an amount sufficient to induce a herbicidal effect. In some aspects, terbacil is applied to vegetation or an area adjacent the vegetation or applied to soil or water to prevent the emergence or growth of vegetation in an amount of 300 g ai/ha or more, such as 310 g ai/ha or more, 320 g ai/ha or more, 330 g ai/ha or more, 340 g ai/ha or more, 350 g ai/ha or more, 360 g ai/ha or more, 370 g ai/ha or more, 380 g ai/ha or more, 390 g ai/ha or more, 400 g ai/ha or more, 420 g ai/ha or more, 440 g ai/ha or more, 460 g ai/ha or more, 480 g ai/ha or more, 500 g ai/ha or more, 520 g ai/ha or more, 540 g ai/ha or more, 560 g ai/ha or more, 580 g ai/ha or more, 600 g ai/ha or more, 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, 975 g ai/ha or more, 1000 g ai/ha or more, 1100 g ai/ha or more, 1200 g ai/ha or more, 1400 g ai/ha or more, 1600 g ai/ha or more, 1800 g ai/ha or more, 2000 g ai/ha or more, 2200 g ai/ha or more, 2400 g ai/ha or more, 2500 g ai/ha or more, 2600 g ai/ha or more, 2800 g ai/ha or more, 3000 g ai/ha or more, 3200 g ai/ha or more, 3400 g ai/ha or more, 3500 g ai/ha or more, 3600 g ai/ha or more, 3800 g ai/ha or more, 4000 g ai/ha or more, 4200 g ai/ha or more, or 4400 g ai/ha or more; in an amount of 4500 g ai/ha or less, such as 4400 g ai/ha or less, 4200 g ai/ha or less, 4000 g ai/ha or less, 3800 g ai/ha or less, 3600 g ai/ha or less, 3500 g ai/ha or less, 3400 g ai/ha or less, 3200 g ai/ha or less, 3000 g ai/ha or less, 2800 g ai/ha or less, 2600 g ai/ha or less, 2500 g ai/ha or less, 2400 g ai/ha or less, 2200 g ai/ha or less, 2000 g ai/ha or less, 1800 g ai/ha or less, 1600 g ai/ha or less, 1400 g ai/ha or less, 1200 g ai/ha or less, 1100 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 580 g ai/ha or less, 560 g ai/ha or less, 540 g ai/ha or less, 520 g ai/ha or less, 500 g ai/ha or less, 480 g ai/ha or less, 460 g ai/ha or less, 440 g ai/ha or less, 420 g ai/ha or less, 400 g ai/ha or less, 390 g ai/ha or less, 380 g ai/ha or less, 370 g ai/ha or less, 360 g ai/ha or less, 350 g ai/ha or less, 340 g ai/ha or less, 330 g ai/ha or less, 320 g ai/ha or less, or 310 g ai/ha or less; or in an amount ranging from any of the minimum values described above to any of the maximum values described above, such as 300-4500 g ai/ha, 370-4000 g ai/ha, 1400-2600 g ai/ha, 600-3800 g ai/ha, 540-2600 g ai/ha, 1100-2800 g ai/ha, 1600-2500 g ai/ha, 2000-3200 g ai/ha, 2500-4200 g ai/ha, 700-1500 g ai/ha, 350-3400 g ai/ha, or 310-4400 g ai/ha.

Terbumeton

In some aspects, the PS-II inhibitor herbicide can comprise terbumeton or an agriculturally acceptable salt or ester thereof. Terbumeton, shown below, is $N^2$-tert-butyl-$N^4$-ethyl-6-methoxy-1,3,5-triazine-2,4-diamine. Its herbicidal activity is exemplified in *The Pesticide Manual*, Seventeenth Edition, 2016. Exemplary uses of terbumeton include its use in pre-emergence control of annual and perennial grass and broadleaf weeds in citrus, vineyards, apples, and forestry.

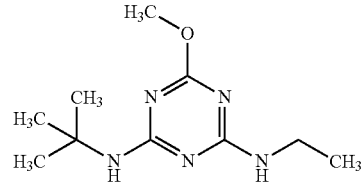 [SMILES: CCNc1nc(NC(C)(C)C)nc(OC)n1]

Terbumeton can be applied to vegetation or an area adjacent the vegetation or applied to soil or water to prevent the emergence or growth of vegetation in an amount sufficient to induce a herbicidal effect. In some aspects, terbumeton is applied to vegetation or an area adjacent the vegetation or applied to soil or water to prevent the emergence or growth of vegetation in an amount of 2700 g ai/ha or more, such as 2750 g ai/ha or more, 2800 g ai/ha or more, 2900 g ai/ha or more, 3000 g ai/ha or more, 3100 g ai/ha or more, 3200 g ai/ha or more, 3300 g ai/ha or more, 3400 g ai/ha or more, 3500 g ai/ha or more, 3600 g ai/ha or more, 3700 g ai/ha or more, 3800 g ai/ha or more, 3900 g ai/ha or more 4000 g ai/ha or more, 4100 g ai/ha or more, 4200 g ai/ha or more, 4300 g ai/ha or more, 4400 g ai/ha or more, 4500 g ai/ha or more, 4600 g ai/ha or more, 4700 g ai/ha or more, 4800 g ai/ha or more, 4900 g ai/ha or more, 5000 g ai/ha or more, 5100 g ai/ha or more, 5200 g ai/ha or more, 5300 g ai/ha or more, 5400 g ai/ha or more, 5500 g ai/ha or more, 5600 g ai/ha or more, 5700 g ai/ha or more, 5800 g ai/ha or more, 5900 g ai/ha or more, 6000 g ai/ha or more, 6100 g ai/ha or more, 6250 g ai/ha or more, 6500 g ai/ha or more, or 6750 g ai/ha or more; in an amount of 7000 g ai/ha or less, such as 6750 g ai/ha or less, 6500 g ai/ha or less, 6250 g ai/ha or less, 6100 g ai/ha or less, 6000 g ai/ha or less, 5900 g ai/ha or less, 5800 g ai/ha or less, 5700 g ai/ha or less, 5600 g ai/ha or less, 5500 g ai/ha or less, 5400 g ai/ha or less, 5300 g ai/ha or less, 5200 g ai/ha or less, 5100 g ai/ha or less, 5000 g ai/ha or less, 4900 g ai/ha or less, 4800 g ai/ha or less, 4700 g ai/ha or less, 4600 g ai/ha or less, 4500 g ai/ha or less, 4400 g ai/ha or less, 4300 g ai/ha or less, 4200 g ai/ha or less, 4100 g ai/ha or less, 4000 g ai/ha or less, 3900 g ai/ha or less, 3800 g ai/ha or less, 3700 g ai/ha or less, 3600 g ai/ha or less, 3500 g ai/ha or less, 3400 g ai/ha or less, 3300 g ai/ha or less, 3200 g ai/ha or less, 3100 g ai/ha or less, 3000 g ai/ha or less, 2900 g ai/ha or less, 2800 g ai/ha or less, or 2750 g ai/ha or less; or in an amount ranging from any of the minimum values described above to any of the maximum values described above, such as 2700-7000 g ai/ha, 3500-6000 g ai/ha, 4600-6900 g ai/ha, 2800-4400 g ai/ha, 5700-6100 g ai/ha, 3700-5000 g ai/ha, 3000-5500 g ai/ha, 2900-6300 g ai/ha, 3600-4900 g ai/ha, or 2750-6750 g ai/ha.

Terbutylazine

In some aspects, the PS-II inhibitor herbicide can comprise terbuthylazine or an agriculturally acceptable salt or ester thereof. Terbuthylazine, shown below, is $N^2$-tert-butyl-6-chloro-$N^4$-ethyl-1,3,5-triazine-2,4-diamine. Its herbicidal activity is exemplified in *The Pesticide Manual*, Seventeenth Edition, 2016. Exemplary uses of terbuthylazine include its use in pre- and post-emergence control of broadleaf and grass weeds in maize, sorghum, tree fruits, citrus, vines, coffee, oil palms, cocoa, potatoes, olives, peas, beans, sugar cane, rubber, tree nurseries, and new plantings.

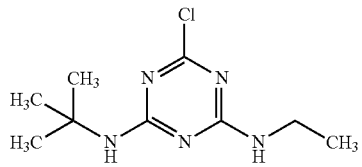

Terbuthylazine can be applied to vegetation or an area adjacent the vegetation or applied to soil or water to prevent the emergence or growth of vegetation in an amount sufficient to induce a herbicidal effect. In some aspects, terbuthylazine is applied to vegetation or an area adjacent the vegetation or applied to soil or water to prevent the emergence or growth of vegetation in an amount of 500 g ai/ha or more, such as 520 g ai/ha or more, 540 g ai/ha or more, 560 g ai/ha or more, 580 g ai/ha or more, 600 g ai/ha or more, 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, 975 g ai/ha or more, 1000 g ai/ha or more, 1100 g ai/ha or more, 1200 g ai/ha or more, 1300 g ai/ha or more, 1400 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2250 g ai/ha or more, 2500 g ai/ha or more, or 2750 g ai/ha or more; in an amount of 3000 g ai/ha or less, such as 2750 g ai/ha or less, 2500 g ai/ha or less, 2250 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1400 g ai/ha or less, 1300 g ai/ha or less, 1200 g ai/ha or less, 1100 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 580 g ai/ha or less, 560 g ai/ha or less, 540 g ai/ha or less, or 520 g ai/ha or less; or in an amount ranging from any of the minimum values described above to any of the maximum values described above, such as 500-3000 g ai/ha, 540-2000 g ai/ha, 600-900 g ai/ha, 825-2250 g ai/ha, 700-2100 g ai/ha, 750-1700 g ai/ha, 1000-2500 g ai/ha, 975-1300 g ai/ha, 600-1900 g ai/ha, or 520-2750 g ai/ha.

Terbutryn

In some aspects, the PS-II inhibitor herbicide can comprise terbutryn or an agriculturally acceptable salt or ester thereof. Terbutryn, shown below, is $N^2$-tert-butyl-N-ethyl-6-methylthio-1,3,5-triazine-2,4-diamine. Its herbicidal activity is exemplified in *The Pesticide Manual*, Seventeenth Edition, 2016. Exemplary uses of terbutryn include its use in pre-emergence control of broadleaf and grass weeds in winter cereals, beans, peas, maize, sugar cane, sunflowers, potatoes, cotton, and peanuts.

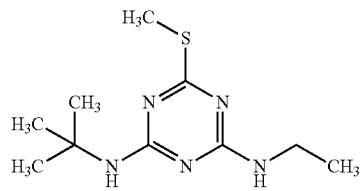 [SMILES: CCNc1nc(NC(C)(C)C)nc(SC)n1]

Terbutryn can be applied to vegetation or an area adjacent the vegetation or applied to soil or water to prevent the emergence or growth of vegetation in an amount sufficient to induce a herbicidal effect. In some aspects, terbutryn is applied to vegetation or an area adjacent the vegetation or applied to soil or water to prevent the emergence or growth of vegetation in an amount of 150 g ai/ha or more, such as 175 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 425 g ai/ha or more, 450 g ai/ha or more, 475 g ai/ha or more, 500 g ai/ha or more, 525 g ai/ha or more, 550 g ai/ha or more, 575 g ai/ha or more, 600 g ai/ha or more, 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, 975 g ai/ha or more, 1000 g ai/ha or more, 1050 g ai/ha or more, 1100 g ai/ha or more, 1150 g ai/ha or more, 1200 g ai/ha or more, 1250 g ai/ha or more, 1300 g ai/ha or more, 1350 g ai/ha or more, 1400 g ai/ha or more, 1450 g ai/ha or more, or 1500 g ai/ha or more, 1600 g ai/ha or more, 1700 g ai/ha or more, 1800 g ai/ha or more, 1900 g ai/ha or more, 2000 g ai/ha or more, 2100 g ai/ha or more, 2200 g ai/ha or more, 2300 g ai/ha or more, 2400 g ai/ha or more, 2500 g ai/ha or more, 2600 g ai/ha or more, 2700 g ai/ha or more, 2800 g ai/ha or more, 2900 g ai/ha or more; in an amount of 3000 g ai/ha or less, such as 2900 g ai/ha or less, 2800 g ai/ha or less, 2700 g ai/ha or less, 2600 g ai/ha or less, 2500 g ai/ha or less, 2400 g ai/ha or less, 2300 g ai/ha or less, 2200 g ai/ha or less, 2100 g ai/ha or less, 2000 g ai/ha or less, 1900 g ai/ha or less, 1800 g ai/ha or less, 1700 g ai/ha or less, 1600 g ai/ha or less, 1500 g ai/ha or less, 1450 g ai/ha or less, 1400 g ai/ha or less, 1350 g ai/ha or less, 1300 g ai/ha or less, 1250 g ai/ha or less, 1200 g ai/ha or less, 1150 g ai/ha or less, 1100 g ai/ha or less, 1050 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 575 g ai/ha or less, 550 g ai/ha or less, 525 g ai/ha or less, 500 g ai/ha or less, 475 g ai/ha or less, 450 g ai/ha or less, 425 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, or 175 g ai/ha or less; or in an amount ranging from any of the minimum values described above to any of the maximum values described above, such as 150-3000 g ai/ha, 325-2800 g ai/ha, 575-2900 g ai/ha, 275-1300 g ai/ha, 850-1700 g ai/ha, 2000-2800 g ai/ha, 600-1050 g ai/ha, 450-1450 g ai/ha, or 175-2900 g ai/ha.

Trietazine

In some aspects, the PS-II inhibitor herbicide can comprise trietazine or an agriculturally acceptable salt or ester thereof. Trietazine, shown below, is 6-chloro-$N^2,N^2,N^4$-triethyl-1,3,5-triazine-2,4-diamine. Its herbicidal activity is exemplified in *The Pesticide Manual*, Seventeenth Edition, 2016. Exemplary uses of trietazine include its use in control of weeds in potatoes, field beans, and peas.

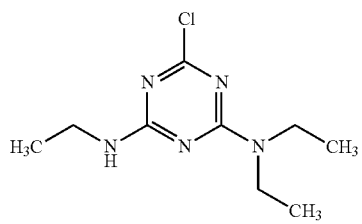

Trietazine can be applied to vegetation or an area adjacent the vegetation or applied to soil or water to prevent the emergence or growth of vegetation in an amount sufficient to induce a herbicidal effect. In some aspects, trietazine is applied to vegetation or an area adjacent the vegetation or applied to soil or water to prevent the emergence or growth of vegetation in an amount of 1500 g ai/ha or more, such as 1550 g ai/ha or more, 1600 g ai/ha or more, 1700 g ai/ha or more, 1800 g ai/ha or more, 1900 g ai/ha or more, 2000 g ai/ha or more, 2200 g ai/ha or more, 2400 g ai/ha or more, 2500 g ai/ha or more, 2600 g ai/ha or more, 2800 g ai/ha or more, 3000 g ai/ha or more, 3200 g ai/ha or more, 3400 g ai/ha or more, 3500 g ai/ha or more, 3600 g ai/ha or more, 3800 g ai/ha or more, 4000 g ai/ha or more, 4200 g ai/ha or more, 4300 g ai/ha or more, or 4400 g ai/ha or more; in an amount of 4500 g ai/ha or less, such as 4400 g ai/ha or less, 4300 g ai/ha or less, 4200 g ai/ha or less, 4000 g ai/ha or less, 3800 g ai/ha or less, 3600 g ai/ha or less, 3500 g ai/ha or less, 3400 g ai/ha or less, 3200 g ai/ha or less, 3000 g ai/ha or less, 2800 g ai/ha or less, 2600 g ai/ha or less, 2500 g ai/ha or less, 2400 g ai/ha or less, 2200 g ai/ha or less, 2000 g ai/ha or less, 1900 g ai/ha or less, 1800 g ai/ha or less, 1700 g ai/ha or less, 1600 g ai/ha or less, or 1550 g ai/ha or less; or in an amount ranging from any of the minimum values described above to any of the maximum values described above, such as 1500-4500 g ai/ha, 1600-4000 g ai/ha, 1900-2600 g ai/ha, 2600-3800 g ai/ha, 2200-3200 g ai/ha, 1900-2800 g ai/ha, 2100-2500 g ai/ha, 2000-3200 g ai/ha, 2500-4200 g ai/ha, 1500-3500 g ai/ha, or 1550-4400 g ai/ha.

IV. HPPD Inhibitor Herbicides

In addition to the pyridine carboxylate herbicide or agriculturally acceptable N-oxide, salt or ester thereof, the compositions can optionally include a 4-hydroxyphenyl-pyruvate dioxygenase (HPPD) inhibitor herbicide. HPPD inhibitor herbicides interfere with an oxygenase enzyme involved in the creation of energy in plants and higher order eukaryotes. Examples of HPPD inhibitors include benzobicyclon, benzofenap, bicyclopyrone, fenquinotrione, isoxachlortole, isoxaflutole, lancotrione, mesotrione, pyrasulfotole, pyrazolynate, pyrazoxyfen, sulcotrione, tefuryltrione, tembotrione, tolpyralate, topramezone, or an agriculturally acceptable salt or ester thereof, and combinations thereof.

In some aspects, the composition can include a HPPD inhibitor herbicide selected from the group consisting of benzobicyclon, benzofenap, bicyclopyrone, fenquinotrione, isoxachlortole, isoxaflutole, lancotrione, mesotrione, pyrasulfotole, pyrazolynate, pyrazoxyfen, sulcotrione, tefuryltrione, tembotrione, tolpyralate, topramezone, an agriculturally acceptable salt or ester thereof, and combinations thereof.

The HPPD inhibitor herbicide or agriculturally acceptable salt or ester thereof can be applied to vegetation or an area adjacent the vegetation or applied to soil or water to prevent the emergence or growth of vegetation in an amount sufficient to induce a herbicidal effect. In some aspects, the HPPD inhibitor herbicide or agriculturally acceptable salt or ester thereof is applied to vegetation or an area adjacent the vegetation or applied to soil or water to prevent the emergence or growth of vegetation in an amount of 1 g ai/ha or more, such as 1.1 g ai/ha or more, 1.25 g ai/ha or more, 1.5 g ai/ha or more, 1.75 g ai/ha or more, 2 g ai/ha or more, 2.5 g ai/ha or more, 3 g ai/ha or more, 3.5 g ai/ha or more, 4 g ai/ha or more, 5 g ai/ha or more, 6 g ai/ha or more, 7 g ai/ha or more, 8 g ai/ha or more, 9 g ai/ha or more, 10 g ai/ha or more, 11 g ai/ha or more, 12 g ai/ha or more, 13 g ai/ha or more, 14 g ai/ha or more, 15 g ai/ha or more, 16 g ai/ha or more, 17 g ai/ha or more, 18 g ai/ha or more, 19 g ai/ha or more, 20 g ai/ha or more, 21 g ai/ha or more, 22 g ai/ha or more, 23 g ai/ha or more, 24 g ai/ha or more, 25 g ai/ha or more, 26 g ai/ha or more, 27 g ai/ha or more, 28 g ai/ha or more, 29 g ai/ha or more, 30 g ai/ha or more, 31 g ai/ha or more, 32 g ai/ha or more, 33 g ai/ha or more, 34 g ai/ha or more, 35 g ai/ha or more, 36 g ai/ha or more, 37 g ai/ha or more, 38 g ai/ha or more, 39 g ai/ha or more, 40 g ai/ha or more, 41 g ai/ha or more, 42 g ai/ha or more, 43 g ai/ha or more, 44 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, 100 g ai/ha or more, 110 g ai/ha or more, 120 g ai/ha or more, 130 g ai/ha or more, 140 g ai/ha or more, 150 g ai/ha or more, 160 g ai/ha or more, 170 g ai/ha or more, 180 g ai/ha or more, 190 g ai/ha or more, 200 g ai/ha or more, 220 g ai/ha or more, 240 g ai/ha or more, 250 g ai/ha or more, 260 g ai/ha or more, 280 g ai/ha or more, 300 g ai/ha or more, 320 g ai/ha or more, 340 g ai/ha or more, 350 g ai/ha or more, 360 g ai/ha or more, 380 g ai/ha or more, 400 g ai/ha or more, 450 g ai/ha or more, 500 g ai/ha or more, 550 g ai/ha or more, 600 g ai/ha or more, 650 g ai/ha or more, 700 g ai/ha or more, 750 g ai/ha or more, 800 g ai/ha or more, 850 g ai/ha or more, 900 g ai/ha or more, 950 g ai/ha or more, 1000 g ai/ha or more, 1050 g ai/ha or more, 1100 g ai/ha or more, 1150 g ai/ha or more, 1200 g ai/ha or more, 1250 g ai/ha or more, 1300 g ai/ha or more, 1350 g ai/ha or more, 1400 g ai/ha or more, 1450 g ai/ha or more, 1500 g ai/ha or more, 1600 g ai/ha or more, 1700 g ai/ha or more, 1800 g ai/ha or more, 1900 g ai/ha or more, 2000 g ai/ha or more, 2050 g ai/ha or more, 2100 g ai/ha or more, 2150 g ai/ha or more, 2200 g ai/ha or more, 2240 g ai/ha or more, 2250 g ai/ha or more, 2300 g ai/ha or more, 2350 g ai/ha or more, 2400 g ai/ha or more, 2450 g ai/ha or more, 2500 g ai/ha or more, 2600 g ai/ha or more, 2700 g ai/ha or more, 2750 g ai/ha or more, 2800 g ai/ha or more, 2900 g ai/ha or more, 3000 g ai/ha or more, 3100 g ai/ha or more, 3200 g ai/ha or more, 3250 g ai/ha or more, 3300 g ai/ha or more, 3400 g ai/ha or more, 3500 g ai/ha or more, 3600 g ai/ha or more, 3700 g ai/ha or more, 3750 g ai/ha or more, 3800 g ai/ha or more, 3900 g ai/ha or more, 3950 g ai/ha or more, 4000 g ai/ha or more, 4100 g ai/ha or more, 4200 g ai/ha or more, 4250 g ai/ha or more, 4300 g ai/ha or more, or 4350 g ai/ha or more, or 4400 g ai/ha or more; in an amount of 4500 g ai/ha or less, such as 4450 g ai/ha or less, 4400 g ai/ha or less, 4350 g ai/ha or less, 4300 g ai/ha or less, 4250 g ai/ha or less, 4100 g ai/ha or less, 4000 g ai/ha or less, 3950 g ai/ha or less, 3900 g ai/ha or less, 3800 g ai/ha or less, 3750 g ai/ha or less, 3700 g ai/ha or less, 3600 g ai/ha or less, 3500 g ai/ha or less, 3400 g ai/ha or less, 3300 g ai/ha or less, 3250 g ai/ha or less, 3200 g ai/ha or less, 3100 g ai/ha or less, 3000 g ai/ha or less, 2900 g ai/ha or less, 2800 g ai/ha or less, 2750 g ai/ha or less, 2700 g ai/ha or less, 2600 g ai/ha or less, 2500 g ai/ha or less, 2450 g ai/ha or less, 2400 g ai/ha or less, 2350 g ai/ha or less, 2300 g ai/ha or less, 2250 g ai/ha or less, 2240 g ai/ha or less, 2200 g ai/ha or less, 2150 g ai/ha or less, 2100 g ai/ha or less, 2050 g ai/ha or less, 2000 g ai/ha or less, 1900 g ai/ha or less, 1800 g ai/ha or less, 1750 g ai/ha or less, 1700 g ai/ha or less, 1600 g ai/ha or less, 1500 g ai/ha or less, 1450 g ai/ha or less, 1400 g ai/ha or less, 1350 g ai/ha or less, 1300 g ai/ha or less, 1250 g ai/ha or less, 1240 g ai/ha or less, 1200 g ai/ha or less, 1150 g ai/ha or less, 1100 g ai/ha or less, 1050 g ai/ha or less, 1000 g ai/ha or less, 950 g ai/ha or less, 900 g ai/ha or less, 850 g ai/ha or less, 800 g ai/ha or less, 750 g ai/ha or less, 700 g ai/ha or less, 650 g ai/ha or less, 600 g ai/ha or less, 550 g ai/ha or less, 500 g ai/ha or less, 450 g ai/ha or less, 400 g ai/ha or less, 380 g ai/ha or less, 360 g ai/ha or less, 350 g ai/ha or less, 340 g ai/ha or less, 320 g ai/ha or less, 300 g ai/ha or less, 280 g ai/ha or less, 260 g ai/ha or less, 250 g ai/ha or less, 240 g ai/ha or less, 220 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 44 g ai/ha or less, 43 g ai/ha or less, 42 g ai/ha or less, 41 g ai/ha or less, 40 g ai/ha or less, 39 g ai/ha or less, 38 g ai/ha or less, 37 g ai/ha or less, 36 g ai/ha or less, 35 g ai/ha or less, 34 g ai/ha or less, 33 g ai/ha or less, 32 g ai/ha or less, 31 g ai/ha or less, 30 g ai/ha or less, 29 g ai/ha or less, 28 g ai/ha or less, 27 g ai/ha or less, 26 g ai/ha or less, 25 g ai/ha or less, 24 g ai/ha or less, 23 g ai/ha or less, 22 g ai/ha or less, 21 g ai/ha or less, 20 g ai/ha or less, 19 g ai/ha or less, 18 g ai/ha or less, 17 g ai/ha or less, 16 g ai/ha or less, 15 g ai/ha or less, 14 g ai/ha or less, 13 g ai/ha or less, 12 g ai/ha or less, 11 g ai/ha or less, 10 g ai/ha or less, 9 g ai/ha or less, 8 g ai/ha or less, 7 g ai/ha or less, 6 g ai/ha or less, 5 g ai/ha or less, 4 g ai/ha or less, 3.5 g ai/ha or less, 3 g ai/ha or less, 2.5 g ai/ha or less, 2 g ai/ha or less, 1.75 g ai/ha or less, 1.5 g ai/ha or less, 1.25 g ai/ha or less, or 1.1 g ai/ha or less; or in an amount ranging from any of the minimum values described above to any of the maximum values described above, such as 1-4500 g ai/ha, 4-3900 g ai/ha, 1.75-2500 g ai/ha, 75-3100 g ai/ha, 90-900 g ai/ha, 55-4200 g ai/ha, 50-2350 g ai/ha, 80-2900 g ai/ha, 120-4100 g ai/ha, 65-2700 g ai/ha, 300-4000 g ai/ha, 1200-3600 g ai/ha, 250-2000 g ai/ha, 1.75-250 g ai/ha, 700-4250 g ai/ha, 39-1100 g ai/ha, or 1.1-4450 g ai/ha.

In some aspects, the composition contains: (a) a pyridine carboxylate herbicide or an agriculturally acceptable N-oxide, salt, or ester thereof; (b) a PS-II inhibitor herbicide selected from ametryne, amicarbazone, atrazine, bentazon, bromacil, bromofenoxim, bromoxynil, chlorbromuron, chloridazon, chlorotoluron, chloroxuron, cyanazine, desmedipham, desmetryn, dimefuron, dimethametryn, diuron, ethidimuron, ethiozin, fenuron, fluometuron, hexazinone, iodobonil, ioxynil, isocil, isomethiozin, isoproturon, isouron, karbutilate, lenacil, linuron, metamitron, methabenzthiazuron, methoprotryne, metobromuron, metoxuron, metribuzin, monolinuron, neburon, pentanochlor, phenmedipham, prometon, prometryn, propanil, propazine, pyridafol, pyridate, siduron, simazine, simetryne, tebuthiuron, terbacil, terbumeton, terbuthylazine, terbutryn, trietazine, or mixtures thereof; and (c) an HPPD herbicide selected from benzobicyclon, benzofenap, bicyclopyrone, fenquinotrione, isoxachlortole, isoxaflutole, lancotrione, mesotrione, pyrasulfotole, pyrazolynate, pyrazoxyfen, sulcotrione, tefuryltrione, tembotrione, tolpyralate, topramezone, an agriculturally acceptable salt or ester thereof, or combinations thereof.

Benzobicyclon

In some aspects, the HPPD inhibitor herbicide can comprise benzobicyclon or an agriculturally acceptable salt or ester thereof. Benzobicyclon, shown below, is 3-[2-chloro-4-(methylsulfonyl)benzoyl]-4-(phenylthio)bicyclo[3.2.1]oct-3-en-2-one. Its herbicidal activity is exemplified in *The Pesticide Manual*, Seventeenth Edition, 2016. Exemplary uses of benzobicyclon include its use for pre- to early post-emergence control of annual and perennial paddy weeds in direct-seeded and transplanted rice.

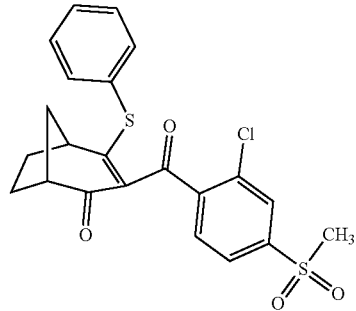 [SMILES: CS(=O)(=O)c1ccc(C(=O)C2=C(Sc3ccccc3)C3CCC(C3)C2=O)c(Cl)c1]

Benzobicyclon can be applied to vegetation or an area adjacent to the vegetation or applied to soil or water to prevent the emergence or growth of vegetation in an amount sufficient to induce a herbicidal effect. In some aspects, benzobicyclon is applied to vegetation or an area adjacent to the vegetation or applied to soil or water to prevent the emergence or growth of vegetation in an amount of 50 g ai/ha or more, such as 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 100 g ai/ha or more, 110 g ai/ha or more, 120 g ai/ha or more, 130 g ai/ha or more, 140 g ai/ha or more, 150 g ai/ha or more, 160 g ai/ha or more, 170 g ai/ha or more, 180 g ai/ha or more, 190 g ai/ha or more, 200 g ai/ha or more, 220 g ai/ha or more, 240 g ai/ha or more, 260 g ai/ha or more, 280 g ai/ha or more, 300 g ai/ha or more, 320 g ai/ha or more, 340 g ai/ha or more, 360 g ai/ha or more, 380 g ai/ha or more, or 400 g ai/ha or more; in an amount of 401 g ai/ha or less, such as 400 g ai/ha or less, 380 g ai/ha or less, 360 g ai/ha or less, 340 g ai/ha or less, 320 g ai/ha or less, 300 g ai/ha or less, 280 g ai/ha or less, 260 g ai/ha or less, 240 g ai/ha or less, 220 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less; or in an amount ranging from any of the minimum values described above to any of the maximum values described above, such as 50-401 g ai/ha, 75-360 g ai/ha, 100-240 g ai/ha, 150-300 g ai/ha, 170-280 g ai/ha, 140-360 g ai/ha, 200-320 g ai/ha, 80-260 g ai/ha, or 55-400 g ai/ha.

Benzofenap

In some aspects, the HPPD inhibitor herbicide can comprise benzofenap or an agriculturally acceptable salt or ester thereof. Benzofenap, shown below, is 2-[[4-(2,4-dichloro-3-methylbenzoyl)-1,3-dimethyl-1H-pyrazol-5-yl]oxy]-1-(4-methylphenyl) ethanone. Its herbicidal activity is exemplified in *The Pesticide Manual*, Seventeenth Edition, 2016. Exemplary uses of benzofenap include its use for control of broadleaf weeds in rice.

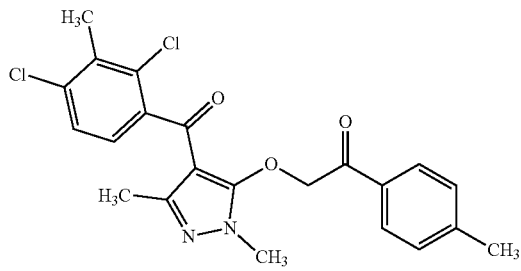 [SMILES: Cc1ccc(C(=O)COc2c(C(=O)c3ccc(Cl)c(C)c3Cl)c(C)nn2C)cc1]

Benzofenap can be applied to vegetation or an area adjacent the vegetation or applied to soil or water to prevent the emergence or growth of vegetation in an amount sufficient to induce a herbicidal effect. In some aspects, benzofenap is applied to vegetation or an area adjacent the vegetation or applied to soil or water to prevent the emergence or growth of vegetation in an amount of 300 g ai/ha or more, such as 310 g ai/ha or more, 320 g ai/ha or more, 340 g ai/ha or more, 360 g ai/ha or more, 380 g ai/ha or more, 400 g ai/ha or more, 450 g ai/ha or more, 500 g ai/ha or more, 550 g ai/ha or more, 600 g ai/ha or more, 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, 975 g ai/ha or more, or 1000 g ai/ha or more; in an amount of 1001 g ai/ha or less, such as 1000 g ai/ha or less, 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 575 g ai/ha or less, 550 g ai/ha or less, 525 g ai/ha or less, 500 g ai/ha or less, 475 g ai/ha or less, 450 g ai/ha or less, 425 g ai/ha or less, 400 g ai/ha or less, 380 g ai/ha or less, 360 g ai/ha or less, 340 g ai/ha or less, 320 g ai/ha or less, or 310 g ai/ha or less; or in an amount ranging from any of the minimum values described above to any of the maximum values described above, such as 300-1001 g ai/ha, 450-1000 g ai/ha, 380-825 g ai/ha, 400-900 g ai/ha, 450-925 g ai/ha, 550-775 g ai/ha, 600-850 g ai/ha, 475-950 g ai/ha, 340-925 g ai/ha, 650-975 g ai/ha, 725-1000 g ai/ha, 450-850 g ai/ha, 800-950 g ai/ha, or 310-975 g ai/ha.

Bicyclopyrone

In some aspects, the HPPD inhibitor herbicide can comprise bicyclopyrone or an agriculturally acceptable salt or ester thereof. Bicyclopyrone, shown below, is 4-hydroxy-3-[[2-[(2-methoxyethoxy)methyl]-6-(trifluoromethyl)-3-pyridinyl]carbonyl] bicyclo[3.2.1]oct-3-en-2-one. Its herbicidal activity is exemplified in *The Pesticide Manual*, Seventeenth Edition, 2016. Exemplary uses of bicyclopyrone include its use for pre- and early post-emergence control of broadleaf and grass weeds in maize and cereals.

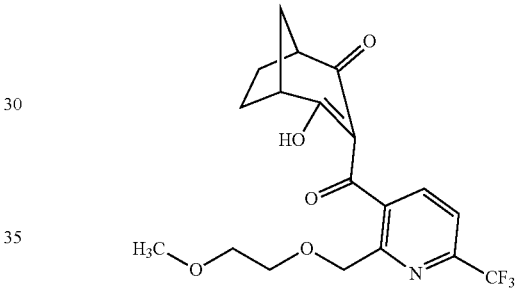

Bicyclopyrone can be applied to vegetation or an area adjacent the vegetation or applied to soil or water to prevent the emergence or growth of vegetation in an amount sufficient to induce a herbicidal effect. In some aspects, bicyclopyrone is applied to vegetation or an area adjacent the vegetation or applied to soil or water to prevent the emergence or growth of vegetation in an amount of 20 g ai/ha or more, such as 25 g ai/ha or more, 30 g ai/ha or more, 35 g ai/ha or more, 40 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 100 g ai/ha or more, 110 g ai/ha or more, 120 g ai/ha or more, 130 g ai/ha or more, 140 g ai/ha or more, 150 g ai/ha or more, 160 g ai/ha or more, 170 g ai/ha or more, 180 g ai/ha or more, 190 g ai/ha or more, 200 g ai/ha or more, 220 g ai/ha or more, 240 g ai/ha or more, 260 g ai/ha or more, 280 g ai/ha or more, 300 g ai/ha or more, 320 g ai/ha or more, 340 g ai/ha or more, 360 g ai/ha or more, 380 g ai/ha or more, or 400 g ai/ha; in an amount of 401 g ai/ha or less, such as 400 g ai/ha or less, 380 g ai/ha or less, 360 g ai/ha or less, 340 g ai/ha or less, 320 g ai/ha or less, 300 g ai/ha or less, 280 g ai/ha or less, 260 g ai/ha or less, 240 g ai/ha or less, 220 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 35 g ai/ha or less, 30 g ai/ha or less, 25 g ai/ha or less, or 20 g ai/ha or less; or in an amount ranging from any of the minimum values described above to any of the maximum values described above, such as 20-401 g ai/ha, 30-260 g ai/ha, 40-380 g ai/ha, 55-300 g ai/ha, 60-340 g ai/ha, 45-320 g ai/ha, 25-300 g ai/ha, 100-190 g ai/ha, 200-380 g ai/ha, 50-200 g ai/ha, 30-300 g ai/ha, 85-220 g ai/ha, 30-65 g ai/ha, or 25-400 g ai/ha.

Fenquinotrione

In some aspects, the HPPD inhibitor herbicide can comprise fenquinotrione or an agriculturally acceptable salt or ester thereof. Fenquinotrione, shown below, is 2-[[8-chloro-3,4-dihydro-4-(4-methoxyphenyl)-3-oxo-2-quinoxalinyl]carbonyl]-1,3-cyclohexanedione. According to the online edition of *The Pesticide Manual*, fenquinotrione is a herbicide under development for use on rice.

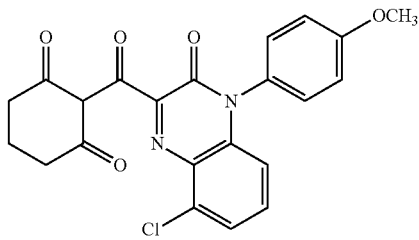 [SMILES: COc1ccc(-n2c(=O)c(C(=O)C3C(=O)CCCC3=O)nc3c(Cl)cccc32)cc1]

Isoxachlortole

In some aspects, the HPPD inhibitor herbicide can comprise isoxachlortole or an agriculturally acceptable salt or ester thereof. Isoxachlortole, shown below, is [4-chloro-2-(methylsulfonyl)phenyl](5-cyclopropyl-4-isoxazolyl)methanone. According to the online edition of *The Pesticide Manual*, isoxachlortole is a herbicide that was evaluated by Rhône-Poulenc.

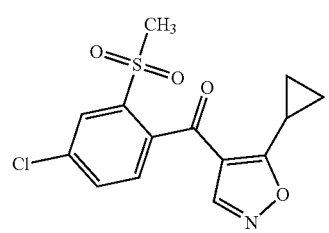 [SMILES: CS(=O)(=O)c1cc(Cl)ccc1C(=O)c1cnoc1C1CC1]

Isoxaflutole

In some aspects, the HPPD inhibitor herbicide can comprise isoxaflutole or an agriculturally acceptable salt or ester thereof. Isoxaflutole, shown below, is (5-cyclopropyl-4-isoxazolyl)[2-(methylsulfonyl)-4-(trifluoromethyl)phenyl]methanone. Its herbicidal activity is exemplified in *The Pesticide Manual*. Exemplary uses of isoxaflutole include its use for pre-emergence or pre-plant control of grass and broadleaf weed in maize and sugar cane.

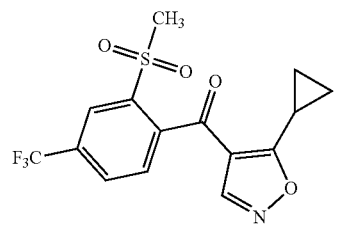 [SMILES: CS(=O)(=O)c1cc(C(F)(F)F)ccc1C(=O)c1cnoc1C1CC1]

Isoxaflutole can be applied to vegetation or an area adjacent the vegetation or applied to soil or water to prevent the emergence or growth of vegetation in an amount sufficient to induce a herbicidal effect. In some aspects, isoxaflutole is applied to vegetation or an area adjacent the vegetation or applied to soil or water to prevent the emergence or growth of vegetation in an amount of 20 g ai/ha or more, such as 25 g ai/ha or more, 30 g ai/ha or more, 35 g ai/ha or more, 40 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 100 g ai/ha or more, 110 g ai/ha or more, 120 g ai/ha or more, 130 g ai/ha or more, 140 g ai/ha or more, 150 g ai/ha or more, 160 g ai/ha or more, 170 g ai/ha or more, 180 g ai/ha or more, 190 g ai/ha or more, 200 g ai/ha or more, 220 g ai/ha or more, 240 g ai/ha or more, 260 g ai/ha or more, 280 g ai/ha or more, or 300 g ai/ha or more; in an amount of 301 g ai/ha or less, such as 300 g ai/ha or less, 280 g ai/ha or less, 260 g ai/ha or less, 240 g ai/ha or less, 220 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 35 g ai/ha or less, 30 g ai/ha or less, or 25 g ai/ha or less; or in an amount ranging from any of the minimum values described above to any of the maximum values described above, such as 20-301 g ai/ha, 30-300 g ai/ha, 40-170 g ai/ha, 25-260 g ai/ha, 60-120 g ai/ha, 70-190 g ai/ha, 75-240 g ai/ha, 35-200 g ai/ha, 65-220 g ai/ha, 85-140 g ai/ha, 100-300 g ai/ha, 150-280 g ai/ha, 200-301 g ai/ha, 130-200 g ai/ha, 25-100 g ai/ha, 70-90 g ai/ha, or 25-300 g ai/ha.

Lancotrione

In some aspects, the HPPD inhibitor herbicide can comprise lancotrione or an agriculturally acceptable salt or ester thereof. Lancotrione, shown below, is 2-[2-chloro-3-[2-(1,3-dioxolan-2-yl)ethoxy]-4-(methylsulfonyl)benzoyl]-3-hydroxy-2-cyclohexen-1-one. According to the online edition of *The Pesticide Manual*, lancotrione is a herbicide under development by Ishihara Sangyo Kaisha, Ltd.

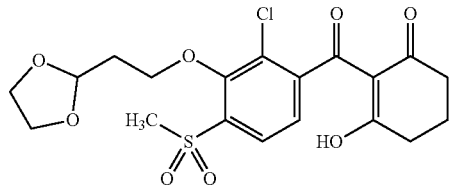 [SMILES: CS(=O)(=O)c1ccc(C(=O)C2=C(O)CCCC2=O)c(Cl)c1OCCC1OCCO1]

Mesotrione

In some aspects, the HPPD inhibitor herbicide can comprise mesotrione or an agriculturally acceptable salt or ester thereof. Mesotrione, shown below, is 2-[4-(methylsulfonyl)-2-nitrobenzoyl]-1,3-cyclohexanedione. Its herbicidal activity is exemplified in *The Pesticide Manual*. Exemplary uses of mesotrione include its use for pre- and post-emergence control of broadleaf weeds and some grass weeds in maize.

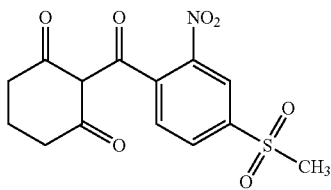 [SMILES: CS(=O)(=O)c1ccc(C(=O)C2C(=O)CCCC2=O)c([N+](=O)[O-])c1]

Mesotrione can be applied to vegetation or an area adjacent the vegetation or applied to soil or water to prevent the emergence or growth of vegetation in an amount sufficient to induce a herbicidal effect. In some aspects, mesotrione is applied to vegetation or an area adjacent the vegetation or applied to soil or water to prevent the emergence or growth of vegetation in an amount of 20 g ai/ha or more, such as 25 g ai/ha or more, 30 g ai/ha or more, 35 g ai/ha or more, 40 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 100 g ai/ha or more, 110 g ai/ha or more, 120 g ai/ha or more, 125 g ai/ha or more, 130 g ai/ha or more, 140 g ai/ha or more, 150 g ai/ha or more, 160 g ai/ha or more, 170 g ai/ha or more, 175 g ai/ha or more, 180 g ai/ha or more, 190 g ai/ha or more, 200 g ai/ha or more, 220 g ai/ha or more, 225 g ai/ha or more, 240 g ai/ha or more, 250 g ai/ha or more, 260 g ai/ha or more, 275 g ai/ha or more, 280 g ai/ha or more, or 300 g ai/ha or more; in an amount of 301 g ai/ha or less, such as 300 g ai/ha or less, 280 g ai/ha or less, 275 g ai/ha or less, 260 g ai/ha or less, 250 g ai/ha or less, 240 g ai/ha or less, 225 g ai/ha or less, 220 g ai/ha or less, 200 g ai/ha or less, 190 g ai/ha or less, 180 g ai/ha or less, 175 g ai/ha or less, 170 g ai/ha or less, 160 g ai/ha or less, 150 g ai/ha or less, 140 g ai/ha or less, 125 g ai/ha or less, 130 g ai/ha or less, 120 g ai/ha or less, 110 g ai/ha or less, 100 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 35 g ai/ha or less, 30 g ai/ha or less, or 25 g ai/ha or less; or in an amount ranging from any of the minimum values described above to any of the maximum values described above, such as 20-301 g ai/ha, 30-275 g ai/ha, 40-140 g ai/ha, 50-250 g ai/ha, 60-301 g ai/ha, 25-280 g ai/ha, 60-125 g ai/ha, 70-250 g ai/ha, 90-225 g ai/ha, 110-220 g ai/ha, 40-175 g ai/ha, 65-160 g ai/ha, 70-200 g ai/ha, 80-180 g ai/ha, 90-250 g ai/ha, 140-225 g ai/ha, 110-240 g ai/ha, 120-175 g ai/ha, 110-150 g ai/ha, 25-85 g ai/ha, or 25-300 g ai/ha.

Pyrasulfotole

In some aspects, the HPPD inhibitor herbicide can comprise pyrasulfotole or an agriculturally acceptable salt or ester thereof. Pyrasulfotole, shown below, is (5-hydroxy-1,3-dimethyl-1H-pyrazol-4-yl)[2-(methylsulfonyl)-4-(trifluoromethyl)phenyl]methanone. Its herbicidal activity is exemplified in *The Pesticide Manual*. Exemplary uses of pyrasulfotole include its use in mixture with mefenpyr-diethyl and bromoxynil or MCPA ester, for post-emergence control of broadleaf weeds in cereals.

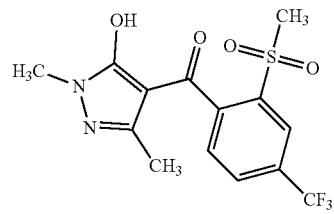 [SMILES: Cc1nn(C)c(O)c1C(=O)c1ccc(C(F)(F)F)cc1S(C)(=O)=O]

Pyrasulfotole can be applied to vegetation or an area adjacent the vegetation or applied to soil or water to prevent the emergence or growth of vegetation in an amount sufficient to induce a herbicidal effect. In some aspects, pyrasulfotole is applied to vegetation or an area adjacent the vegetation or applied to soil or water to prevent the emergence or growth of vegetation in an amount of 1 g ai/ha or more, such as 1.1 g ai/ha or more, 1.25 g ai/ha or more, 1.4 g ai/ha or more, 1.5 g ai/ha or more, 1.6 g ai/ha or more, 1.75 g ai/ha or more, 1.9 g ai/ha or more, 2 g ai/ha or more, 2.25 g ai/ha or more, 2.5 g ai/ha or more, 2.75 g ai/ha or more, 3 g ai/ha or more, 3.25 g ai/ha or more, 3.5 g ai/ha or more, 3.75 g ai/ha or more, 4 g ai/ha or more, 4.5 g ai/ha or more, 5 g ai/ha or more, 6 g ai/ha or more, 7 g ai/ha or more, 8 g ai/ha or more, 9 g ai/ha or more, 9.5 g ai/ha or more, 10 g ai/ha or more, 10.5 g ai/ha or more, 11 g ai/ha or more, 11.5 g ai/ha or more, 12 g ai/ha or more, 12.5 g ai/ha or more, 13 g ai/ha or more, 13.5 g ai/ha or more, 14 g ai/ha or more, 14.5 g ai/ha or more, 15 g ai/ha or more, 15.5 g ai/ha or more, 16 g ai/ha or more, 16.5 g ai/ha or more, 17 g ai/ha or more, 17.5 g ai/ha or more, 18 g ai/ha or more, 18.5 g ai/ha or more, 20 g ai/ha or more, 21 g ai/ha or more, 22 g ai/ha or more, 23 g ai/ha or more, 24 g ai/ha or more, 25 g ai/ha or more, 26 g ai/ha or more, 27 g ai/ha or more, 28 g ai/ha or more, 29 g ai/ha or more, 30 g ai/ha or more, 31 g ai/ha or more, 32 g ai/ha or more, 33 g ai/ha or more, 34 g ai/ha or more, 35 g ai/ha or more, 36 g ai/ha or more, 37 g ai/ha or more, 38 g ai/ha or more, 39 g ai/ha or more, 40 g ai/ha or more, 41 g ai/ha or more, 42 g ai/ha or more, 43 g ai/ha or more, 44 g ai/ha or more, 45 g ai/ha or more, or 47 g ai/ha or more; in an amount of 50 g ai/ha or less, such as 47 g ai/ha or less, 45 g ai/ha or less, 44 g ai/ha or less, 43 g ai/ha or less, 42 g ai/ha or less, 41 g ai/ha or less, 40 g ai/ha or less, 39 g ai/ha or less, 38 g ai/ha or less, 37 g ai/ha or less, 36 g ai/ha or less, 35 g ai/ha or less, 34 g ai/ha or less, 33 g ai/ha or less, 32 g ai/ha or less, 31 g ai/ha or less, 30 g ai/ha or less, 29 g ai/ha or less, 28 g ai/ha or less, 27 g ai/ha or less, 26 g ai/ha or less, 25 g ai/ha or less, 24 g ai/ha or less, 23 g ai/ha or less, 22 g ai/ha or less, 21 g ai/ha or less, 20 g ai/ha or less, 19 g ai/ha or less, 18.5 g ai/ha or less, 18 g ai/ha or less, 17.5 g ai/ha or less, 17 g ai/ha or less, 16.5 g ai/ha or less, 16 g ai/ha or less, 15.5 g ai/ha or less, 15 g ai/ha or less, 14.5 g ai/ha or less, 14 g ai/ha or less, 13.5 g ai/ha or less, 13 g ai/ha or less, 12.5 g ai/ha or less, 12 g ai/ha or less, 11.5 g ai/ha or less, 11 g ai/ha or less, 10.5 g ai/ha or less, 10 g ai/ha or less, 9.5 g ai/ha or less, 9 g ai/ha or less, 8.5 g ai/ha or less, 8 g ai/ha or less, 7.5 g ai/ha or less, 7 g ai/ha or less, 6.5 g ai/ha or less, 6 g ai/ha or less, 5.5 g ai/ha or less, 5 g ai/ha or less, 4.5 g ai/ha or less, 4 g ai/ha or less, 3.75 g ai/ha or less, 3.5 g ai/ha or less, 3.25 g ai/ha or less, 3 g ai/ha or less, 2.75 g ai/ha or less, 2.5 g ai/ha or less, 2.25 g ai/ha or less, 2 g ai/ha or less, 1.9 g ai/ha or less, 1.75 g ai/ha or less, 1.6 g ai/ha or less, 1.5 g ai/ha or less, 1.4 g ai/ha or less, 1.25 g ai/ha or less, or 1.1 g ai/ha or less; or in an amount ranging from any of the minimum values described above to any of the maximum values described above, such as 1-50 g ai/ha, 1.4-45 g ai/ha, 1.2-42 g ai/ha, 2.5-35 g ai/ha, 4-30 g ai/ha, 6.5-29 g ai/ha, 1.25-24 g ai/ha, 3.75-18.5 g ai/ha, 2.5-38 g ai/ha, 11-17 g ai/ha, 8-16 g ai/ha, 2.75-19 g ai/ha, 3-25 g ai/ha, 7-23 g ai/ha, 3.5-16 g ai/ha, 10-41 g ai/ha, 25-50 g ai/ha, 14-44 g ai/ha, 35-45 g ai/ha, 40-51 g ai/ha, or 1.1-47 g ai/ha.

Pyrazolynate

In some aspects, the HPPD inhibitor herbicide can comprise pyrazolynate or an agriculturally acceptable salt or ester thereof. Pyrazolynate, shown below, is (2,4-dichlorophenyl)[1,3-dimethyl-5-[[(4-methylphenyl) sulfonyl]oxy]-1H-pyrazol-4-yl]methanone. Its herbicidal activity is exemplified in *The Pesticide Manual*. Exemplary uses of pyrazolynate include its use to control grasses, sedges, *Potamogeton distinctus, Sagittaria pygmaea, Sagittaria trifolia* and *Alisma canaliculatum* in paddy rice.

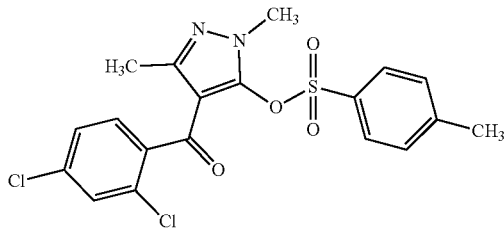 [SMILES: Cc1ccc(S(=O)(=O)Oc2c(C(=O)c3ccc(Cl)cc3Cl)c(C)nn2C)cc1]

Pyrazolynate can be applied to vegetation or an area adjacent the vegetation or applied to soil or water to prevent the emergence or growth of vegetation in an amount sufficient to induce a herbicidal effect. In some aspects, pyrazolynate is applied to vegetation or an area adjacent the vegetation or applied to soil or water to prevent the emergence or growth of vegetation in an amount of 1000 g ai/ha or more, such as 1100 g ai/ha or more, 1200 g ai/ha or more, 1400 g ai/ha or more, 1600 g ai/ha or more, 1800 g ai/ha or more, 2000 g ai/ha or more, 2200 g ai/ha or more, 2400 g ai/ha or more, 2500 g ai/ha or more, 2600 g ai/ha or more, 2800 g ai/ha or more, 3000 g ai/ha or more, 3200 g ai/ha or more, 3400 g ai/ha or more, 3500 g ai/ha or more, 3600 g ai/ha or more, 3800 g ai/ha or more, 4000 g ai/ha or more, 4200 g ai/ha or more, or 4400 g ai/ha or more; in an amount of 4500 g ai/ha or less, such as 4400 g ai/ha or less, 4200 g ai/ha or less, 4000 g ai/ha or less, 3800 g ai/ha or less, 3600 g ai/ha or less, 3500 g ai/ha or less, 3400 g ai/ha or less, 3200 g ai/ha or less, 3000 g ai/ha or less, 2800 g ai/ha or less, 2600 g ai/ha or less, 2500 g ai/ha or less, 2400 g ai/ha or less, 2200 g ai/ha or less, 2000 g ai/ha or less, 1800 g ai/ha or less, 1600 g ai/ha or less, 1400 g ai/ha or less, 1200 g ai/ha or less, or 1100 g ai/ha or less; or in an amount ranging from any of the minimum values described above to any of the maximum values described above, such as 1000-4500 g ai/ha, 2000-4000 g ai/ha, 1400-2600 g ai/ha, 1600-3800 g ai/ha, 1100-3000 g ai/ha, 1000-2800 g ai/ha, 1600-2500 g ai/ha, 2000-3200 g ai/ha, 2500-4200 g ai/ha, 1200-3500 g ai/ha, 3500000 g ai/ha, or 1100-4400 g ai/ha.

Pyrazoxyfen

In some aspects, the HPPD inhibitor herbicide can comprise pyrazoxyfen or an agriculturally acceptable salt or ester thereof. Pyrazoxyfen, shown below, is 2-[[4-(2,4-dichlorobenzoyl)-1,3-dimethyl-1H-pyrazol-5-yl]oxy]-1-phenylethanone. Its herbicidal activity is exemplified in *The Pesticide Manual*. Exemplary uses of pyrazoxyfen include pre- or post-emergence control of annual and perennial weeds in transplanted or direct-seeded paddy rice.

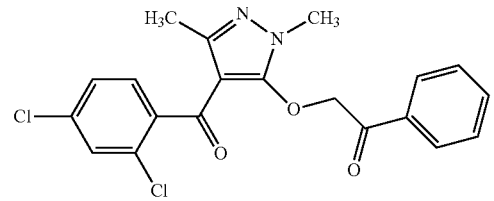 [SMILES: Cc1nn(C)c(OCC(=O)c2ccccc2)c1C(=O)c1ccc(Cl)cc1Cl]

Pyrazoxyfen can be applied to vegetation or an area adjacent the vegetation or applied to soil or water to prevent the emergence or growth of vegetation in an amount sufficient to induce a herbicidal effect. In some aspects, pyrazoxyfen is applied to vegetation or an area adjacent the vegetation or applied to soil or water to prevent the emergence or growth of vegetation in an amount of 1000 g ai/ha or more, such as 1100 g ai/ha or more, 1200 g ai/ha or more, 1400 g ai/ha or more, 1600 g ai/ha or more, 1800 g ai/ha or more, 2000 g ai/ha or more, 2200 g ai/ha or more, 2400 g ai/ha or more, 2500 g ai/ha or more, 2600 g ai/ha or more, 2800 g ai/ha or more, 3000 g ai/ha or more, 3200 g ai/ha or more, 3400 g ai/ha or more, 3500 g ai/ha or more, 3600 g ai/ha or more, 3800 g ai/ha or more, 4000 g ai/ha or more, 4200 g ai/ha or more, or 4400 g ai/ha or more; in an amount of 4500 g ai/ha or less, such as 4400 g ai/ha or less, 4200 g ai/ha or less, 4000 g ai/ha or less, 3800 g ai/ha or less, 3600 g ai/ha or less, 3500 g ai/ha or less, 3400 g ai/ha or less, 3200 g ai/ha or less, 3000 g ai/ha or less, 2800 g ai/ha or less, 2600 g ai/ha or less, 2500 g ai/ha or less, 2400 g ai/ha or less, 2200 g ai/ha or less, 2000 g ai/ha or less, 1800 g ai/ha or less, 1600 g ai/ha or less, 1400 g ai/ha or less, 1200 g ai/ha or less, or 1100 g ai/ha or less; or in an amount ranging from any of the minimum values described above to any of the maximum values described above, such as 1000-4500 g ai/ha, 1100-4000 g ai/ha, 1400-3600 g ai/ha, 1200-1800 g ai/ha, 1800-4000 g ai/ha, 2200-4500 g ai/ha, 1500-3200 g ai/ha, 2000-3500 g ai/ha, 2500-3400 g ai/ha, or 1100-4400 g ai/ha.

Sulcotrione

In some aspects, the HPPD inhibitor herbicide can comprise sulcotrione or an agriculturally acceptable salt or ester thereof. Sulcotrione, shown below, is 2-[2-chloro-4-(methylsulfonyl)benzoyl]-1,3-cyclohexanedione. Its herbicidal activity is exemplified in *The Pesticide Manual*. Exemplary uses of sulcotrione include its use to control broadleaf weeds and grasses post-emergence in maize and sugar cane.

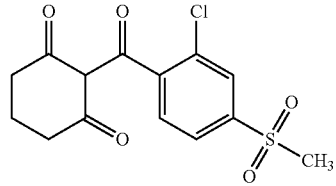

Sulcotrione can be applied to vegetation or an area adjacent the vegetation or applied to soil or water to prevent the emergence or growth of vegetation in an amount sufficient to induce a herbicidal effect. In some aspects, sulcotrione is applied to vegetation or an area adjacent the vegetation or applied to soil or water to prevent the emergence or growth of vegetation in an amount of 20 g ai/ha or more, such as 25 g ai/ha or more, 30 g ai/ha or more, 35 g ai/ha or more, 40 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 100 g ai/ha or more, 110 g ai/ha or more, 120 g ai/ha or more, 130 g ai/ha or more, 140 g ai/ha or more, 150 g ai/ha or more, 160 g ai/ha or more, 170 g ai/ha or more, 180 g ai/ha or more, 190 g ai/ha or more, 200 g ai/ha or more, 220 g ai/ha or more, 240 g ai/ha or more, 260 g ai/ha or more, 280 g ai/ha or more, 300 g ai/ha or more, 320 g ai/ha or more, 340 g ai/ha or more, 360 g ai/ha or more, 380 g ai/ha or more, 400 g ai/ha or more, 420 g ai/ha or more, 440 g ai/ha or more, 460 g ai/ha or more, 480 g ai/ha or more, 500 g ai/ha or more, 520 g ai/ha or more, 540 g ai/ha or more, 560 g ai/ha or more, or 580 g ai/ha or more; in an amount of 600 g ai/ha or less, such as 580 g ai/ha or less, 560 g ai/ha or less, 540 g ai/ha or less, 520 g ai/ha or less, 500 g ai/ha or less, 480 g ai/ha or less, 460 g ai/ha or less, 440 g ai/ha or less, 420 g ai/ha or less, 400 g ai/ha or less, 380 g ai/ha or less, 360 g ai/ha or less, 340 g ai/ha or less, 320 g ai/ha or less, 300 g ai/ha or less, 280 g ai/ha or less, 260 g ai/ha or less, 240 g ai/ha or less, 220 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 35 g ai/ha or less, 30 g ai/ha or less, or 25 g ai/ha or less; or in an amount ranging from any of the minimum values described above to any of the maximum values described above, such as 20-600 g ai/ha, 40-400 g ai/ha, 65-420 g ai/ha, 120-240 g ai/ha, 300-460 g ai/ha, 400-580 g ai/ha, 30-500 g ai/ha, 250-560 g ai/ha, 250-440 g ai/ha, 75-520 g ai/ha, 35-300 g ai/ha, 90-540 g ai/ha, 150-400 g ai/ha, 400-560 g ai/ha, 50-300 g ai/ha, 110-480 g ai/ha, 75-420 g ai/ha, 65-360 g ai/ha, 170-300 g ai/ha, 200-300 g ai/ha, 220-600 g ai/ha, or 25-580 g ai/ha.

Tefuryltrione

In some aspects, the HPPD inhibitor herbicide can comprise tefuryltrione or an agriculturally acceptable salt or ester thereof. Tefuryltrione, shown below, is 2-[2-chloro-4-(methylsulfonyl)-3-[[(tetrahydro-2-furanyl)methoxy]methyl]benzoyl]-1,3-cyclohexandione. According to the online edition of *The Pesticide Manual*, tefuryltrione is a herbicide jointly developed by Bayer CropScience, Hokko Chemical, and Zen-Noh for pre- and post-emergence control of annual and perennial broadleaf weeds in rice and cereals.

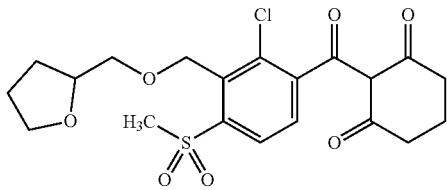 [SMILES: CS(=O)(=O)c1ccc(C(=O)C2C(=O)CCCC2=O)c(Cl)c1COCC1CCCO1]

Tembotrione

In some aspects, the HPPD inhibitor herbicide can comprise tembotrione or an agriculturally acceptable salt or ester thereof. Tembotrione, shown below, is 2-[2-chloro-4-(methylsulfonyl)-3-[(2,2,2-trifluoroethoxy) methyl]benzoyl]-1,3-cyclohexanedione. Its herbicidal activity is exemplified in *The Pesticide Manual*. Exemplary uses of tembotrione include its use for post-emergence control of grass and broadleaf weed species in maize.

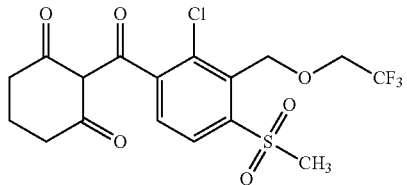 [SMILES: CS(=O)(=O)c1ccc(C(=O)C2C(=O)CCCC2=O)c(Cl)c1COCC(F)(F)F]

Tembotrione can be applied to vegetation or an area adjacent the vegetation or applied to soil or water to prevent the emergence or growth of vegetation in an amount sufficient to induce a herbicidal effect. In some aspects, tembotrione is applied to vegetation or an area adjacent the vegetation or applied to soil or water to prevent the emergence or growth of vegetation in an amount of 1 g ai/ha or more, such as 1.1 g ai/ha or more, 1.25 g ai/ha or more, 1.4 g ai/ha or more, 1.5 g ai/ha or more, 1.6 g ai/ha or more, 1.75 g ai/ha or more, 1.9 g ai/ha or more, 2 g ai/ha or more, 2.25 g ai/ha or more, 2.5 g ai/ha or more, 2.75 g ai/ha or more, 3 g ai/ha or more, 3.25 g ai/ha or more, 3.5 g ai/ha or more, 3.75 g ai/ha or more, 4 g ai/ha or more, 4.5 g ai/ha or more, 5 g ai/ha or more, 6 g ai/ha or more, 7 g ai/ha or more, 8 g ai/ha or more, 9 g ai/ha or more, 9.5 g ai/ha or more, 10 g ai/ha or more, 10.5 g ai/ha or more, 11 g ai/ha or more, 11.5 g ai/ha or more, 12 g ai/ha or more, 12.5 g ai/ha or more, 13 g ai/ha or more, 13.5 g ai/ha or more, 14 g ai/ha or more, 14.5 g ai/ha or more, 15 g ai/ha or more, 15.5 g ai/ha or more, 16 g ai/ha or more, 16.5 g ai/ha or more, 17 g ai/ha or more, 17.5 g ai/ha or more, 18 g ai/ha or more, 18.5 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, 100 g ai/ha or more, 110 g ai/ha or more, 120 g ai/ha or more, 130 g ai/ha or more, 140 g ai/ha or more, 150 g ai/ha or more, 160 g ai/ha or more, 170 g ai/ha or more, 180 g ai/ha or more, 190 g ai/ha or more, or 200 g ai/ha or more; in an amount of 200 g ai/ha or less, such as 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 19 g ai/ha or less, 18.5 g ai/ha or less, 18 g ai/ha or less, 17.5 g ai/ha or less, 17 g ai/ha or less, 16.5 g ai/ha or less, 16 g ai/ha or less, 15.5 g ai/ha or less, 15 g ai/ha or less, 14.5 g ai/ha or less, 14 g ai/ha or less, 13.5 g ai/ha or less, 13 g ai/ha or less, 12.5 g ai/ha or less, 12 g ai/ha or less, 11.5 g ai/ha or less, 11 g ai/ha or less, 10.5 g ai/ha or less, 10 g ai/ha or less, 9.5 g ai/ha or less, 9 g ai/ha or less, 8.5 g ai/ha or less, 8 g ai/ha or less, 7.5 g ai/ha or less, 7 g ai/ha or less, 6.5 g ai/ha or less, 6 g ai/ha or less, 5.5 g ai/ha or less, 5 g ai/ha or less, 4.5 g ai/ha or less, 4 g ai/ha or less, 3.75 g ai/ha or less, 3.5 g ai/ha or less, 3.25 g ai/ha or less, 3 g ai/ha or less, 2.75 g ai/ha or less, 2.5 g ai/ha or less, 2.25 g ai/ha or less, 2 g ai/ha or less, 1.9 g ai/ha or less, 1.75 g ai/ha or less, 1.6 g ai/ha or less, 1.5 g ai/ha or less, 1.4 g ai/ha or less, 1.25 g ai/ha or less, or 1.1 g ai/ha or less; or in an amount ranging from any of the minimum values described above to any of the maximum values described above, such as 1-200 g ai/ha, 1.4-75 g ai/ha, 3.5-150 g ai/ha, 10-140 g ai/ha, 6-75 g ai/ha, 8-180 g ai/ha, 1.5-25 g ai/ha, 2.5-15 g ai/ha, 2.25-10 g ai/ha, 25-120 g ai/ha, 1.9-130 g ai/ha, 20-40 g ai/ha, 30-180 g ai/ha, 45-190 g ai/ha, 3.5-70 g ai/ha, 6-130 g ai/ha, 70-90 g ai/ha, 15-110 g ai/ha, 120-140 g ai/ha, or 1.1-190 g ai/ha.

Tolpyralate

In some aspects, the HPPD inhibitor herbicide can comprise tolpyralate or an agriculturally acceptable salt or ester thereof. Tolpyralate, shown below, is 1-[[I-ethyl-4-[3-(2-methoxyethoxy)-2-methyl-4-(methylsulfonyl)benzoyl]-1H-pyrazol-5-yl]oxy]ethyl methyl carbonate. According to the online edition of *The Pesticide Manual*, tefuryltrione is a herbicide developed by Ishihara Sangyo Kaisha Ltd. for pre- and post-emergence control of broadleaf and grass weeds, including Palmer amaranth, water hemp, giant ragweed, and giant foxtail in maize.

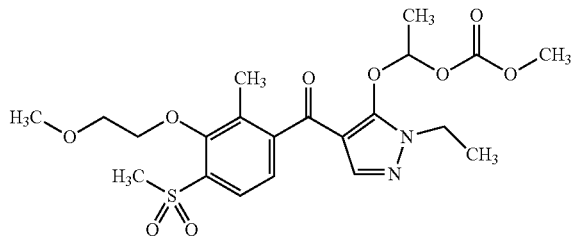

Topramezone

In some aspects, the HPPD inhibitor herbicide can comprise topramezone or an agriculturally acceptable salt or ester thereof. Topramezone, shown below, is [3-(4,5-dihydro-3-isoxazolyl)-2-methyl-4-(methylsulfonyl)phenyl](5-hydroxy-1-methyl-1H-pyrazol-4-yl)methanone. Its herbicidal activity is exemplified in *The Pesticide Manual*. Exemplary uses of topramezone include its use for post-emergence weed control in maize.

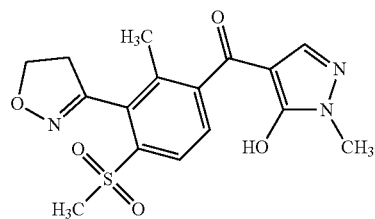 [SMILES: Cc1c(C(=O)c2cnn(C)c2O)ccc(S(C)(=O)=O)c1C1=NOCC1]

Topramezone can be applied to vegetation or an area adjacent the vegetation or applied to soil or water to prevent the emergence or growth of vegetation in an amount sufficient to induce a herbicidal effect. In some aspects, topramezone is applied to vegetation or an area adjacent the vegetation or applied to soil or water to prevent the emergence or growth of vegetation in an amount of 1 g ai/ha or more, such as 1.1 g ai/ha or more, 1.25 g ai/ha or more, 1.4 g ai/ha or more, 1.5 g ai/ha or more, 1.6 g ai/ha or more, 1.75 g ai/ha or more, 1.9 g ai/ha or more, 2 g ai/ha or more, 2.25 g ai/ha or more, 2.5 g ai/ha or more, 2.75 g ai/ha or more, 3 g ai/ha or more, 3.25 g ai/ha or more, 3.5 g ai/ha or more, 3.75 g ai/ha or more, 4 g ai/ha or more, 4.5 g ai/ha or more, 5 g ai/ha or more, 6 g ai/ha or more, 7 g ai/ha or more, 8 g ai/ha or more, 9 g ai/ha or more, 9.5 g ai/ha or more, 10 g ai/ha or more, 10.5 g ai/ha or more, 11 g ai/ha or more, 11.5 g ai/ha or more, 12 g ai/ha or more, 12.5 g ai/ha or more, 13 g ai/ha or more, 13.5 g ai/ha or more, 14 g ai/ha or more, 14.5 g ai/ha or more, 15 g ai/ha or more, 15.5 g ai/ha or more, 16 g ai/ha or more, 16.5 g ai/ha or more, 17 g ai/ha or more, 17.5 g ai/ha or more, 18 g ai/ha or more, 18.5 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, or 100 g ai/ha or more; in an amount of 100 g ai/ha or less, such as 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 19 g ai/ha or less, 18.5 g ai/ha or less, 18 g ai/ha or less, 17.5 g ai/ha or less, 17 g ai/ha or less, 16.5 g ai/ha or less, 16 g ai/ha or less, 15.5 g ai/ha or less, 15 g ai/ha or less, 14.5 g ai/ha or less, 14 g ai/ha or less, 13.5 g ai/ha or less, 13 g ai/ha or less, 12.5 g ai/ha or less, 12 g ai/ha or less, 11.5 g ai/ha or less, 11 g ai/ha or less, 10.5 g ai/ha or less, 10 g ai/ha or less, 9.5 g ai/ha or less, 9 g ai/ha or less, 8.5 g ai/ha or less, 8 g ai/ha or less, 7.5 g ai/ha or less, 7 g ai/ha or less, 6.5 g ai/ha or less, 6 g ai/ha or less, 5.5 g ai/ha or less, 5 g ai/ha or less, 4.5 g ai/ha or less, 4 g ai/ha or less, 3.75 g ai/ha or less, 3.5 g ai/ha or less, 3.25 g ai/ha or less, 3 g ai/ha or less, 2.75 g ai/ha or less, 2.5 g ai/ha or less, 2.25 g ai/ha or less, 2 g ai/ha or less, 1.9 g ai/ha or less, 1.75 g ai/ha or less, 1.6 g ai/ha or less, 1.5 g ai/ha or less, 1.4 g ai/ha or less, 1.25 g ai/ha or less, or 1.1 g ai/ha or less; or in an amount ranging from any of the minimum values described above to any of the maximum values described above, such as 1-100 g ai/ha, 2-90 g ai/ha, 4-80 g ai/ha, 2.5-75 g ai/ha, 9-60 g ai/ha, 10-55 g ai/ha, 3-25 g ai/ha, 8-15 g ai/ha, 1.5-10 g ai/ha, 5-80 g ai/ha, 6.5-45 g ai/ha, 15-85 g ai/ha, 20-90 g ai/ha, 2.5-40 g ai/ha, 3-30 g ai/ha, 9-85 g ai/ha, or 1.5-95 g ai/ha.

V. Compositions

A composition comprising (a) a pyridine carboxylate herbicide or an agriculturally acceptable N-oxide, salt, or ester thereof may be mixed with or applied in combination with (b) a photosystem II (PS II) inhibitor or an agriculturally acceptable salt or ester thereof and (c) optionally, a 4-hydroxyphenyl-pyruvate dioxygenase (HPPD) inhibitor or an agriculturally acceptable salt or ester thereof. In some aspects, there is no HPPD inhibitor herbicide present in the composition.

In some aspects, (a), (b), and optionally (c) are used in an amount sufficient to induce an unexpectedly enhanced herbicidal effect (e.g., increased damage or injury to undesirable vegetation) while still showing good crop compatibility (e.g., no increased damage to crops or minimal increased damage or injury to crops) when compared to the individual application of the herbicidal compounds (a), (b), or (c). In some aspects, the damage or injury to undesirable vegetation caused by the compositions and methods disclosed herein is evaluated using a scale from 0% to 100%, when compared with the untreated control vegetation, wherein 0% indicates no damage to the undesirable vegetation and 100% indicates complete destruction of the undesirable vegetation.

In some aspects, the joint action of (a) the pyridine carboxylate herbicide or an agriculturally acceptable N-oxide, salt, or ester thereof, (b) the PS II inhibitor or an agriculturally acceptable salt or ester thereof, and (c) optionally, the HPPD inhibitor or an agriculturally acceptable salt or ester thereof results in unexpectedly enhanced herbicidal effect against undesirable vegetation, even at application rates below those typically used for the herbicide to have a herbicidal effect on its own. In some aspects, the compositions and methods disclosed herein can, based on the individual components, be used at lower application rates to achieve a herbicidal effect comparable to the effect produced by the individual components at normal application rates.

In some aspects, the weight ratio of (a) the pyridine carboxylate herbicide or an agriculturally acceptable N-oxide, salt, or ester thereof (in g ae/ha) to (b) the PS II inhibitor herbicide or an agriculturally acceptable salt or ester thereof (in g ai/ha) can be 1:18,000 or more, such as 1:17,000 or more, 1:15,000 or more, 1:12,500 or more, 1:11,000 or more, 1:10,000 or more, 1:9500 or more, 1:9000 or more, 1:8500 or more, 1:8000 or more, 1:7500 or more, 1:7000 or more, 1:6500 or more, 1:6000 or more, 1:5500 or more, 1:5000 or more, 1:4500 or more, 1:4000 or more, 1:3800 or more, 1:3600 or more, 1:3400 or more, 1:3200 or more, 1:3000 or more, 1:2800 or more, 1:2600 or more, 1:2400 or more, 1:2200 or more, 1:2000 or more, 1:1800 or more, 1:1600 or more, 1:1400 or more, 1:1200 or more, 1:1000 or more, 1:900 or more, 1:800 or more, 1:700 or more, 1:600 or more, 1:500 or more, 1:400 or more, 1:300 or more, 1:200 or more, 1:100 or more, 1:90 or more, 1:80 or more, 1:70 or more, 1:60 or more, 1:50 or more, 1:40 or more, 1:30 or more, 1:24 or more, 1:20 or more, 1:18 or more, 1:16 or more, 1:14 or more, 1:13 or more, 1:10 or more, 1:9 or more, 1:8 or more, 1:7 or more, 1:6 or more, 1:5 or more, 1:4 or more, 1:3 or more, 1:2 or more, 1:1.9 or more, 1:1.8 or more, 1:1.7 or more, 1:1.6 or more, 1:1.5 or more, 1:1.4 or more, 1:1.3 or more, 1:1.2 or more, 1:1.1 or more, 1:1 or more, 1.1:1 or more, 1.2:1 or more, 1.3:1 or more, 1.4:1 or more, 1.5:1 or more, 1.6:1 or more, 1.7:1 or more, 1.8:1 or more, 1.9:1 or more, 2:1 or more, 3:1 or more, 4:1 or more, 5:1 or more, 6:1 or more, 7:1 or more, 8:1 or more, 9:1 or more, 10:1 or more, 12:1 or more, 14:1 or more, 15:1 or more, 16:1 or more, 18:1 or more, 20:1 or more, 22:1 or more, 24:1 or more, 25:1 or more, 26:1 or more, 28:1 or more, 30:1 or more, 35:1 or more, 40:1 or more, 45:1 or more, 50:1 or more, or 55:1 or more; the weight ratio of (a) to (b) can be 60:1 or less, such as 55:1 or less, 50:1 or less, 45:1 or less, 40:1 or less, 35:1 or less, 30:1 or less, 28:1 or less, 26:1 or less, 25:1 or less, 24:1 or less, 22:1 or less, 20:1 or less, 18:1 or less, 16:1 or less, 15:1 or less, 14:1 or less, 12:1 or less, 10:1 or less, 10:1 or less, 9:1 or less, 8:1 or less, 7:1 or less, 6:1 or less, 5:1 or less, 4:1 or less, 3:1 or less, 2:1 or less, 1.9:1 or less, 1.8:1 or less, 1.7:1 or less, 1.6:1 or less, 1.5:1 or less, 1.4:1 or less, 1.3:1 or less, 1.2:1 or less, 1.1:1 or less, 1:1 or less, 1:1.1 or less, 1:1.2 or less, 1:1.3 or less, 1:1.4 or less, 1:1.5 or less, 1:1.6 or less, 1:1.7 or less, 1:1.8 or less, 1:1.9 or less, 1:2 or less, 1:3 or less, 1:4 or less, 1:5 or less, 1:6 or less, 1:7 or less, 1:8 or less, 1:9 or less, 1:10 or less, 1:12 or less, 1:14 or less, 1:15 or less, 1:16 or less, 1:18 or less, 1:20 or less, 1:24 or less, 1:30 or less, 1:40 or less, 1:50 or less, 1:60 or less, 1:70 or less, 1:80 or less, 1:90 or less, 1:100 or less, 1:200 or less, 1:300 or less, 1:400 or less, 1:500 or less, 1:600 or less, 1:700 or less, 1:800 or less, 1:900 or less, 1:1000 or less, 1:1200 or less, 1:1400 or less, 1:1600 or less, 1:1800 or less, 1:2000 or less, 1:2200 or less, 1:2400 or less, 1:2600 or less, 1:2800 or less, 1:3000 or less, 1:3200 or less, 1:3400 or less, 1:3600 or less, 1:3800 or less, 1:4000 or less, 1:4500 or less, 1:5000 or less, 1:5500 or less, 1:6000 or less, 1:6500 or less, 1:7000 or less, 1:7500 or less, 1:8000 or less, 1:8500 or less, 1:9000 or less, 1:10,000 or less, 1:11,000 or less, 1:12,500 or less, 1:15,000 or less, or 1:17,000 or less; or the weight ratio of (a) to (b) can range from any of the minimum ratios to any of the maximum ratios provided above, such as from 1:18.000 to 60:1, from 1:6500 to 10:1, from 1:1500 to 12:1, from 1:100 to 16:1, from 1:24 to 1:18, from 1:16 to 1:12, or from 1:5 to 5:1. In some aspects, there is no HPPD inhibitor herbicide present in the composition.

In some aspects, the weight ratio of (a) the pyridine carboxylate herbicide or an agriculturally acceptable N-oxide, salt, or ester thereof (in g ae/ha) to, if present, (c) the optional HPPD inhibitor herbicide or an agriculturally acceptable salt or ester thereof (in g ai/ha) can be 1:4500 or more, such as 1:4000 or more, 1:3500 or more, 1:3000 or more, 1:2500 or more, 1:2000 or more, 1:1500 or more, 1:1000 or more, 1:900 or more, 1:800 or more, 1:700 or more, 1:600 or more, 1:500 or more, 1:400 or more, 1:300 or more, 1:200 or more, 1:100 or more, 1:90 or more, 1:80 or more, 1:70 or more, 1:60 or more, 1:50 or more, 1:40 or more, 1:30 or more, 1:24 or more, 1:20 or more, 1:18 or more, 1:15 or more, 1:12 or more, 1:10 or more, 1:9 or more, 1:8 or more, 1:7 or more, 1:6 or more, 1:5 or more, 1:4 or more, 1:3 or more, 1:2 or more, 1:1.9 or more, 1:1.8 or more, 1:1.7 or more, 1:1.6 or more, 1:1.5 or more, 1:1.4 or more, 1:1.3 or more, 1:1.2 or more, 1:1.1 or more, 1:1 or more, 1.1:1 or more, 1.2:1 or more, 1.3:1 or more, 1.4:1 or more, 1.5:1 or more, 1.6:1 or more, 1.7:1 or more, 1.8:1 or more, 1.9:1 or more, 2:1 or more, 3:1 or more, 4:1 or more, 5:1 or more, 6:1 or more, 7:1 or more, 8:1 or more, 9:1 or more, 10:1 or more, 15:1 or more, 20:1 or more, 22:1 or more, 24:1 or more, 25:1 or more, 26:1 or more, 28:1 or more, 30:1 or more, 35:1 or more, 40:1 or more, 45:1 or more, 50:1 or more, or 55:1 or more; the weight ratio of (a) to, if present, (c) can be 300:1 or less such as 250:1 or less, 200:1 or less, 150:1 or less, 125:1 or less, 100:1 or less, 90:1 or less, 80:1 or less, 70:1 or less, 60:1 or less, 55:1 or less, 50:1 or less, 45:1 or less, 40:1 or less, 35:1 or less, 30:1 or less, 28:1 or less, 26:1 or less, 25:1 or less, 24:1 or less, 22:1 or less, 20:1 or less, 15:1 or less, 10:1 or less, 9:1 or less, 8:1 or less, 7:1 or less, 6:1 or less, 5:1 or less, 4:1 or less, 3:1 or less, 2:1 or less, 1.9:1 or less, 1.8:1 or less, 1.7:1 or less, 1.6:1 or less, 1.5:1 or less, 1.4:1 or less, 1.3:1 or less, 1.2:1 or less, 1.1:1 or less, 1:1 or less, 1:1.1 or less, 1:1.2 or less, 1:1.3 or less, 1:1.4 or less, 1:1.5 or less, 1:1.6 or less, 1:1.7 or less, 1:1.8 or less, 1:1.9 or less, 1:2 or less, 1:3 or less, 1:4 or less, 1:5 or less, 1:6 or less, 1:7 or less, 1:8 or less, 1:9 or less, 1:10 or less, 1:20 or less, 1:30 or less, 1:40 or less, 1:50 or less, 1:60 or less, 1:70 or less, 1:80 or less, 1:90 or less, 1:100 or less, 1:200 or less, 1:300 or less, 1:400 or less, 1:500 or less, 1:1000 or less, 1:1500 or less, 1:2000 or less, 1:2500 or less, 1:3000 or less, 1:3500 or less, or 1:4000 or less; or the weight ratio of (a) to, if present, (c) can range from any of the minimum ratios to any of the maximum ratios provided above, such as 1:4500 to 300:1, 1:700 to 6:1, 1:40 to 90:1, 1:10 to 16:1, 1:14 to 10:1, 1:8 to 1:6, or 1:5 to 5:1. In some aspects, there is no HPPD inhibitor herbicide present in the composition.

In some aspects, the weight ratio of (a) the pyridine carboxylate herbicide or an agriculturally acceptable N-oxide, salt, or ester thereof (in g ae/ha) to (b) the PS II inhibitor herbicide or an agriculturally acceptable salt or ester thereof (in g ai/ha) to, if present, (c) the optional HPPD inhibitor herbicide or an agriculturally acceptable salt or ester thereof (in g ai/ha) can range from any of the minimum ratios to any of the maximum ratios provided above, such as 1:18,000:

4500 to 60:1:0, 1:7000:1000 to 300:10:1, 1:2800:600 to 2:1:0, 1:45:10 to 10:10:1, 1:24:0 to 1:18:0, 1:16:8 to 1:12:6, or 1:5:5 to 5:1:0).

In some aspects, the active ingredients in the compositions disclosed herein consist of (a) a pyridine carboxylate herbicide or an agriculturally acceptable N-oxide, salt, or ester thereof and (b) a PS II inhibitor herbicide or an agriculturally acceptable salt or ester thereof. In some aspects, the active ingredients in the compositions disclosed herein consist of (a) a pyridine carboxylate herbicide or an agriculturally acceptable N-oxide, salt, or ester thereof, (b) a PS II inhibitor herbicide or an agriculturally acceptable salt or ester thereof, and (c) the HPPD inhibitor herbicide or an agriculturally acceptable salt or ester thereof. In some aspects, the composition may include other components, such as safeners or adjuvants, but does not include a herbicidal active ingredient in addition to (a) and (b) and, optionally, (c).

In some aspects, (a), (b), and optionally (c), independently, can be employed in a purity of from 90% to 100% (e.g., from 95% to 100%) according to nuclear magnetic resonance (NMR) spectroscopy.

VI. Formulations

The present disclosure also includes formulations of the compositions and methods disclosed herein.

A. Additives

The compositions and methods disclosed herein can also be mixed with or applied with an additive. In some aspects, the additive is added sequentially. In some aspects, the additive is added simultaneously. In some aspects, the additive is premixed with the pyridine carboxylate herbicide or agriculturally acceptable N-oxide, salt, or ester thereof.

1. Other Pesticides

Some aspects of the described herbicidal compositions includes adding one or more additional pesticide active ingredients to the herbicidal compositions. These pesticide active ingredients may include one or more of an herbicide, an insecticide, a fungicide, a nematocide, a miticide, a arthropodicide, a bactericide, a plant growth regulator, or combinations thereof that are compatible with the compositions of the present disclosure.

In some aspects, the additive is an additional herbicide. For example, the compositions described herein can be applied in conjunction with one or more additional herbicides to control undesirable vegetation. The composition can be formulated with the one or more additional herbicides, tank mixed with the one or more additional herbicides, or applied sequentially with the one or more additional herbicides. Exemplary additional herbicides include, but are not limited to: 4-CPA; 4-CPB; 4-CPP; 2,4-D; 2,4-D choline salt; 2,4-D salts, esters and amines; 2,4-DB; 3,4-DA; 3,4-DB; 2,4-DEB; 2,4-DEP; 2,4-DP; 3,4-DP; 2,3,6-TBA; 2,4,5-T; 2,4,5-TB; acetochlor; acifluorfen; aclonifen; acrolein; alachlor; allidochlor; alloxydim; allyl alcohol; alorac; ametridione; ametryne; amibuzin; amicarbazone; amidosulfuron; aminocyclopyrachlor; 4-aminopicolinic acid based herbicides, such as halauxifen, halauxifen-methyl, florpyrauxifen, and those described in U.S. Pat. Nos. 7,314,849 and 7,432,227 to Balko, et al.; aminopyralid; amiprofos-methyl; amitrole; ammonium sulfamate; anilofos; anisuron; asulam; atraton; atrazine; azafenidin; azimsulfuron; aziprotryne; barban; BCPC; beflubutamid; benazolin; bencarbazone; benfluralin; benfuresate; bensulide; bensulfuron; benthiocarb; bentazone; benzadox; benzfendizone; benzipram; benzobicyclon; benzofenap; benzofluor; benzoylprop; benzthiazuron; bialaphos; bicyclopyrone; bifenox; bilanafos; bispyribac; borax; bromacil; bromobonil; bromobutide; bromofenoxim; bromoxynil; brompyrazon; butachlor; butafenacil; butamifos; butenachlor; buthidazole; buthiuron; butralin; butroxydim; buturon; butylate; cacodylic acid; cafenstrole; calcium chlorate; calcium cyanamide; cambendichlor; carbasulam; carbetamide; carboxazole; chlorprocarb; carfentrazone-ethyl; CDEA; CEPC; chlomethoxyfen; chloramben; chloranocryl; chlorazifop; chlorazine; chlorobromuron; chlorbufam; chloreturon; chlorfenac; chlorfenprop; chlorflurazole; chlorflurenol; chloridazon; chlorimuron; chlomitrofen; chloropon; chlorotoluron; chloroxuron; chloroxynil; chlorpropham; chlorsulfuron; chlorthal; chlorthiamid; cinidon-ethyl; cinmethylin; cinosulfuron; cisanilide; clacyfos; clethodim; cliodinate; clodinafop-propargyl; clofop; clomazone; clomeprop; cloprop; cloproxydim; clopyralid; cloransulam-methyl; CMA; copper sulfate; CPMF; CPPC; credazine; cresol; cumyluron; cyanatryn; cyanazine; cycloate; cyclopyrimorate; cyclosulfamuron; cycloxydim; cycluron; cyhalofop-butyl; cyperquat; cyprazine; cyprazole; cypromid; daimuron; dalapon; dazomet; delachlor; desmedipham; desmetryn; di-allate; dicamba; dichlobenil; dichloralurea; dichlormate; dichlorprop; dichlorprop-P; diclofop-methyl; diclosulam; diethamquat; diethatyl; difenopenten; difenoxuron; difenzoquat; diflufenican; diflufenzopyr; dimefuron; dimepiperate; dimethachlor; dimethametryn; dimethenamid; dimethenamid-P; dimexano; dimidazon; dinitramine; dinofenate; dinoprop; dinosam; dinoseb; dinoterb; diphenamid; dipropetryn; diquat; disul; dithiopyr; diuron; DMPA; DNOC; DSMA; EBEP; eglinazine; endothal; epronaz; EPTC; erbon; esprocarb; ethalfluralin; ethametsulfuron; ethbenzamide; ethametsulfuron; ethidimuron; ethiolate; ethobenzamid; ethofumesate; ethoxyfen; ethoxysulfuron; etinofen; etnipromid; etobenzanid; EXD; fenasulam; fenoprop; fenoxaprop; fenoxaprop-P-ethyl; fenoxaprop-P-ethyl+isoxadifen-ethyl; fenoxasulfone; fenquinotrione; fenteracol; fenthiaprop; fentrazamide; fenuron; ferrous sulfate; flamprop; flamprop-M; flazasulfuron; florasulam; fluazifop; fluazifop-P-butyl; fluazolate; flucarbazone; flucetosulfuron; fluchloralin; flufenacet; flufenican; flufenpyr-ethyl; flumetsulam; flumezin; flumiclorac-pentyl; flumioxazin; flumipropyn; fluometuron; fluorodifen; fluoroglycofen; fluoromidine; fluoronitrofen; fluothiuron; flupoxam; flupropacil; flupropanate; flupyrsulfuron; fluridone; flurochloridone; fluroxypyr; fluroxypyr-meptyl; flurtamone; fluthiacet; fomesafen; foramsulfuron; fosamine; fumiclorac; furyloxyfen; glufosinate; glufosinate-ammonium; glufosinate-P-ammonium; glyphosate salts and esters; halosafen; halosulfuron; haloxydine; haloxyfop; hexachloroacetone; hexaflurate; hexazinone; imazamethabenz; imazamox; imazapic; imazapyr; imazaquin; imazethapyr; imazosulfuron; indanofan; indaziflam; iodobonil; iodomethane; iodosulfuron; iodosulfuron-ethyl-sodium; iofensulfuron; ioxynil; ipazine; ipfencarbazone; iprymidam; isocarbamid; isocil; isomethiozin; isonoruron; isopolinate; isopropalin; isoproturon; isouron; isoxaben; isoxachlortole; isoxaflutole; isoxapyrifop; karbutilate; ketospiradox; lactofen; lenacil; linuron; MAA; MAMA; MCPA esters and amines; MCPA-thioethyl; MCPB; mecoprop; mecoprop-P; medinoterb; mefenacet; mefluidide; mesoprazine; mesosulfuron; mesotrione; metam; metamifop; metamitron; metazachlor; metflurazon; methabenzthiazuron; methalpropalin; methazole; methiobencarb; methiozolin; methiuron; methometon; methoprotryne; methyl bromide; methyl isothiocyanate; methyldymron; metobenzuron; metobromuron; metolachlor; metosulam; metoxuron; metribuzin; metsulfuron; molinate;

monalide; monisouron; monochloroacetic acid; monolinuron; monuron; morfamquat; MSMA; naproanilide; napropamide; napropamide-M; naptalam; neburon; nicosulfuron; nipyraclofen; nitralin; nitrofen; nitrofluorfen; norflurazon; noruron; OCH; orbencarb; ortho-dichlorobenzene; orthosulfamuron; oryzalin; oxadiargyl; oxadiazon; oxapyrazon; oxasulfuron; oxaziclomefone; oxyfluorfen; paraflufen-ethyl; parafluron; paraquat; pebulate; pelargonic acid; pendimethalin; penoxsulam; pentachlorophenol; pentanochlor; pentoxazone; perfluidone; pethoxamid; phenisopham; phenmedipham; phenmedipham-ethyl; phenobenzuron; phenylmercury acetate; picloram; picolinafen; pinoxaden; piperophos; potassium arsenite; potassium azide; potassium cyanate; pretilachlor; primisulfuron; procyazine; prodiamine; profluazol; profluralin; profoxydim; proglinazine; prohexadione-calcium; prometon; prometryne; pronamide; propachlor; propanil; propaquizafop; propazine; propham; propisochlor; propoxycarbazone; propyrisulfuron; propyzamide; prosulfalin; prosulfocarb; prosulfuron; proxan; prynachlor; pydanon; pyraclonil; pyraflufen; pyrasulfotole; pyrazogyl; pyrazone; pyrazolynate; pyrazosulfuron; pyrazoxyfen; pyribenzoxim; pyributicarb; pyriclor; pyridafol; pyridate; pyriftalid; pyriminobac; pyrimisulfan; pyrithiobac-sodium; pyroxasulfone; pyroxsulam; quinclorac; quinmerac; quinoclamine; quinonamid; quizalofop; quizalofop-P-ethyl; quizalofop-P-tefuryl; rhodethanil; rimsulfuron; saflufenacil; S-metolachlor; sebuthylazine; secbumeton; sethoxydim; siduron; simazine; simeton; simetryn; SMA; sodium arsenite; sodium azide; sodium chlorate; sulcotrione; sulfallate; sulfentrazone; sulfometuron; sulfosate; sulfosulfuron; sulfuric acid; sulglycapin; swep; TCA; tebutam; tebuthiuron; tefuryltrione; tembotrione; tepraloxydim; terbacil; terbucarb; terbuchlor; terbumeton; terbuthylazine; terbutryne; tetrafluron; thenylchlor; thiameturon; thiazafluron; thiazopyr; thidiazimin; thidiazuron; thiencarbazone; thifensulfuron; thiobencarb; tiafenacil; tiocarbazil; tioclorim; tolpyralate; topramezone; tralkoxydim; tri-allate; triafamone; triasulfuron; triaziflam; tribenuron; tribenuron; tricamba; triclopyr choline salt; triclopyr esters and amines; tridiphane; trietazine; trifloxysulfuron; trifludimoxazin; trifluralin; triflusulfuron; trifop; trifopsime; trihydroxytriazine; trimeturon; tripropindan; tritac; tritosulfuron; vemolate; xylachlor; and salts, esters, optically active isomers, and mixtures thereof.

In some aspects, the additional pesticide or an agriculturally acceptable salt or ester thereof is provided in a premixed formulation with (a), (b), optionally (c), or combinations thereof. In some aspects, the pyridine carboxylate herbicide or an agriculturally acceptable N-oxide, salt, or ester thereof is provided in a premixed formulation with an additional pesticide. In some aspects, the PS II inhibitor herbicide or an agriculturally acceptable salt or ester thereof is provided in a premixed formulation with an additional pesticide. In some aspects, the optional HPPD inhibitor herbicide or an agriculturally acceptable salt or ester thereof, if present, is provided in a premixed formulation with an additional pesticide.

In some aspects, the compositions may include one or more herbicidal active ingredients in addition to (a), (b), and optionally (c). In some aspects, the compositions do not include an herbicidal active ingredient in addition to (a), (b), and optionally (c). In some aspects, the compositions may exclude one or more herbicidal active ingredients specified above. In some aspects, the compositions may include one or more herbicidal active ingredients in addition to (a), (b), and optionally (c), but may exclude one or more herbicidal ingredients specified above.

2. Adjuvants

In some aspects, the additive includes an agriculturally acceptable adjuvant. Exemplary agriculturally acceptable adjuvants include, but are not limited to, antifreeze agents, antifoam agents, compatibilizing agents, sequestering agents, neutralizing agents and buffers, corrosion inhibitors, colorants, odorants, penetration aids, wetting agents, spreading agents, dispersing agents, thickening agents, freeze point depressants, antimicrobial agents, crop oil, adhesives (for instance, for use in seed formulations), surfactants, protective colloids, emulsifiers, tackifiers, and mixtures thereof.

Exemplary agriculturally acceptable adjuvants include, but are not limited to, crop oil concentrates (e.g., 85% mineral oil+15% emulsifiers); nonylphenol ethoxylates; benzylcocoalkyldimethyl quaternary ammonium salts; blends of petroleum hydrocarbon, alkyl esters, organic acids, and anionic surfactants; $C_9$-$C_{11}$ alkylpolyglycoside; phosphate alcohol ethoxylates; natural primary alcohol ($C_{12}$-$C_{16}$) ethoxylate; di-sec-butylphenol EO-PO block copolymers; polysiloxane-methyl cap; nonylphenol ethoxylate+urea ammonium nitrates; emulsified methylated seed oils; tridecyl alcohol (synthetic) ethoxylates (e.g., 8 EO); tallow amine ethoxylates (e.g., 15 EO); and PEG(400) dioleate-99.

Exemplary surfactants (e.g., wetting agents, tackifiers, dispersants, emulsifiers) include, but are not limited to: the alkali metal salts, alkaline earth metal salts and ammonium salts of fatty acids or of aromatic sulfonic acids (e.g., lignosulfonic acids, phenolsulfonic acids, naphthalenesulfonic acids, and dibutylnaphthalenesulfonic acid); alkyl- and alkylarylsulfonates; alkyl sulfates, lauryl ether sulfates and fatty alcohol sulfates; salts of sulfated hexa-, hepta- and octadecanols; salts of fatty alcohol glycol ethers; condensates of sulfonated naphthalene and its derivatives with formaldehyde; condensates of naphthalene or of the naphthalene sulfonic acids with phenol and formaldehyde; polyoxyethylene octylphenol ether; ethoxylated isooctyl-, octyl- or nonylphenol, alkylphenyl or tributylphenyl polyglycol ether; alkyl aryl polyether alcohols; isotridecyl alcohol; fatty alcohol/ethylene oxide condensates; ethoxylated castor oil; polyoxyethylene alkyl ethers or polyoxypropylene alkyl ethers; lauryl alcohol polyglycol ether acetate; sorbitol esters; lignosulfite waste liquors and proteins; denatured proteins, polysaccharides (e.g., methylcellulose); hydrophobically modified starches; and polyvinyl alcohol, polycarboxylates, polyalkoxylates, polyvinyl amine, polyethyleneimine, polyvinylpyrrolidone, and copolymers thereof.

Exemplary thickeners include, but are not limited to, polysaccharides (e.g., xanthan gum), organic and inorganic sheet minerals, and mixtures thereof.

Exemplary antifoam agents include, but are not limited to, silicone emulsions, long-chain alcohols, fatty acids, fatty acid salts, organofluorine compounds, and mixtures thereof.

Exemplary antimicrobial agents include, but are not limited to: bactericides based on dichlorophen and benzyl alcohol hemiformal; isothiazolinone derivatives, such as alkylisothiazolinones and benzisothiazolinones; and mixtures thereof.

Exemplary antifreeze agents, include, but are not limited to ethylene glycol, propylene glycol, urea, glycerol, and mixtures thereof.

Exemplary colorants include, but are not limited to, the dyes known under the names Rhodamine B, pigment blue 15:4, pigment blue 15:3, pigment blue 15:2, pigment blue 15:1, pigment blue 80, pigment yellow 1, pigment yellow 13, pigment red 112, pigment red 48:2, pigment red 48:1, pigment red 57:1, pigment red 53:1, pigment orange 43, pigment orange 34, pigment orange 5, pigment green 36, pigment green 7, pigment white 6, pigment brown 25, basic violet 10, basic violet 49, acid red 51, acid red 52, acid red 14, acid blue 9, acid yellow 23, basic red 10, basic red 108, and mixtures thereof.

Exemplary adhesives include, but are not limited to, polyvinylpyrrolidone, polyvinyl acetate, polyvinyl alcohol, tylose, and mixtures thereof.

3. Safeners

In some aspects, the additive is a safener. Safeners are compounds leading to better crop plant compatibility when applied with a herbicide. In some aspects, the safener itself is herbicidally active. In some aspects, the safener acts as an antidote or antagonist in the crop plants and can protect the crop plants from damage that might otherwise occur from an applied herbicide. Exemplary safeners include, but are not limited to, AD-67 (MON 4660), benoxacor, benthiocarb, brassinolide, cloquintocet, cloquintocet-mexyl, cyometrinil, cyprosulfamide, daimuron, dichlormid, dicyclonon, dietholate, dimepiperate, disulfoton, fenchlorazole, fenchlorazole-ethyl, fenclorim, flurazole, fluxofenim, furilazole, harpin proteins, isoxadifen-ethyl, jiecaowan, jiecaoxi, mefenpyr, mefenpyr-diethyl, mephenate, naphthalic anhydride, 2,2,5-trimethyl-3-(dichloroacetyl)-1,3-oxazolidine, 4-(dichloro-acetyl)-1-oxa-4-azaspiro[4.5]decane, oxabetrinil, R29148, and N-phenyl-sulfonylbenzoic acid amides, as well as thereof agriculturally acceptable salts and, provided they have a carboxyl group, their agriculturally acceptable derivatives. In some aspects, the safener can be cloquintocet or an ester or salt thereof, such as cloquintocet-mexyl. In some aspects, the safener can be mefenpyr or an ester or salt thereof, such as mefenpyr-diethyl. In some aspects, the safener is employed in rice, cereal, or maize. For example, mefenpyr or cloquintocet can be used to antagonize harmful effects of the compositions on rice, row crops, and cereals.

4. Carriers

In some aspects, the additive includes a carrier. In some aspects, the additive includes a liquid or solid carrier. In some aspects, the additive includes an organic or inorganic carrier. Exemplary liquid carriers include, but are not limited to: water; petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids and the like; toluene; xylene; petroleum naphtha; crop oil; acetone; methyl ethyl ketone; cyclohexanone; trichloroethylene; perchloroethylene; ethyl acetate; amyl acetate; butyl acetate; propylene glycol monomethyl ether and diethylene glycol monomethyl ether; methyl alcohol; ethyl alcohol; isopropyl alcohol; amyl alcohol; ethylene glycol; propylene glycol; glycerin; N-methyl-2-pyrrolidinone; N;N-dimethyl alkylamides; dimethyl sulfoxide; and liquid fertilizers, as well as mixtures thereof. Exemplary solid carriers include, but are not limited to: silicas, silica gels, silicates, talc, kaolin, limestone, lime, chalk, bole, loess, clay, dolomite, diatomaceous earth, calcium sulfate, magnesium sulfate, magnesium oxide, ground synthetic materials, pyrophyllite clay, attapulgus clay, kieselguhr, calcium carbonate, bentonite clay, Fuller's earth, cottonseed hulls, wheat flour, soybean flour, pumice, wood flour, walnut shell flour, lignin, ammonium sulfate, ammonium phosphate, ammonium nitrate, ureas, cereal meal, tree bark meal, wood meal and nutshell meal, cellulose powders, and mixtures thereof.

B. Physical States

In some aspects, the formulation of (a) the pyridine carboxylate herbicide or an agriculturally acceptable N-oxide, salt, or ester thereof, (b) the PS II inhibitor herbicide or an agriculturally acceptable salt or ester thereof, and (c) the optional HPPD inhibitor herbicide or an agriculturally acceptable salt or ester thereof may be present in suspended, emulsified, dissolved, or solid form. Exemplary formulations include, but are not limited to, aqueous solutions, aqueous suspensions, aqueous dispersions, aqueous emulsions, aqueous microemulsions, aqueous suspo-emulsions, oil solutions, oil suspensions, oil dispersions, oil emulsions, oil microemulsions, oil suspo-emulsions, self-emulsifying formulations, pastes, powders, dusts, granules, and materials for spreading.

In some aspects, (a), (b), and (c) are aqueous solutions that can be diluted before use. In various aspects, (a), (b), and optionally (c) are provided as high-strength formulations such as concentrates. In some aspects, the concentrate is stable and retains potency during storage and shipping. In various aspects, the concentrate is a clear, homogeneous liquid that is stable at temperatures of 54° C. or greater. In some aspects, the concentrate does not exhibit any precipitation of solids at temperatures of −10° C. or higher. In some aspects, the concentrate does not exhibit separation, precipitation, or crystallization of any components at low temperatures. For example, the concentrate remains a clear solution at temperatures below 0° C. (e.g., below −5° C., below −10° C., below −15° C.). In some aspects, the concentrate exhibits a viscosity of less than 50 centipoise (50 megapascals), even at temperatures as low as 5° C. In some aspects, the concentrate does not exhibit separation, precipitation, or crystallization of any components during storage for a period of 2 weeks or greater (e.g., 4 weeks, 6 weeks, 8 weeks, 3 months, 6 months, 9 months, or 12 months or greater).

In some aspects, emulsions, pastes, or oil dispersions can be prepared by homogenizing (a), (b), and optionally (c) in water with a wetting agent, tackifier, dispersant, or emulsifier. In some aspects, concentrates suitable for dilution with water can be prepared, comprising (a), (b), a wetting agent, a tackifier, and a dispersant or emulsifier.

In some aspects, powders, materials for spreading, or dusts can be prepared by mixing or concomitant grinding of (a), (b), and optionally (c), and optionally other additives with a solid carrier.

In some aspects, granules (e.g., coated granules, impregnated granules and homogeneous granules) can be prepared by binding (a), (b), and optionally (c) to solid carriers.

In some aspects, the formulations comprise, by total weight of (a) and (b), from 1% to 99% of (a) and 1% to 99% of (b) (e.g., 95% of (a) and 5% of (b); 70% of (a) and 30% of (b); or 40% of (a) and 60% of (b)). In formulations designed to be employed as concentrates, the total amount of (a) and (b) can be present in a concentration of from about 0.1 to about 98 weight percent (wt. %), based on the total weight of the formulation. For example, the total amount of (a) and (b) can be present in a concentration as little as about 1 wt. %, about 2.5 wt. %, about 5 wt. %, about 7.5 wt. %, about 10 wt. %, about 15 wt. %, about 20 wt. %, about 25 wt. %, about 30 wt. %, about 35 wt. %, about 40 wt. %, about 45 wt. %, as high as about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, about 97 wt. %, or within any range defined between any two of the forgoing values, such as between about 1 wt. % to about 97 wt. %, between about 10 wt. % to about 90 wt. %, between about 20 wt. % to about 45 wt. %, and about 25 wt. % to about 50 wt. % based on the total weight of the formulation. In some aspects, the formulation may comprise, by total weight of (a), (b), and (c), from 1% to 98% of (a), 1% to 98% of (b), and 1% to 98% of (c) (e.g., 90% of (a), 5% of (b), and 5% of (c); 70% of (a), 29% of (b) and 1% of (c); or 40% of (a), 50% of (b), and 10% of (c)). In formulations designed to be employed as concentrates, the total amount of (a), (b), and optionally (c) can be present in a concentration of from about 0.1 to about 98 weight percent (wt. %), based on the total weight of the formulation. Concentrates can be diluted with an inert carrier, such as water, prior to application. The diluted formulations applied to undesirable vegetation or the locus of undesirable vegetation can contain from 0.0006 to 8.0 wt. % of the total amount of (a) and (b) (e.g., from 0.001 to 5.0 wt. %), based on the total weight of the diluted formulation.

C. Packaging

In some aspects, the formulation can be in the form of a single package formulation including: (a) the pyridine carboxylate herbicide or an agriculturally acceptable N-oxide, salt, or ester thereof; (b) the PS II inhibitor herbicide or an agriculturally acceptable salt or ester thereof; and (c) optionally, the HPPD inhibitor herbicide. In some aspects, the formulation can be in the form of a single package formulation including (a), (b), and optionally (c), and further including at least one additive. In some aspects, the formulation can be in the form of a multi-package formulation, such as a two-package formulation, wherein one package contains (a) and optionally at least one additive while the other package contains (b), optionally (c), and optionally at least one additive. In some aspects of the two-package formulation, the formulation including (a) and optionally at least one additive and the formulation including (b), optionally (c), and optionally at least one additive are mixed before application and then applied simultaneously. In some aspects, the formulation can be in the form of a three-package formulation, wherein one package contains (a) and optionally at least one additive, a second package contains (b) and optionally at least one additive, and the third package contains (c) and optionally at least one additive. In some aspects of the three-package formulation, the formulation including (a) and optionally at least one additive, the formulation including (b) and optionally at least one additive, and the formulation containing (c) and optionally at least one additive are mixed before application and then applied simultaneously. In some aspects, the mixing is performed as a tank mix (e.g., the formulations are mixed immediately before or upon dilution with water). In some aspects, the formulation including (a), the formulation including (b) and, optionally, the formulation containing (c) are not mixed but are applied sequentially (in succession), for example, immediately or within 1 hour, within 2 hours, within 4 hours, within 8 hours, within 16 hours, within 24 hours, within 2 days, or within 3 days, of each other.

VII. Methods of Use

The compositions disclosed herein can be applied in any known technique for applying herbicides. Exemplary application techniques include, but are not limited to, spraying, atomizing, dusting, spreading, or direct application into water. The method of application can vary depending on the intended purpose. In some aspects, the method of application can be chosen to ensure the finest possible distribution of the compositions disclosed herein.

In some aspects, a method of controlling undesirable vegetation which comprises contacting the vegetation or the locus thereof with or applying to the soil or water to prevent the emergence or growth of vegetation any of the compositions is disclosed herein.

The compositions disclosed herein can be applied pre-emergence (before the emergence of undesirable vegetation) or post-emergence (e.g., during and/or after emergence of the undesirable vegetation). In some aspects, the composition is applied post-emergence to the undesirable vegetation. In some aspects, the pyridine carboxylate herbicide, the PS II inhibitor herbicide, and, optionally, the HPPD inhibitor herbicide are applied simultaneously. In some aspects, the pyridine carboxylate herbicide, PS II inhibitor herbicide, and, optionally, the HPPD inhibitor herbicide, are applied sequentially, for example, immediately or with minimal delay, within about 10 minutes, within about 20 minutes, within about 30 minutes, within about 40 minutes, within about 1 hour, within about 2 hours, within about 4 hours, within about 8 hours, within about 16 hours, within about 24 hours, within about 2 days, or within about 3 days, of each other.

When the compositions are used in crops, the compositions can be applied after seeding and before or after the emergence of the crop plants. In some aspects, the compositions disclosed herein show good crop tolerance even when the crop has already emerged and can be applied during or after the emergence of the crop plants. In some aspects, when the compositions are used in crops, the compositions can be applied before seeding of the crop plants.

In some aspects, the compositions disclosed herein are applied to vegetation or an area adjacent the vegetation or applying to soil or water to prevent the emergence or growth of vegetation by spraying (e.g., foliar spraying). In some aspects, the spraying techniques use, for example, water as carrier and spray volume rates of from 2 liters per hectare (L/ha) to 2000 L/ha (e.g., from 10-1000 L/ha or from 50-500 L/ha). In some aspects, the compositions disclosed herein are applied by the low-volume or the ultra-low-volume method, wherein the application is in the form of micro granules. In some aspects, wherein the compositions disclosed herein are less well tolerated by certain crop plants, the compositions can be applied with the aid of the spray apparatus in such a way that they come into little contact, if any, with the leaves of the sensitive crop plants while reaching the leaves of undesirable vegetation that grows underneath or on the bare soil (e.g., post-directed or lay-by). In some aspects, the compositions disclosed herein can be applied as dry formulations (e.g., granules, powders, or dusts).

In some aspects, wherein the undesirable vegetation is treated post-emergence, the compositions disclosed herein are applied by foliar application. In some aspects, herbicidal activity is exhibited by the compounds of the mixture when they are applied directly to the plant or to the locus of the plant at any stage of growth or before planting or emergence. The effect observed can depend upon the type of undesirable vegetation to be controlled, the stage of growth of the undesirable vegetation, the application parameters of dilution and spray drop size, the particle size of solid components, the environmental conditions at the time of use, the specific compound employed, the specific adjuvants and carriers employed, the soil type, and the like, as well as the amount of chemical applied. In some aspects, these and other factors can be adjusted to promote non-selective or selective herbicidal action.

The compositions and methods disclosed herein can be used to control undesirable vegetation in a variety of applications. The compositions and methods disclosed herein can be used for controlling undesirable vegetation in areas including, but not limited to, farmland, turfgrass, pastures, grasslands, rangelands, fallow land, rights-of-way, aquatic settings, tree and vine, wildlife management areas, or rangeland. In some aspects, the undesirable vegetation is controlled in a row crop. Exemplary crops include, but are not limited to, wheat, barley, triticale, rye, teff, oats, maize, cotton, soy, sorghum, rice, millet, sugarcane and range land (e.g., pasture grasses). In some aspects, the compositions and methods disclosed herein can be used for controlling undesirable vegetation in maize, wheat, barley, rice, sorghum, millet, oats, or combinations thereof. In some aspects, the compositions and methods disclosed herein can be used for controlling undesirable vegetation in broadleaf crops. In some aspects, the compositions and methods disclosed herein can be used for controlling undesirable vegetation in canola, flax, sunflower, soy, or cotton. In some aspects, the compositions and methods disclosed herein can be used in industrial vegetation management (IVM) or for utility, pipeline, roadside, and railroad rights-of-way applications. In some aspects, the compositions and methods disclosed herein can also be used in forestry (e.g., for site preparation or for combating undesirable vegetation in plantation forests). In some aspects, the compositions and methods disclosed herein can be used to control undesirable vegetation in conservation reserve program lands (CRP), trees, vines, grasslands, and grasses grown for seeds. In some aspects, the compositions and methods disclosed herein can be used on lawns (e.g., residential, industrial, and institutional), golf courses, parks, cemeteries, athletic fields, and sod farms.

The compositions and methods disclosed herein can also be used in crop plants that are resistant to, for instance, herbicides, pathogens, and/or insects. In some aspects, the compositions and methods disclosed herein can be used in crop plants that are resistant to one or more herbicides because of genetic engineering or breeding. In some aspects, the compositions and methods disclosed herein can be used in crop plants that are resistant to one or more pathogens such as plant pathogenic fungi owing to genetic engineering or breeding. In some aspects, the compositions and methods disclosed herein can be used in crop plants that are resistant to attack by insects owing to genetic engineering or breeding. Exemplary resistant crops include, but are not limited to, crops that are resistant to photosystem II inhibitors, or crop plants that, owing to introduction of the gene for *Bacillus thuringiensis* (or Bt) toxin by genetic modification, are resistant to attack by certain insects. In some aspects, the compositions and methods described herein can be used in conjunction with glyphosate, glufosinate, dicamba, phenoxy auxins, pyridyloxy auxins, aryloxyphenoxypropionates, acetyl CoA carboxylase (ACCase) inhibitors, imidazolinones, acetolactate synthase (ALS) inhibitors, 4-hydroxyphenyl-pyruvate dioxygenase (HPPD) inhibitors, protoporphyrinogen oxidase (PPO) inhibitors, triazines, and bromoxynil to control vegetation in crops tolerant to glyphosate, glufosinate, dicamba, phenoxy auxins, pyridyloxy auxins, aryloxyphenoxypropionates, ACCase inhibitors, imidazolinones, synthetic auxin herbicide, HPPD inhibitors, PPO inhibitors, triazines, bromoxynil, or combinations thereof. In some aspects, the undesirable vegetation is controlled in glyphosate, glufosinate, dicamba, phenoxy auxins, pyridyloxy auxins, aryloxyphenoxypropionates, ACCase inhibitors, synthetic auxin herbicide, HPPD inhibitors, PPO inhibitors, triazines, and bromoxynil tolerant crops possessing single, multiple or stacked traits conferring tolerance to single or multiple chemistries and/or multiple modes of action. In some aspects, the undesirable vegetation can be controlled in a crop that is ACCase-tolerant, ALS-tolerant, or a combination thereof. The combination of (a), (b), and optionally (c) can be used in combination with one or more herbicides that are selective for the crop being treated and which complement the spectrum of weeds controlled by these compounds at the application rate employed. In some aspects, the compositions described herein and other complementary herbicides are applied at the same time, either as a combination formulation or as a tank mix, or as sequential applications. The compositions and methods may be used in controlling undesirable vegetation in crops possessing agronomic stress tolerance (including but not limited to drought, cold, heat, salt, water, nutrient, fertility, pH), pest tolerance (including but not limited to insects, fungi and pathogens), and crop improvement traits (including but not limited to yield; protein, carbohydrate, or oil content; protein, carbohydrate, or oil composition; plant stature and plant architecture).

In some aspects, the compositions disclosed herein can be used for controlling undesirable vegetation including grasses, broadleaf weeds, sedge weeds, and combinations thereof. In some aspects, the compositions disclosed herein can be used for controlling undesirable vegetation including, but not limited to, *Polygonum* species, *Amaranthus* species, *Chenopodium* species, *Sida* species, *Ambrosia* species, *Cyperus* species, *Setaria* species, *Sorghum* species, *Acanthospermum* species, *Anthemis* species, *Atriplex* species, *Brassica* species, *Cirsium* species, *Convolvulus* species, *Conyza* species, *Cassia* species, *Commelina* species, *Datura* species, *Euphorbia* species, *Geranium* species, *Galinsoga* species, *Ipomea* species, *Lamium* species, *Lolium* species, *Malva* species, *Matricaria* species, *Prosopis* species, *Rumex* species, *Sisymbrium* species, *Solanum* species, *Trifolium* species, *Xanthium* species, *Veronica* species, and *Viola* species. In some aspects, the undesired vegetation includes common chickweed (*Stellaria media*), velvetleaf (*Abutilon theophrasti*), hemp sesbania (*Sesbania exaltata* Cory), *Anoda cristata*, *Bidens pilosa*, *Brassica kaber*, shepherd's purse (*Capsella bursa-pastoris*), cornflower (*Centaurea cyanus* or *Cyanus segetum*), hempnettle (*Galeopsis tetrahit*), cleavers (*Galium aparine*), common sunflower (*Helianthus annuus*). *Desmodium tortuosum*. Italian ryegrass (*Lolium multiflorum*), kochia (*Kochia scoparia*), *Medicago arabica*, *Mercurialis annua*, *Myosotis arvensis*, common poppy (*Papaver rhoeas*), *Raphanus raphanistrum*, broad-leaf dock (*Rumex obtusifolius*), Russian thistle (*Salsola kali*), wild mustard (*Sinapis arvensis*). *Sonchus arvensis*, *Thlaspi arvense*, *Tagetes minuta*, *Richardia brasiliensis*, *Plantago major*, *Plantago lanceolata*, bird's-eye speedwell (*Veronica persica*), pigweed (*Amaranthus retroflexus*), winter rape (*Brassica napus*), lambsquarters (*Chenopodium album*), Canada thistle (*Cirsium arvense*), nutsedge (*Cyperus esculentus*), poinsettia (*Euphorbia heterophylla*), prickly lettuce (*Lactuca serriola*), purple deadnettle (*Lamium purpureum*), wild chamomile (*Matricaria chamomilla*), false chamomile (*Matricaria inodora*), field chamomile (*Anthemis arvensis*), common buckwheat (*Fagopyrum esculentum*), wild buckwheat (*Polygonum convulvus*), giant foxtail (*Setaria faberi*), green foxtail (*Setaria viridis*), common sorghum (*Sorghum vulgare*), wild pansy (*Viola tricolor*), or combinations thereof.

The compositions described herein can be used to control herbicide resistant or tolerant weeds. The methods employing the compositions described herein may also be employed to control herbicide resistant or tolerant weeds. Exemplary resistant or tolerant weeds include, but are not limited to, biotypes resistant or tolerant to acetolactate synthase (ALS) or acetohydroxy acid synthase (AHAS) inhibitors (e.g., imidazolinones, sulfonylureas, pyrimidinylthiobenzoates, triazolopyrimidines, sulfonylaminocarbonyltriazolinones), photosystem II inhibitors (e.g., phenylcarbamates, pyridazinones, triazines, triazinones, uracils, amides, ureas, benzothiadiazinones, nitriles, phenylpyridazines), acetyl CoA carboxylase (ACCase) inhibitors (e.g., aryloxyphenoxypropionates, cyclohexanediones, phenylpyrazolines), synthetic auxins (e.g., benzoic acids, phenoxycarboxylic acids, pyridine carboxylates, quinoline carboxylic acids), auxin transport inhibitors (e.g., phthalamates, semicarbazones), photosystem I inhibitors (e.g., bipyridyliums), 5-enolpyruvylshikimate-3-phosphate (EPSP) synthase inhibitors (e.g., glyphosate), glutamine synthetase inhibitors (e.g., glufosinate, bialaphos), microtubule assembly inhibitors (e.g., benzamides, benzoic acids, dinitroanilines, phosphoramidates, pyridines), mitosis inhibitors (e.g., carbamates), very long chain fatty acid (VLCFA) inhibitors (e.g., acetamides, chloroacetamides, oxyacetamides, tetrazolinones), fatty acid and lipid synthesis inhibitors (e.g., phosphorodithioates, thiocarbamates, benzofuranes, chlorocarbonic acids), protoporphyrinogen oxidase (PPO) inhibitors (e.g., diphenylethers, N-phenylphthalimides, oxadiazoles, oxazolidinediones, phenylpyrazoles, pyrimidindiones, thiadiazoles, triazolinones), carotenoid biosynthesis inhibitors (e.g., clomazone, amitrole, aclonifen), phytoene desaturase (PS II) inhibitors (e.g., amides, anilidex, furanones, phenoxybutan-amides, pyridiazinones, pyridines), 4-hydroxyphenyl-pyruvate-dioxygenase (HPPD) inhibitors (e.g., callistemones, isoxazoles, pyrazoles, triketones), cellulose biosynthesis inhibitors (e.g., nitriles, benzamides, quinclorac, triazolocarboxamides), herbicides with multiple modes of action such as quinclorac, and unclassified herbicides such as arylaminopropionic acids, difenzoquat, endothall, and organoarsenicals. Exemplary resistant or tolerant weeds include, but are not limited to, biotypes with resistance or tolerance to multiple herbicides, biotypes with resistance or tolerance to multiple chemical classes, biotypes with resistance or tolerance to multiple herbicide modes of action, and biotypes with multiple resistance or tolerance mechanisms (e.g., target site resistance or metabolic resistance).

By way of non-limiting illustration, examples of some aspects of the present disclosure are given below. Parts and percentages are on a per weight basis unless otherwise indicated.

EXAMPLES

Greenhouse Trial Methodology—Evaluation of Postemergence Herbicidal Effect

Seeds of the desired test plant species were planted in a 90:10% v/v (volume/volume) mixture of PRO-MIX® BX (Premier Tech Horticulture, Quakertown, PA, USA) and PROFILE® GREENS GRADE™ (Profile Products LLC, Buffalo Grove, IL, USA) planting mixture, which typically has a pH of 5.2 to 6.2 and an organic matter content of at least 50 percent, in plastic pots with a surface area of 103.2 square centimeters ($cm^2$). In some aspects, to help ensure good germination and healthy plants, a fungicide treatment and/or other chemical or physical treatment was applied. The plants were grown for 7-36 days (d) in a greenhouse with an approximate 14-hour (h) photoperiod which was maintained at about 23° C. during the day and 22° C. during the night. Nutrients and water were added on a regular basis and supplemental lighting was provided with overhead metal halide 1000-Watt lamps as necessary. The plants were employed for testing when they reached the second or third true leaf stage.

Emulsifiable concentrates of each of each pyridine carboxylate herbicide (Compound A or Compound B) were prepared at 100 grams acid equivalent per liter (g ae/L). The emulsifiable concentrates also included a safener, cloquintocet-mexyl, at 120 grams active ingredient per liter (g ai/L), unless otherwise noted below. An aliquot of each emulsifiable concentrate was placed in a 25 mL glass vial and diluted with an aqueous mixture of 1.25% (v/v) ACTIROB® B esterified rapeseed oil (Bayer Crop Science, Research Triangle Park, NC, USA) or MSO® Concentrate with LECI-TECH® methylated soybean oil (Loveland Products, Loveland, CO, USA) to obtain concentrated stock solutions at the highest application rate for each herbicide, based upon a 12 milliliter (mL) application volume at a rate of 187 liters per hectare (L/ha). The concentrated stock solutions were further diluted with an aqueous mixture of 1.25% v/v ACTI-ROB® B or MSO® Concentrate with LECI-TECH® to obtain stock solutions at reduced application rates for each herbicide. Spray solutions of the herbicide combinations (Compound A or Compound B plus PS-II herbicide and optional HPPD herbicide) were prepared by adding weighed amounts or aliquots of the PS-II herbicide and optional HPPD herbicide to the stock solutions of Compound A or Compound B to form 12-mL spray solutions in two- or three-way combinations.

The spray solutions were applied to the plant material with an overhead Mandel track sprayer equipped with 8002E nozzles calibrated to deliver 187 L/ha over an application area of 0.503 square meters ($m^2$) at a spray height of 18 inches (43 centimeters (cm)) above the average plant canopy. Control plants were sprayed in the same manner with the solvent blank. All pyridine carboxylate herbicide (component a) application rates are given as "g ae/ha" and all PS II inhibitor herbicide (component b) and HPPD inhibitor herbicide (component c) application rates are given as "g ai/ha."

The treated plants and control plants were placed in a greenhouse as described above and watered by sub-irrigation to prevent wash-off of the test compounds. After 20-22 d, the condition of the test plants as compared with that of the control plants was determined visually and scored on a scale of 0 to 100 percent where 0 corresponds to no injury and 100 corresponds to complete kill.

The details of the compositions and the crops tested are specified in the following Examples.

Example 1

Compositions comprising Compound A and the PS-II herbicide bromoxynil were tested on undesirable vegetation species, including winter rape (BRSNW, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), common lambsquarters (CHEAL, *Chenopodium album* L.), pigweed (AMARE, *Amaranthus retroflexus*), wild chamomile (MATCH, *Matricaria chamomilla*), and Canada thistle (CIRAR, *Cirsium arvense*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 1 below.

TABLE 1

Herbicidal Effects (% visual injury) of Compound A and Bromoxynil on weed and grain crops.

| | Compound A | | | | |
|---|---|---|---|---|---|
| | 7.5 | 10 | 0 | 7.5 | 10 |
| Application | | | Bromoxynil | | |
| rate (g/ha) | 0 | 0 | 140 | 140 | 140 |
| BRSNW | 35 | 43 | 10 | 92 | 87 |
| POLCO | 78 | 93 | 100 | 78 | 97 |
| SINAR | 88 | 90 | 10 | 97 | 94 |
| SASKR | 60 | 63 | 75 | 73 | 73 |
| KCHSC | 63 | 63 | 38 | 73 | 75 |
| CHEAL | 88 | 93 | 0 | 73 | 75 |
| AMARE | 78 | 73 | 5 | 75 | 88 |
| MATCH | 20 | 30 | 5 | 10 | 15 |
| CIRAR | 30 | 40 | 45 | 83 | 98 |
| TRZAS | 0 | 0 | 0 | 0 | 0 |
| HORVS | 0 | 0 | 0 | 0 | 0 | g/ha = grams per hectare
BRSNW = *Brassica napus* (winter rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CHEAL = *Chenopodium album* L. (common lambsquarters)
AMARE = *Amaranthus retroflexus* (pigweed)
MATCH = *Matricaria chamomilla* (wild chamomile)
CIRAR = *Cirsium arvense* (Canada thistle)
TRZAS = *Triticum aestivum* (spring wheat)
HORVS = *Hordeum vulgare* (spring barley)

Example 2

Compositions comprising Compound A and metribuzin were tested on undesirable vegetation species, including spring rape (BRSNN, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), common lambsquarters (CHEAL, *Chenopodium album* L.), and wild chamomile (MATCH, *Matricaria chamomilla*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 2 below.

TABLE 2

Herbicidal Effects (% visual injury) of Compound A and Metribuzin on weed and grain crops.

| | Compound A | | | | |
|---|---|---|---|---|---|
| | 7.5 | 10 | 0 | 7.5 | 10 |
| Application | | | Metribuzin | | |
| rate (g/ha) | 0 | 0 | 25 | 25 | 25 |
| BRSNW | 35 | 43 | 0 | 86 | 89 |
| POLCO | 78 | 93 | 0 | 72 | 80 |
| SINAR | 88 | 90 | 18 | 95 | 99 |
| SASKR | 60 | 63 | 0 | 65 | 70 |
| KCHSC | 63 | 63 | 0 | 55 | 65 |

TABLE 2-continued

Herbicidal Effects (% visual injury) of Compound A and Metribuzin on weed and grain crops.

| | Compound A | | | | |
|---|---|---|---|---|---|
| | 7.5 | 10 | 0 | 7.5 | 10 |
| Application | | | Metribuzin | | |
| rate (g/ha) | 0 | 0 | 25 | 25 | 25 |
| CHEAL | 88 | 93 | 3 | 95 | 88 |
| AMARE | 78 | 73 | 0 | 80 | 88 |
| MATCH | 20 | 30 | 0 | 5 | 0 |
| CIRAR | 30 | 40 | 3 | 30 | 30 |
| TRZAS | 0 | 0 | 0 | 0 | 0 |
| HORVS | 0 | 0 | 0 | 0 | 0 | g/ha = grams per hectare
BRSNW = *Brassica napus* (winter rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CHEAL = *Chenopodium album* L. (common lambsquarters)
AMARE = *Amaranthus retroflexus* (pigweed)
MATCH = *Matricaria chamomilla* (wild chamomile)
CIRAR = *Cirsium arvense* (Canada thistle)
TRZAS = *Triticum aestivum* (spring wheat)
HORVS = *Hordeum vulgare* (spring barley)

Example 3

Compositions comprising Compound A and amicarbazone were tested on undesirable vegetation species, including spring rape (BRSNN, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), and common lambsquarters (CHEAL, *Chenopodium album* L.), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 3 below.

TABLE 3

Herbicidal Effects (% visual injury) of Compound A and Amicarbazone on weed and grain crops.

| | | Compound A | | | | |
|---|---|---|---|---|---|---|
| | | 7.5 | 10 | 0 | 7.5 | 10 |
| Application | | | | Amicarbazone | | |
| rate (g/ha) | | 0 | 0 | 175 | 175 | 175 |
| BRSNN | Obs | 55 | 60 | 38 | 78 | 88 |
| | Exp | — | — | — | 72 | 75 |
| | Δ | | | | 6 | 13 |
| POLCO | Obs | 70 | 78 | 10 | 73 | 100 |
| | Exp | — | — | — | 73 | 80 |
| | Δ | | | | −1 | 20 |
| SINAR | Obs | 88 | 92 | 25 | 100 | 85 |
| | Exp | — | — | — | 91 | 94 |
| | Δ | | | | 9 | −9 |
| SASKR | Obs | 45 | 60 | 0 | 68 | 65 |
| | Exp | — | — | — | 45 | 60 |
| | Δ | | | | 23 | 5 |
| KCHSC | Obs | 50 | 58 | 25 | 68 | 70 |
| | Exp | — | — | — | 63 | 68 |
| | Δ | | | | 5 | 2 |

TABLE 3-continued

Herbicidal Effects (% visual injury) of Compound
A and Amicarbazone on weed and grain crops.

|  |  | Compound A | | | | |
|---|---|---|---|---|---|---|
|  |  | 7.5 | 10 | 0 | 7.5 | 10 |
| Application |  | | | Amicarbazone | | |
| rate (g/ha) |  | 0 | 0 | 175 | 175 | 175 |
| CHEAL | Obs | 70 | 83 | 38 | 95 | 100 |
|  | Exp | — | — | — | 81 | 89 |
|  | Δ | | | | 14 | 11 |
| TRZAS | Obs | 0 | 0 | 5 | 5 | 4 |
|  | Exp | — | — | — | 5 | 5 |
|  | Δ | | | | 0 | −1 |
| HORVS | Obs | 8 | 0 | 28 | 30 | 30 |
|  | Exp | — | — | — | 33 | 28 |
|  | Δ | | | | −3 | 3 | g/ha = grams per hectare
BRSNN = *Brassica napus* (spring rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CHEAL = *Chenopodium album* L. (common lambsquarters)
TRZAS = *Triticum aestivum* (spring wheat)
HORVS = *Hordeum vulgare* (spring barley)

Example 4

Compositions comprising Compound A and atrazine were tested on undesirable vegetation species, including wild pansy (VIOTR, *Viola tricolor*), spring rape (BRSNN, *Brassica napus*), wild oat (AVEFA, *Aviena fatua*), and blackgrass (ALOMY, *Alopecurus myosuroides*), to determine the efficacy of the compositions on these undesirable vegetation species.

The results are summarized in Table 4 below.

TABLE 4

Herbicidal Effects (% visual injury)
of Compound A and Atrazine on weeds.

|  |  | Compound A | | | | |
|---|---|---|---|---|---|---|
|  |  | 7.5 | 10 | 0 | 7.5 | 10 |
| Application |  | | | Atrazine | | |
| rate (g/ha) |  | 0 | 0 | 450 | 450 | 450 |
| VIOTR | Obs | 45 | 15 | 20 | 45 | 40 |
|  | Exp | — | — | — | 56 | 32 |
|  | Δ | | | | −11 | 8 |
| BRSNN | Obs | 23 | 45 | 28 | 73 | 73 |
|  | Exp | — | — | — | 44 | 60 |
|  | Δ | | | | 29 | 12 |
| AVEFA | Obs | 0 | 0 | 13 | 23 | 35 |
|  | Exp | — | — | — | 13 | 13 |
|  | Δ | | | | 10 | 23 |
| ALOMY | Obs | 0 | 0 | 25 | 30 | 35 |
|  | Exp | — | — | — | 25 | 25 |
|  | Δ | | | | 5 | 10 | g/ha = grams per hectare
VIOTR = *Viola tricolor* (wild pansy)
BRSNN = *Brassica napus* (spring rape)
AVEFA = *Avena fatua* (wild oat)
ALOMY = *Alopecurus myosuroides* (blackgrass)

Example 5

Compositions comprising Compound A and bentazone were tested on undesirable vegetation species, including spring rape (BRSNN, *Brassica napus*), and wild buckwheat (POLCO, *Polygonum convolvulus*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 5 below.

TABLE 5

Herbicidal Effects (% visual injury) of Compound
A and Bentazone on weeds and grain crops.

|  |  | Compound A | | | | |
|---|---|---|---|---|---|---|
|  |  | 7.5 | 10 | 0 | 7.5 | 10 |
| Application |  | | | Bentazone | | |
| rate (g/ha) |  | 0 | 0 | 51.5 | 51.5 | 51.5 |
| BRSNN | Obs | 55 | 73 | 30 | 83 | 94 |
|  | Exp | — | — | — | 69 | 81 |
|  | Δ | | | | 14 | 13 |
| POLCO | Obs | 78 | 86 | 20 | 83 | 98 |
|  | Exp | — | — | — | 82 | 89 |
|  | Δ | | | | 1 | 9 |
| TRZAS | Obs | 0 | 0 | 0 | 0 | 0 |
|  | Exp | — | — | — | 0 | 0 |
|  | Δ | | | | 0 | 0 |
| HORVS | Obs | 0 | 0 | 0 | 0 | 0 |
|  | Exp | — | — | — | 0 | 0 |
|  | Δ | | | | 0 | 0 | g/ha = grams per hectare
BRSNN = *Brassica napus* (spring rape)
POLCO = *Polygonum convolvulus* (wild buckwheat)
TRZAS = *Triticum aestivum* (spring wheat)
HORVS = *Hordeum vulgare* (spring barley)

Example 6

Compositions comprising Compound A and propanil were tested on undesirable vegetation species, including velvetleaf (ABUTH, *Abutilon theophrasti*), wild buckwheat (POLCO, *Polygonum convolvulus*), Canada thistle (CIRAR, *Cirsium arvense*), grain sorghum (SORVU, *Sorghum vulgare*), soybean (GLXMA, *Glycine max*), and ivyleaf morning glory (IPOHE, *Ipomoea hederacea*), to determine the efficacy of the compositions on these undesirable vegetation species.

The results are summarized in Table 6 below.

TABLE 6

Herbicidal Effects (% visual injury) of
Compound A and Propanil on weeds crops.

|  |  | Compound A | | | | |
|---|---|---|---|---|---|---|
|  |  | 7.5 | 10 | 0 | 7.5 | 10 |
| Application |  | | | Propanil | | |
| rate (g/ha) |  | 0 | 0 | 5 | 5 | 5 |
| ABUTH | Obs | 68 | 80 | 10 | 88 | 60 |
|  | Exp | — | — | — | 71 | 82 |
|  | Δ | | | | 17 | −22 |
| POLCO | Obs | 83 | 93 | 20 | 97 | 85 |
|  | Exp | — | — | — | 86 | 94 |
|  | Δ | | | | 11 | −9 |
| CIRAR | Obs | 40 | 60 | 28 | 68 | 60 |
|  | Exp | — | — | — | 57 | 71 |
|  | Δ | | | | 11 | −11 |

TABLE 6-continued

Herbicidal Effects (% visual injury) of
Compound A and Propanil on weeds crops.

|  |  | Compound A | | | | |
| --- | --- | --- | --- | --- | --- | --- |
|  |  | 7.5 | 10 | 0 | 7.5 | 10 |
| Application |  |  |  | Propanil | | |
| rate (g/ha) |  | 0 | 0 | 5 | 5 | 5 |
| SORVU | Obs | 0 | 0 | 15 | 13 | 25 |
|  | Exp | — | — | — | 15 | 15 |
|  | Δ |  |  |  | −3 | 10 |
| GLXMA | Obs | 80 | 90 | 23 | 99 | 100 |
|  | Exp | — | — | — | 85 | 92 |
|  | Δ |  |  |  | 15 | 8 |
| IPOHE | Obs | 20 | 25 | 38 | 65 | 60 |
|  | Exp | — | — | — | 50 | 53 |
|  | Δ |  |  |  | 15 | 7 | g/ha = grams per hectare
ABUTH = *Abutilon theophrasti* (velvetleaf)
POLCO = *Polygonum convolvulus* (wild buckwheat)
CIRAR = *Cirsium arvense* (Canada thistle)
SORVU = *Sorghum vulgare* (grain sorghum)
GLXMA = *Glycine max* (soybean)
IPOHE = *Ipomoea hederacea* (ivyleaf morningglory)

Example 7

Compositions comprising Compound A and pyridate were tested on undesirable vegetation species, including spring rape (BRSNN, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), common lambsquarters (CHEAL, *Chenopodium album* L.), and wild chamomile (MATCH, *Matricaria chamomilla*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 7 below.

TABLE 7

Herbicidal Effects (% visual injury) of Compound
A and Pyridate on weeds and grain crops.

|  |  | Compound A | | | | |
| --- | --- | --- | --- | --- | --- | --- |
|  |  | 7.5 | 10 | 0 | 7.5 | 10 |
| Application |  |  |  | Pyridate | | |
| rate (g/ha) |  | 0 | 0 | 125 | 125 | 125 |
| BRSNN | Obs | 55 | 60 | 15 | 78 | 78 |
|  | Exp | — | — | — | 62 | 66 |
|  | Δ |  |  |  | 16 | 12 |
| POLCO | Obs | 70 | 78 | 0 | 78 | 93 |
|  | Exp | — | — | — | 70 | 78 |
|  | Δ |  |  |  | 8 | 15 |
| SINAR | Obs | 88 | 92 | 0 | 95 | 97 |
|  | Exp | — | — | — | 88 | 92 |
|  | Δ |  |  |  | 8 | 5 |
| SASKR | Obs | 45 | 60 | 0 | 60 | 68 |
|  | Exp | — | — | — | 45 | 60 |
|  | Δ |  |  |  | 15 | 8 |
| KCHSC | Obs | 50 | 58 | 0 | 63 | 63 |
|  | Exp | — | — | — | 50 | 58 |
|  | Δ |  |  |  | 13 | 5 |
| CHEAL | Obs | 70 | 83 | 0 | 85 | 83 |
|  | Exp | — | — | — | 70 | 83 |
|  | Δ |  |  |  | 15 | 0 |

TABLE 7-continued

Herbicidal Effects (% visual injury) of Compound
A and Pyridate on weeds and grain crops.

|  |  | Compound A | | | | |
| --- | --- | --- | --- | --- | --- | --- |
|  |  | 7.5 | 10 | 0 | 7.5 | 10 |
| Application |  |  |  | Pyridate | | |
| rate (g/ha) |  | 0 | 0 | 125 | 125 | 125 |
| TRZAS | Obs | 0 | 0 | 0 | 0 | 0 |
|  | Exp | — | — | — | 0 | 0 |
|  | Δ |  |  |  | 0 | 0 |
| HORVS | Obs | 8 | 0 | 5 | 8 | 15 |
|  | Exp | — | — | — | 12 | 5 |
|  | Δ |  |  |  | −5 | 10 | g/ha = grams per hectare
BRSNN = *Brassica napus* (spring rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CHEAL = *Chenopodium album* L. (common lambsquarters)
TRZAS = *Triticum aestivum* (spring wheat)
HORVS = *Hordeum vulgare* (spring barley)

Example 8

Herbicidal compositions comprising Compound B and bromoxynil were tested on undesirable vegetation species, including poinsettia (EPHHL, *Euphorbia heterophylla*), velvetleaf (ABUTH, *Abutilon theophrasti*), wild buckwheat (POLCO, *Polygonum convolvulus*), Canada thistle (CIRAR, *Cirsium arvense*), spring rape (BRSNN, *Brassica napus*), giant foxtail (SETFA, *Setaria faberi*), kochia (KCHSC, *Kochia scoparia*), wild pansy (VIOTR, *Viola tricolor*), common lambsquarters (CHEAL, *Chenopodium album* L.), and chickweed (STEME, *Stellaria media*), to determine the efficacy of the herbicidal compositions on these undesirable vegetation species.

The results are summarized in Table 8 below.

TABLE 8

Herbicidal Effects (% visual injury) of
Compound B and Bromoxynil on weeds.

|  |  | Compound B | | | | |
| --- | --- | --- | --- | --- | --- | --- |
|  |  | 7.5 | 10 | 0 | 7.5 | 10 |
| Application |  |  |  | Bromoxynil | | |
| rate (g/ha) |  | 0 | 0 | 140 | 140 | 140 |
| EPHHL | Obs | 83 | 99 | 30 | 99 | 100 |
|  | Exp | — | — | — | 88 | 99 |
|  | Δ |  |  |  | 11 | 1 |
| ABUTH | Obs | 68 | 68 | 30 | 85 | 80 |
|  | Exp | — | — | — | 77 | 77 |
|  | Δ |  |  |  | 8 | 3 |
| POLCO | Obs | 73 | 80 | 55 | 100 | 100 |
|  | Exp | — | — | — | 88 | 91 |
|  | Δ |  |  |  | 12 | 9 |
| CIRAR | Obs | 45 | 45 | 60 | 100 | 100 |
|  | Exp | — | — | — | 78 | 78 |
|  | Δ |  |  |  | 22 | 22 |
| BRSNN | Obs | 68 | 85 | 3 | 88 | 95 |
|  | Exp | — | — | — | 68 | 85 |
|  | Δ |  |  |  | 19 | 10 |
| SETFA | Obs | 70 | 55 | 0 | 70 | 85 |
|  | Exp | — | — | — | 70 | 55 |
|  | Δ |  |  |  | 0 | 30 |
| KCHSC | Obs | 68 | 80 | 35 | 96 | 100 |
|  | Exp | — | — | — | 79 | 87 |
|  | Δ |  |  |  | 17 | 13 |

TABLE 8-continued

Herbicidal Effects (% visual injury) of
Compound B and Bromoxynil on weeds.

| Application | | Compound B | | | | |
|---|---|---|---|---|---|---|
| | | 7.5 | 10 | 0 | 7.5 | 10 |
| | | | | Bromoxynil | | |
| rate (g/ha) | | 0 | 0 | 140 | 140 | 140 |
| VIOTR | Obs | 10 | 40 | 0 | 25 | 60 |
| | Exp | — | — | — | 10 | 40 |
| | Δ | | | | 15 | 20 |
| CHEAL | Obs | 85 | 90 | 48 | 100 | 99 |
| | Exp | — | — | — | 92 | 95 |
| | Δ | | | | 8 | 4 |
| STEME | Obs | 100 | 93 | 0 | 100 | 100 |
| | Exp | — | — | — | 100 | 93 |
| | Δ | | | | 0 | 8 | g/ha = grams per hectare
EPHHL = *Euphorbia heterophylla* (poinsettia)
ABUTH = *Abutilon theophrasti* (velvetleaf)
POLCO = *Polygonum convolvulus* (wild buckwheat)
CIRAR = *Cirsium arvense* (Canada thistle)
BRSNN = *Brassica napus* (spring rape)
SETFA = *Setaria faberi* (giant foxtail)
KCHSC = *Kochia scoparia* (kochia)
VIOTR = *Viola tricolor* (wild pansy)
CHEAL = *Chenopodium album* L. (common lambsquarters)
STEME = *Stellaria media* (chickweed)

Example 9

Herbicidal compositions comprising Compound A and tebuthiuron were tested on undesirable vegetation species, including pigweed (AMARE, *Amaranthus retroflexus*), winter rape (BRSNW, *Brassica napus*), common lambsquarters (CHEAL, *Chenopodium album* L.), Canada thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*), to determine the efficacy of the herbicidal compositions on these undesirable vegetation species. The herbicidal compositions were also tested on spring wheat (TRZAS) and spring barley (HORVS), and the phytotoxicity of the herbicidal compositions on each crop was measured.

The results are summarized in Table 9 below.

TABLE 9

Herbicidal Effects (% visual injury) of Compound
A and Tebuthiuron on weeds and grain crops.

| Application | | Compound A | | | | |
|---|---|---|---|---|---|---|
| | | 7.5 | 10 | 0 | 7.5 | 10 |
| | | | | Tebuthiuron | | |
| rate (g/ha) | | 0 | 0 | 280 | 280 | 280 |
| AMARE | Obs | 70 | 90 | 88 | 95 | 98 |
| | Exp | — | — | — | 96 | 99 |
| | Δ | | | | −1 | −1 |
| BRSNW | Obs | 63 | 68 | 45 | 91 | 95 |
| | Exp | — | — | — | 79 | 82 |
| | Δ | | | | 12 | 13 |
| CHEAL | Obs | 70 | 78 | 98 | 100 | 100 |
| | Exp | — | — | — | 99 | 99 |
| | Δ | | | | 1 | 1 |
| CIRAR | Obs | 18 | 30 | 40 | 80 | 68 |
| | Exp | — | — | — | 51 | 58 |
| | Δ | | | | 30 | 10 |

TABLE 9-continued

Herbicidal Effects (% visual injury) of Compound
A and Tebuthiuron on weeds and grain crops.

| Application | | Compound A | | | | |
|---|---|---|---|---|---|---|
| | | 7.5 | 10 | 0 | 7.5 | 10 |
| | | | | Tebuthiuron | | |
| rate (g/ha) | | 0 | 0 | 280 | 280 | 280 |
| KCHSC | Obs | 65 | 70 | 23 | 78 | 88 |
| | Exp | — | — | — | 73 | 77 |
| | Δ | | | | 5 | 11 |
| MATCH | Obs | 18 | 30 | 25 | 40 | 40 |
| | Exp | — | — | — | 38 | 48 |
| | Δ | | | | 2 | −8 |
| POLCO | Obs | 60 | 70 | 40 | 100 | 98 |
| | Exp | — | — | — | 76 | 82 |
| | Δ | | | | 24 | 16 |
| SINAR | Obs | 85 | 88 | 35 | 85 | 100 |
| | Exp | — | — | — | 90 | 92 |
| | Δ | | | | −5 | 8 |
| TRZAS | Obs | 0 | 0 | 0 | 10 | 0 |
| | Exp | — | — | — | 0 | 0 |
| | Δ | | | | 10 | 0 |
| HORVS | Obs | 0 | 0 | 28 | 35 | 40 |
| | Exp | — | — | — | 28 | 28 |
| | Δ | | | | 8 | 13 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canada thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
TRZAS = *Triticum aestivum* (spring wheat)
HORVS = *Hordeum vulgare* (spring barley)

Example 10

Herbicidal compositions comprising Compound A and bromacil were tested on undesirable vegetation species, including pigweed (AMARE, *Amaranthus retroflexus*), winter rape (BRSNW, *Brassica napus*), common lambsquarters (CHEAL, *Chenopodium album* L.), Canada thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the herbicidal compositions on these undesirable vegetation species. The herbicidal compositions were also tested on spring wheat (TRZAS) and spring barley (HORVS), and the phytotoxicity of the herbicidal compositions on each crop was measured.

The results are summarized in Table 10 below.

TABLE 10

Herbicidal Effects (% visual injury) of Compound
A and Bromacil on weeds and grain crops.

| Application | | Compound A | | | | |
|---|---|---|---|---|---|---|
| | | 7.5 | 10 | 0 | 7.5 | 10 |
| | | | | Bromacil | | |
| rate (g/ha) | | 0 | 0 | 900 | 900 | 900 |
| AMARE | Obs | 90 | 85 | 20 | 98 | 96 |
| | Exp | — | — | — | 92 | 88 |
| | Δ | | | | 6 | 8 |

TABLE 10-continued

Herbicidal Effects (% visual injury) of Compound A and Bromacil on weeds and grain crops.

| Application | | \multicolumn{5}{c}{Compound A} | | | | |
|---|---|---|---|---|---|---|
| | | 7.5 | 10 | 0 | 7.5 | 10 |
| | | | | Bromacil | | |
| rate (g/ha) | | 0 | 0 | 900 | 900 | 900 |
| BRSNW | Obs | 35 | 40 | 5 | 65 | 75 |
| | Exp | — | — | — | 38 | 43 |
| | Δ | | | | 27 | 32 |
| CHEAL | Obs | 75 | 80 | 53 | 95 | 98 |
| | Exp | — | — | — | 88 | 91 |
| | Δ | | | | 7 | 7 |
| CIRAR | Obs | 40 | 55 | 18 | 68 | 80 |
| | Exp | — | — | — | 51 | 63 |
| | Δ | | | | 17 | 17 |
| KCHSC | Obs | 70 | 70 | 91 | 96 | 97 |
| | Exp | — | — | — | 97 | 97 |
| | Δ | | | | −1 | 0 |
| MATCH | Obs | 10 | 20 | 5 | 48 | 45 |
| | Exp | — | — | — | 15 | 24 |
| | Δ | | | | 33 | 21 |
| POLCO | Obs | 30 | 43 | 10 | 75 | 80 |
| | Exp | — | — | — | 37 | 48 |
| | Δ | | | | 38 | 32 |
| SASKR | Obs | 60 | 63 | 25 | 78 | 85 |
| | Exp | — | — | — | 70 | 72 |
| | Δ | | | | 8 | 13 |
| SINAR | Obs | 83 | 88 | 35 | 94 | 97 |
| | Exp | — | — | — | 89 | 92 |
| | Δ | | | | 5 | 5 |
| TRZAS | Obs | 0 | 0 | 0 | 0 | 0 |
| | Exp | — | — | — | 0 | 0 |
| | Δ | | | | 0 | 0 |
| HORVS | Obs | 0 | 0 | 10 | 0 | 0 |
| | Exp | — | — | — | 10 | 10 |
| | Δ | | | | −10 | −10 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canada thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
TRZAS = *Triticum aestivum* (spring wheat)
HORVS = *Hordeum vulgare* (spring barley)

TABLE 11

Herbicidal Effects (% visual injury) of Compound A and Desmedipham on weeds and grain crops.

| Application | | \multicolumn{5}{c}{Compound A} | | | | |
|---|---|---|---|---|---|---|
| | | 7.5 | 10 | 0 | 7.5 | 10 |
| | | | | Desmedipham | | |
| rate (g/ha) | | 0 | 0 | 162.5 | 162.5 | 162.5 |
| AMARE | Obs | 90 | 85 | 15 | 93 | 90 |
| | Exp | — | — | — | 92 | 87 |
| | Δ | | | | 1 | 3 |
| BRSNW | Obs | 35 | 40 | 0 | 40 | 38 |
| | Exp | — | — | — | 35 | 40 |
| | Δ | | | | 5 | −3 |
| CHEAL | Obs | 75 | 80 | 0 | 83 | 83 |
| | Exp | — | — | — | 75 | 80 |
| | Δ | | | | 8 | 5 |
| CIRAR | Obs | 40 | 55 | 10 | 55 | 58 |
| | Exp | — | — | — | 46 | 60 |
| | Δ | | | | 9 | −2 |
| KCHSC | Obs | 70 | 70 | 0 | 75 | 75 |
| | Exp | — | — | — | 70 | 70 |
| | Δ | | | | 5 | 5 |
| MATCH | Obs | 10 | 20 | 0 | 45 | 40 |
| | Exp | — | — | — | 10 | 20 |
| | Δ | | | | 35 | 20 |
| POLCO | Obs | 30 | 43 | 0 | 60 | 60 |
| | Exp | — | — | — | 30 | 43 |
| | Δ | | | | 30 | 18 |
| SASKR | Obs | 60 | 63 | 0 | 75 | 75 |
| | Exp | — | — | — | 60 | 63 |
| | Δ | | | | 15 | 13 |
| SINAR | Obs | 83 | 88 | 0 | 93 | 94 |
| | Exp | — | — | — | 83 | 88 |
| | Δ | | | | 10 | 7 |
| TRZAS | Obs | 0 | 0 | 0 | 0 | 0 |
| | Exp | — | — | — | 0 | 0 |
| | Δ | | | | 0 | 0 |
| HORVS | Obs | 0 | 0 | 0 | 0 | 0 |
| | Exp | — | — | — | 0 | 0 |
| | Δ | | | | 0 | 0 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canada thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
TRZAS = *Triticum aestivum* (spring wheat)
HORVS = *Hordeum vulgare* (spring barley)

Example 11

Herbicidal compositions comprising Compound A and desmedipham were tested on undesirable vegetation species, including pigweed (AMARE, *Amaranthus retroflexus*), winter rape (BRSNW, *Brassica napus*), common lambsquarters (CHEAL, *Chenopodium album* L.), Canada thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the herbicidal compositions on these undesirable vegetation species. The herbicidal compositions were also tested on spring wheat (TRZAS) and spring barley (HORVS), and the phytotoxicity of the herbicidal compositions on each crop was measured.

The results are summarized in Table 11 below.

Example 12

Herbicidal compositions comprising Compound A and diuron were tested on undesirable vegetation species, including pigweed (AMARE, *Amaranthus retroflexus*), winter rape (BRSNW, *Brassica napus*), common lambsquarters (CHEAL, *Chenopodium album* L.), Canada thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the herbicidal compositions on these undesirable vegetation species. The herbicidal compositions were also tested on spring wheat (TRZAS) and spring barley (HORVS), and the phytotoxicity of the herbicidal compositions on each crop was measured.

The results are summarized in Table 12 below.

TABLE 12

Herbicidal Effects (% visual injury) of Compound A and Diuron on weeds and grain crops.

| Application | | Compound A | | | | |
|---|---|---|---|---|---|---|
| | | 7.5 | 10 | 0 | 7.5 | 10 |
| | | | | Diuron | | |
| rate (g/ha) | | 0 | 0 | 220 | 220 | 220 |
| AMARE | Obs | 90 | 85 | 98 | 100 | 99 |
| | Exp | — | — | — | 100 | 100 |
| | Δ | | | | 0 | −1 |
| BRSNW | Obs | 35 | 40 | 5 | 43 | 43 |
| | Exp | — | — | — | 38 | 43 |
| | Δ | | | | 4 | −1 |
| CHEAL | Obs | 75 | 80 | 100 | 100 | 100 |
| | Exp | — | — | — | 100 | 100 |
| | Δ | | | | 0 | 0 |
| CIRAR | Obs | 40 | 55 | 40 | 79 | 75 |
| | Exp | — | — | — | 64 | 73 |
| | Δ | | | | 15 | 2 |
| KCHSC | Obs | 70 | 70 | 90 | 98 | 98 |
| | Exp | — | — | — | 97 | 97 |
| | Δ | | | | 1 | 1 |
| MATCH | Obs | 10 | 20 | 15 | 25 | 20 |
| | Exp | — | — | — | 24 | 32 |
| | Δ | | | | 2 | −12 |
| POLCO | Obs | 30 | 43 | 5 | 73 | 78 |
| | Exp | — | — | — | 34 | 45 |
| | Δ | | | | 39 | 32 |
| SASKR | Obs | 60 | 63 | 40 | 95 | 95 |
| | Exp | — | — | — | 76 | 78 |
| | Δ | | | | 19 | 18 |
| SINAR | Obs | 83 | 88 | 5 | 93 | 80 |
| | Exp | — | — | — | 83 | 88 |
| | Δ | | | | 9 | −8 |
| TRZAS | Obs | 0 | 0 | 0 | 0 | 0 |
| | Exp | — | — | — | 0 | 0 |
| | Δ | | | | 0 | 0 |
| HORVS | Obs | 0 | 0 | 10 | 0 | 0 |
| | Exp | — | — | — | 0 | 0 |
| | Δ | | | | 0 | 0 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canada thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
TRZAS = *Triticum aestivum* (spring wheat)
HORVS = *Hordeum vulgare* (spring barley)

Example 13

Herbicidal compositions comprising Compound A, the PS-II herbicide bromoxynil, and the HPPD herbicide pyrasulfotole were tested on undesirable vegetation species, including Canada thistle (CIRAR, *Cirsium arvense*), spring rape (BRSNN, *Brassica napus*), giant foxtail (SETFA, *Setaria faberi*), nutsedge (CYPES, *Cyperus esculentus*), broad-leaf dock (RUMOB, *Rumex obtusifolius*), soybean (GLXMA, *Glycine max*), chickweed (STEME, *Stellaria media*), velvetleaf (ABUTH, *Abutilon theophrasti*), wild buckwheat (POLCO, *Polygonum convolvulus*), and pigweed (AMARE, *Amaranthus retroflexus*), to determine the efficacy of the herbicidal compositions on these undesirable vegetation species. The herbicidal compositions were also tested on spring wheat (TRZAS) and maize (ZEAMX, *Zea mays*), and the phytotoxicity of the herbicidal compositions on each crop was measured.

The results are summarized in Table 13 below.

TABLE 13

Herbicidal Effects (% visual injury) of Compound A, Bromoxynil, and Pyrasulfotole on weeds and grain crops.

| Application | | Compound A | | | | |
|---|---|---|---|---|---|---|
| | | 7.5 | 10 | 0 | 7.5 | 10 |
| | | | | Bromoxynil | | |
| | | 0 | 0 | 8.9 | 8.9 | 8.9 |
| | | | | Pyrasulfotole | | |
| rate (g/ha) | | 0 | 0 | 1.1 | 1.1 | 1.1 |
| CIRAR | Obs | 40 | 60 | 83 | 100 | 99 |
| | Exp | — | — | — | 90 | 93 |
| | Δ | | | | 11 | 6 |
| BRSNN | Obs | 65 | 65 | 73 | 88 | 90 |
| | Exp | — | — | — | 90 | 90 |
| | Δ | | | | −3 | 0 |
| SETFA | Obs | 78 | 80 | 10 | 85 | 85 |
| | Exp | — | — | — | 80 | 82 |
| | Δ | | | | 5 | 3 |
| CYPES | Obs | 30 | 8 | 0 | 53 | 60 |
| | Exp | — | — | — | 30 | 8 |
| | Δ | | | | 23 | 53 |
| RUMOB | Obs | 20 | 13 | 68 | 88 | 100 |
| | Exp | — | — | — | 74 | 72 |
| | Δ | | | | 14 | 28 |
| GLXMA | Obs | 80 | 90 | 60 | 100 | 100 |
| | Exp | — | — | — | 92 | 96 |
| | Δ | | | | 8 | 4 |
| STEME | Obs | 89 | 90 | 75 | 98 | 95 |
| | Exp | — | — | — | 97 | 98 |
| | Δ | | | | 0 | −3 |
| ABUTH | Obs | 68 | 80 | 83 | 95 | 100 |
| | Exp | — | — | — | 94 | 97 |
| | Δ | | | | 1 | 4 |
| POLCO | Obs | 83 | 93 | 83 | 100 | 100 |
| | Exp | — | — | — | 97 | 99 |
| | Δ | | | | 3 | 1 |
| AMARE | Obs | 88 | 88 | 60 | 95 | 98 |
| | Exp | — | — | — | 95 | 95 |
| | Δ | | | | 0 | 3 |
| TRZAS | Obs | 5 | 3 | 0 | 5 | 0 |
| | Exp | — | — | — | 5 | 3 |
| | Δ | | | | 0 | −3 |
| ZEAMX | Obs | 0 | 0 | 0 | 10 | 20 |
| | Exp | — | — | — | 0 | 0 |
| | Δ | | | | 10 | 20 | g/ha = grams per hectare
CIRAR = *Cirsium arvense* (Canada thistle)
BRSNN = *Brassica napus* (spring rape)
SETFA = *Setaria faberi* (giant foxtail)
CYPES = *Cyperus esculentus* (nutsedge)
RUMOB = *Rumex obtusifolius* (broad-leaf dock)
GLXMA = *Glycine max* (soybean)
STEME = *Stellaria media* (chickweed)
ABUTH = *Abutilon theophrasti* (velvetleaf)
POLCO = *Polygonum convolvulus* (wild buckwheat)
AMARE = *Amaranthus retroflexus* (pigweed)
TRZAS = *Triticum aestivum* (spring wheat)
ZEAMX = *Zea mays* (maize)

Example 14

Compositions comprising Compound A (without cloquintocet-mexyl safener), the PS-II herbicide bromoxynil, and the synthetic auxin herbicide 2,4-D were tested on undesirable vegetation species, including wild pansy (VIOTR, *Viola tricolor*), chickweed (STEME, *Stellaria media*), ivyleaf morning glory (IPOHE, *Ipomoea hederacea*), Canada thistle (CIRAR, *Cirsium arvense*), velvetleaf (ABUTH, *Abutilon* theophrasti), volunteer soybean (GLXMA, *Glycine max*), broad-leaf dock (RUMOB, *Rumex obtusifolius*), winter rape (BRSNW, *Brassica napus*), wild buckwheat (POLCO, *Polygonum convolvulus*), kochia (KCHSC, *Kochia scoparia*), common sunflower (HELAN, *Helianthus annuus*), blackgrass (ALOMY, *Alopecurus myosuroides*), wild oat (AVEFA, *Avena fatua*), Italian ryegrass (LOLMU, *Lolium multiflorum*), barnyard grass (ECHCG, *Echinochloa crusgalli*), nutsedge (CYPES, *Cyperus esculentus*), Chinese sprangletop (LEFCH, *Leptochloa chinensis*), large crabgrass (DIGSA, *Digitaria sanguinalis*), giant foxtail (SETFA, *Setaria faberi*), and grain sorghum (SORVU, *Sorghum vulgare*), to determine the efficacy of the compositions on these undesirable vegetation species.

The results are summarized in Table 14 below. In the table, an application rate of "X+Y" indicates that the application rate of bromoxynil is "X" and 2,4-D is "Y."

TABLE 14

Herbicidal Effects (% visual injury) of Compound A and Bromoxynil + 2,4-D on weeds.

| Application rate (g/ha) | | Compound A | | | | |
|---|---|---|---|---|---|---|
| | | 7.5 | 10 | 0 | 7.5 | 10 |
| | | | | Bromoxynil + 2,4-D | | |
| | | 0 | 0 | 140 + 140 | 140 + 140 | 140 + 140 |
| VIOTR | Obs | 8 | 15 | 38 | 65 | 55 |
| | Exp | — | — | — | 42 | 47 |
| | Δ | | | | 23 | 8 |
| STEME | Obs | 73 | 88 | 0 | 75 | 68 |
| | Exp | — | — | — | 73 | 88 |
| | Δ | | | | 3 | −20 |
| IPOHE | Obs | 10 | 15 | 95 | 98 | 98 |
| | Exp | — | — | — | 96 | 96 |
| | Δ | | | | 2 | 2 |
| CIRAR | Obs | 40 | 28 | 53 | 65 | 73 |
| | Exp | — | — | — | 72 | 66 |
| | Δ | | | | −7 | — |
| ABUTH | Obs | 70 | 75 | 38 | 98 | 100 |
| | Exp | — | — | — | 81 | 84 |
| | Δ | | | | 16 | 16 |
| GLXMA | Obs | 85 | 85 | 30 | 99 | 99 |
| | Exp | — | — | — | 90 | 90 |
| | Δ | | | | 9 | 9 |
| RUMOB | Obs | 38 | 35 | 50 | 55 | 35 |
| | Exp | — | — | — | 69 | 68 |
| | Δ | | | | −14 | −33 |
| BRSNW | Obs | 50 | 65 | 78 | 85 | 88 |
| | Exp | — | — | — | 89 | 92 |
| | Δ | | | | −4 | −5 |
| POLCO | Obs | 80 | 78 | 20 | 100 | 95 |
| | Exp | — | — | — | 84 | 82 |
| | Δ | | | | 16 | 13 |
| KCHSC | Obs | 73 | 88 | 63 | 90 | 94 |
| | Exp | — | — | — | 90 | 95 |
| | Δ | | | | 0 | −1 |
| HELAN | Obs | 95 | 100 | 55 | 99 | 96 |
| | Exp | — | — | — | 98 | 100 |
| | Δ | | | | 1 | −4 |
| ALOMY | Obs | 0 | 0 | 0 | 0 | 0 |
| | Exp | — | — | — | 0 | 0 |
| | Δ | | | | 0 | 0 |
| AVEFA | Obs | 0 | 0 | 0 | 0 | 0 |
| | Exp | — | — | — | 0 | 0 |
| | Δ | | | | 0 | 0 |
| LOLMU | Obs | 0 | 0 | 0 | 0 | 0 |
| | Exp | — | — | — | 0 | 0 |
| | Δ | | | | 0 | 0 |
| ECHCG | Obs | 55 | 58 | 0 | 90 | 92 |
| | Exp | — | — | — | 55 | 58 |
| | Δ | | | | 35 | 34 |
| CYPES | Obs | 0 | 0 | 0 | 0 | 0 |
| | Exp | — | — | — | 0 | 0 |
| | Δ | | | | 0 | 0 |
| LEFCH | Obs | 0 | 0 | 0 | 15 | 30 |
| | Exp | — | — | — | 0 | 0 |
| | Δ | | | | 15 | 30 |
| DIGSA | Obs | 0 | 8 | 0 | 13 | 13 |
| | Exp | — | — | — | 0 | 8 |
| | Δ | | | | 13 | 5 |
| SETFA | Obs | 0 | 0 | 0 | 30 | 43 |
| | Exp | — | — | — | 0 | 0 |
| | Δ | | | | 30 | 43 |
| SORVU | Obs | 0 | 0 | 0 | 0 | 0 |
| | Exp | — | — | — | 0 | 0 |
| | Δ | | | | 0 | 0 | g/ha = grams per hectare
VIOTR = *Viola tricolor* (wild pansy)
STEME = *Stellaria media* (chickweed)
IPOHE = *Ipomoea hederacea* (ivyleaf morningglory)
CIRAR = *Cirsium arvense* (Canada thistle)
ABUTH = *Abutilon theophrasti* (velvetleaf)
GLXMA = *Glycine max* (soybean)
RUMOB = *Rumex obtusifolius* (broad-leaf dock)
BRSNW = *Brassica napus* (winter rape)
POLCO = *Polygonum convolvulus* (wild buckwheat)
KCHSC = *Kochia scoparia* (kochia)
HELAN = *Plelianthus annuus* (common sunflower)
ALOMY = *Alopecurus myosuroides* (blackgrass)
AVEFA = *Avena fatua* (wild oat)
LOLMU = *Lolium multiflorum* (Italian ryegrass)
ECHCG = *Echinochloa crus-galli* (barnyardgrass)
CYPES = *Cyperus esculentus* (nutsedge)
LEFCH = *Leptochloa chinensis* (Chinese sprangletop)
DIGSA = *Digitaria sanguinalis* (large crabgrass)
SETFA = *Setaria faberi* (giant foxtail)
SORVU = *Sorghum vulgare* (grain sorghum)

Example 15

Compositions comprising Compound B, the PS-II herbicide bromoxynil, and the HPPD herbicide pyrasulfotole were tested on undesirable vegetation species, including velvetleaf (ABUTH, *Abutilon theophrasti*), wild buckwheat (POLCO, *Polygonum convolvulus*), Canada thistle (CIRAR, *Cirsium arvense*), giant foxtail (SETFA, *Setaria faberi*), kochia (KCHSC, *Kochia scoparia*), wild pansy (VIOTR, *Viola tricolor*), poinsettia (EPHHL, *Euphorbia heterophylla*), common lambsquarters (CHEAL, *Chenopodium album* L.), and chickweed (STEME, *Stellaria media*), to determine the efficacy of the herbicidal compositions on these undesirable vegetation species.

The results are summarized in Table 15 below.

TABLE 15

Herbicidal Effects (% visual injury) of Compound B, Bromoxynil, and Pyrasulfotole on weeds.

| | | Compound B | | | | |
|---|---|---|---|---|---|---|
| | | 7.5 | 10 | 0 | 7.5 | 10 |
| | | | | Bromoxynil | | |
| | | 0 | 0 | 62.2 | 62.2 | 62.2 |
| Application | | | | Pyrasulfotole | | |
| rate (g/ha) | | 0 | 0 | 7.8 | 7.8 | 7.8 |
| ABUTH | Obs | 68 | 68 | 30 | 98 | 95 |
| | Exp | — | — | — | 77 | 77 |
| | Δ | | | | 20 | 18 |
| POLCO | Obs | 73 | 80 | 60 | 95 | 95 |
| | Exp | — | — | — | 89 | 92 |
| | Δ | | | | 6 | 3 |
| CIRAR | Obs | 45 | 45 | 58 | 89 | 91 |
| | Exp | — | — | — | 77 | 77 |
| | Δ | | | | 12 | 14 |
| SETFA | Obs | 70 | 55 | 0 | 63 | 75 |
| | Exp | — | — | — | 70 | 55 |
| | Δ | | | | −8 | 20 |
| KCHSC | Obs | 68 | 80 | 75 | 99 | 99 |
| | Exp | — | — | — | 92 | 95 |
| | Δ | | | | 7 | 4 |
| VIOTR | Obs | 10 | 40 | 13 | 35 | 45 |
| | Exp | — | — | — | 21 | 48 |
| | Δ | | | | 14 | −3 |
| EPHHL | Obs | 83 | 99 | 50 | 100 | 100 |
| | Exp | — | — | — | 91 | 99 |
| | Δ | | | | 9 | 1 |
| CHEAL | Obs | 85 | 90 | 100 | 100 | 100 |
| | Exp | — | — | — | 100 | 100 |
| | Δ | | | | 0 | 0 |
| STEME | Obs | 100 | 93 | 55 | 100 | 100 |
| | Exp | — | — | — | 100 | 97 |
| | Δ | | | | 0 | 3 | g/ha = grams per hectare
ABUTH = *Abutilon theophrasti* (velvetleaf)
POLCO = *Polygonum convolvulus* (wild buckwheat)
CIRAR = *Cirsium arvense* (Canada thistle)
SETFA = *Setaria faberi* (giant foxtail)
KCHSC = *Kochia scoparia* (kochia)
VIOTR = *Viola tricolor* (wild pansy)
EPHHL = *Euphorbia heterophylla* (poinsettia)
CHEAL = *Chenopodium album* L. (common lambsquarters)
STEME = *Stellaria media* (chickweed)

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various aspects, the terms "consisting essentially of" and "consisting of" can be used in place of "comprising" and "including" to provide for more specific aspects and are also disclosed. Other than in the examples, or where otherwise noted, all numbers expressing quantities of ingredients, reaction conditions, and so forth used in the specification and claims are to be understood to be construed in light of the number of significant digits and ordinary rounding approaches, and not as an attempt to limit the application of the doctrine of equivalents to the scope of the claims.

What is claimed is:

1. A composition, comprising:
   (a) a pyridine carboxylate herbicide defined by Formula (I):

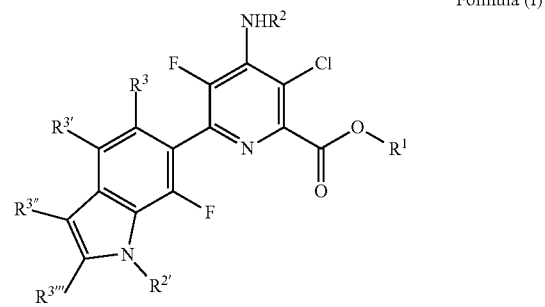

Formula (I)

wherein:
   $R^1$ is cyanomethyl or propargyl;
   $R^2$ and $R^{2'}$ are independently hydrogen, $C_1$-$C_6$ alkyl, formyl, alkoxycarbonyl, or acyl;
   $R^3$, $R^{3'}$, $R^{3''}$, and $R^{3'''}$ are independently hydrogen, halogen, $C_1$-$C_4$ alkyl, $C_1$-$C_4$ haloalkyl, $C_1$-$C_3$ alkoxy, or $C_1$-$C_3$ haloalkoxy;
or an agriculturally acceptable salt thereof; and
   (b) a PS II inhibitor herbicide or an agriculturally acceptable salt or ester thereof;
   wherein the weight ratio of the pyridine carboxylate herbicide in to the PS II inhibitor herbicide is from about 1:500 to about 10:1; and
   wherein the composition induces an unexpectedly enhanced herbicidal effect.

2. The composition of claim 1, wherein the pyridine carboxylate herbicide compound is cyanomethyl 4-amino-3-chloro-5-fluoro-6-(7-fluoro-1H-indol-6-yl) pyridine-2-carboxylate:

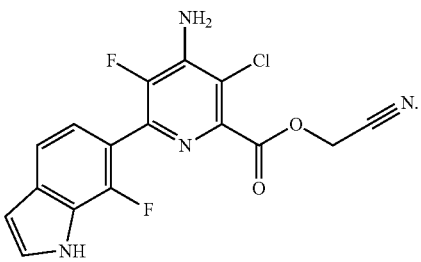 [SMILES: N#CCOC(=O)c1nc(-c2ccc3cc[nH]c3c2F)c(F)c(N)c1Cl]

3. The composition of claim 1, wherein the pyridine carboxylate herbicide compound is propargyl 4-amino-3-chloro-5-fluoro-6-(7-fluoro-1H-indol-6-yl) pyridine-2-carboxylate:

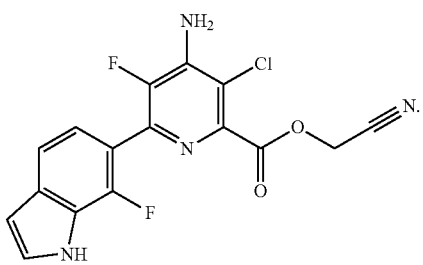 [SMILES: N#CCOC(=O)c1nc(-c2ccc3cc[nH]c3c2F)c(F)c(N)c1Cl]

4. The composition of claim 1, wherein the PS II inhibitor herbicide is selected from the group consisting of ametryne, amicarbazone, atrazine, bentazone, bromacil, bromofenoxim, bromoxynil, chlorbromuron, chloridazon, chlorotoluron, chloroxuron, cyanazine, desmedipham, desmetryn, dimefuron, dimethametryn, diuron, ethidimuron, ethiozin, fenuron, fluometuron, hexazinone, iodobonil, ioxynil, isocil, isomethiozin, isoproturon, isouron, karbutilate, lenacil, linuron, metamitron, methabenzthiazuron, metobromuron, metoxuron, metribuzin, monolinuron, neburon, pentanochlor, phenmedipham, prometon, prometryn, propanil, propazine, pyridafol, pyridate, siduron, simazine, simetryne, tebuthiuron, terbacil, terbumeton, terbuthylazine, terbutryn, trietazine, and combinations thereof.

5. The composition of claim 1, wherein the weight ratio of the pyridine carboxylate herbicide to the PS II inhibitor herbicide is from 1:200 to 3:1.

6. The composition of claim 1, further comprising a safener.

7. The composition of claim 1, further comprising an additional pesticide.

8. The composition of claim 1, wherein the composition does not include a herbicidal active ingredient in addition to (a) and (b).

9. A method of controlling undesirable vegetation, comprising applying to the vegetation or an area adjacent the vegetation or applying to soil or water to limit the emergence or growth of the vegetation a composition, comprising:
   (a) a pyridine carboxylate herbicide defined by Formula (I):

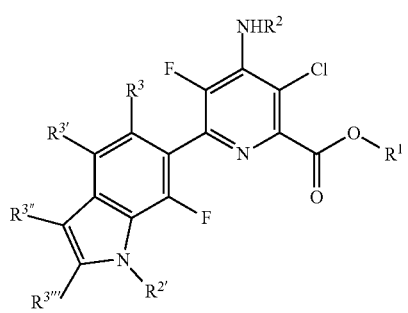

Formula (I)

wherein
   $R^1$ is cyanomethyl or propargyl;
   $R^2$ and $R^{2'}$ are independently hydrogen, $C_1$-$C_6$ alkyl, formyl, alkoxycarbonyl, or acyl;
   $R^3$, $R^{3'}$, $R^{3''}$, and $R^{3'''}$ are independently hydrogen, halogen, $C_1$-$C_4$ alkyl, $C_1$-$C_4$ haloalkyl, $C_1$-$C_3$ alkoxy, or $C_1$-$C_3$ haloalkoxy;
or an agriculturally acceptable salt thereof; and
   (b) a PS II inhibitor herbicide or an agriculturally acceptable salt or ester thereof;

wherein the pyridine carboxylate herbicide is applied in an amount of at least 0.1 g ae/ha;
wherein the PS II inhibitor herbicide is applied in an amount of at least 5 g ai/ha;
wherein the weight ratio of the pyridine carboxylate herbicide to the PS II inhibitor herbicide is from about 1:500 to about 10:1; and
wherein the composition induces an unexpectedly enhanced herbicidal effect.

10. The method of claim 9, wherein the pyridine carboxylate herbicide compound is cyanomethyl 4-amino-3-chloro-5-fluoro-6-(7-fluoro-1H-indol-6-yl) pyridine-2-carboxylate:

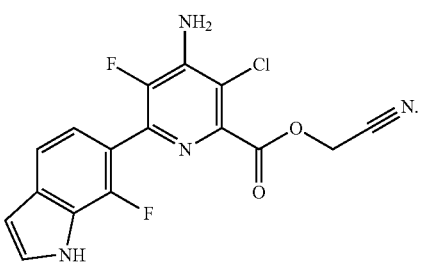 [SMILES: N#CCOC(=O)c1nc(-c2ccc3cc[nH]c3c2F)c(F)c(N)c1Cl]

11. The method of claim 9, wherein the pyridine carboxylate herbicide compound is propargyl 4-amino-3-chloro-5-fluoro-6-(7-fluoro-1H-indol-6-yl) pyridine-2-carboxylate:

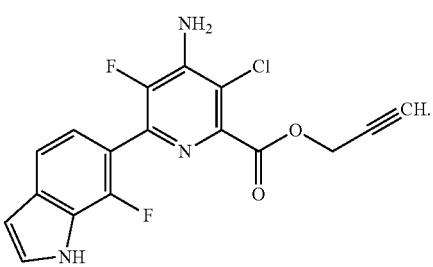 [SMILES: C#CCOC(=O)c1nc(-c2ccc3cc[nH]c3c2F)c(F)c(N)c1Cl]

12. The method of claim 9, wherein the PS II inhibitor herbicide is selected from the group consisting of ametryne, amicarbazone, atrazine, bentazone, bromacil, bromofenoxim, bromoxynil, chlorbromuron, chloridazon, chlorotoluron, chloroxuron, cyanazine, desmedipham, desmetryn, dimefuron, dimethametryn, diuron, ethidimuron, ethiozin, fenuron, fluometuron, hexazinone, iodobonil, ioxynil, isocil, isomethiozin, isoproturon, isouron, karbutilate, lenacil, linuron, metamitron, methabenzthiazuron, metobromuron, metoxuron, metribuzin, monolinuron, neburon, pentanochlor, phenmedipham, prometon, prometryn, propanil, propazine, pyridafol, pyridate, siduron, simazine, simetryne, tebuthiuron, terbacil, terbumeton, terbuthylazine, terbutryn, trietazine, and combinations thereof.

13. The method of claim 9, wherein weight ratio of the pyridine carboxylate herbicide to the PS II inhibitor herbicide is from 1:200 to 3:1.

14. The method of claim 9, wherein the pyridine carboxylate herbicide and the PS II inhibitor herbicide are applied simultaneously.

15. The method of claim 9, wherein the composition does not include a herbicidal active ingredient in addition to (a) and (b).

* * * * *